US012704928B2

(12) United States Patent
Bergström et al.

(10) Patent No.: US 12,704,928 B2
(45) Date of Patent: *Aug. 11, 2026

(54) TOUCH-SENSING APPARATUS

(71) Applicant: FlatFrog Laboratories AB, Lund (SE)

(72) Inventors: Håkan Bergström, Torna-Hällestad (SE); Tomas Svensson, Limhamn (SE)

(73) Assignee: Flatfrog Laboratories AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 19/268,227

(22) Filed: Jul. 14, 2025

(65) Prior Publication Data

US 2026/0010264 A1 Jan. 8, 2026

Related U.S. Application Data

(63) Continuation of application No. 18/429,192, filed on Jan. 31, 2024, now Pat. No. 12,386,461, which is a (Continued)

(30) Foreign Application Priority Data

Feb. 10, 2020 (SE) .................................... 2030044-8
Nov. 9, 2020 (SE) .................................... 2030335-0

(51) Int. Cl.
*G06F 3/042* (2006.01)

(52) U.S. Cl.
CPC .......... *G06F 3/0428* (2013.01); *G06F 3/0421* (2013.01); *G06F 2203/04103* (2013.01)

(58) Field of Classification Search
CPC ................. G06F 3/0428; G06F 3/0421; G06F 2203/04103
See application file for complete search history.

(56) References Cited

U.S. PATENT DOCUMENTS 3,375,053 A 3/1968 Ward
3,440,426 A 4/1969 Bush
(Continued)

FOREIGN PATENT DOCUMENTS

AU 2008280952 A1 3/2009
AU 2014201966 A1 4/2014
(Continued)

OTHER PUBLICATIONS

Ahn, Y., et al., “A slim and wide multi-touch tabletop interface and its applications,” BigComp2014, IEEE, 2014, in 6 pages.
(Continued)

*Primary Examiner* — Patrick N Edouard
*Assistant Examiner* — Joseph P Fox
(74) *Attorney, Agent, or Firm* — Knobbe, Martens, Olson, & Bear, LLP

(57) ABSTRACT

A touch sensing apparatus is disclosed comprising a panel having a touch surface, emitters and detectors arranged along a perimeter, a light directing portion arranged adjacent the perimeter and comprising a light directing surface, the emitters and/or the detectors are arranged opposite a rear surface of the panel to emit and/or receive light through a channel in a frame element, the channel is arranged opposite the rear surface and extends in a direction of a normal axis of the touch surface, the light directing surface and the channel are arranged on opposite sides of the panel and overlap in the direction of the plane, the light directing surface receive light from the emitters, or direct light to the detectors, through the panel and through the channel, in the direction of the normal axis. A method of manufacturing a frame element for a touch sensing apparatus is disclosed.

19 Claims, 14 Drawing Sheets

Related U.S. Application Data continuation of application No. 17/759,836, filed as application No. PCT/SE2021/050040 on Jan. 25, 2021, now Pat. No. 11,893,189.

(56) References Cited

U.S. PATENT DOCUMENTS 3,478,220 A 11/1969 Milroy
3,553,680 A 1/1971 Remy
3,673,327 A 6/1972 Johnson et al.
4,129,384 A 12/1978 Walker et al.
4,180,702 A 12/1979 Hartmann et al.
4,209,255 A 6/1980 Heynau et al.
4,213,707 A 7/1980 Evans, Jr.
4,254,333 A 3/1981 Arne
4,254,407 A 3/1981 Tipon
4,294,543 A 10/1981 Apple et al.
4,346,376 A 8/1982 Mallos
4,420,261 A 12/1983 Barlow et al.
4,459,476 A 7/1984 Weissmueller et al.
4,484,179 A 11/1984 Kasday
4,507,557 A 3/1985 Tsikos
4,521,112 A 6/1985 Kuwabara et al.
4,542,375 A 9/1985 Alles et al.
4,550,250 A 10/1985 Mueller et al.
4,593,191 A 6/1986 Alles
4,673,918 A 6/1987 Adler et al.
4,688,933 A 8/1987 Lapeyre
4,688,993 A 8/1987 Ferris et al.
4,692,809 A 9/1987 Beining et al.
4,710,760 A 12/1987 Kasday
4,736,191 A 4/1988 Matzke et al.
4,737,626 A 4/1988 Hasegawa
4,746,770 A 5/1988 McAvinney
4,751,379 A 6/1988 Sasaki et al.
4,752,655 A 6/1988 Tajiri et al.
4,766,424 A 8/1988 Adler et al.
4,772,763 A 9/1988 Garwin et al.
4,782,328 A 11/1988 Denlinger
4,812,833 A 3/1989 Shimauchi
4,820,050 A 4/1989 Griffin
4,837,430 A 6/1989 Hasegawa
4,868,550 A 9/1989 Sasaki et al.
4,868,912 A 9/1989 Doering
4,891,829 A 1/1990 Deckman et al.
4,916,308 A 4/1990 Meadows
4,916,712 A 4/1990 Bender
4,933,544 A 6/1990 Tamaru
4,949,079 A 8/1990 Loebner
4,986,662 A 1/1991 Bures
4,988,983 A 1/1991 Wehrer
4,994,677 A 2/1991 Graindorge
5,065,185 A 11/1991 Powers et al.
5,073,770 A 12/1991 Lowbner
5,105,186 A 4/1992 May
5,115,677 A 5/1992 Martin et al.
5,155,813 A 10/1992 Donoghue et al.
5,159,322 A 10/1992 Loebner
5,162,783 A 11/1992 Moreno
5,166,668 A 11/1992 Aoyagi
5,175,030 A 12/1992 Lu et al.
5,227,622 A 7/1993 Suzuki
5,248,856 A 9/1993 Mallicoat
5,254,407 A 10/1993 Sergerie et al.
5,345,490 A 9/1994 Finnigan et al.
5,383,022 A 1/1995 Beda
5,414,413 A 5/1995 Tamaru et al.
5,434,373 A 7/1995 Komaki
5,483,261 A 1/1996 Yasutake
5,484,966 A 1/1996 Segen
5,499,098 A 3/1996 Ogawa
5,502,568 A 3/1996 Ogawa et al.
5,515,083 A 5/1996 Casebolt et al.
5,525,764 A 6/1996 Junkins et al.
5,526,422 A 6/1996 Keen
5,539,514 A 7/1996 Shishido et al.
5,543,591 A 8/1996 Gillespie et al.
5,570,181 A 10/1996 Yasuo et al.
5,572,251 A 11/1996 Ogawa
5,577,501 A 11/1996 Flohr et al.
5,600,105 A 2/1997 Fukuzaki et al.
5,605,406 A 2/1997 Bowen
5,608,550 A 3/1997 Epstein et al.
5,672,852 A 9/1997 Fukuzaki et al.
5,677,082 A 10/1997 Greinke et al.
5,679,930 A 10/1997 Katsurahira
5,686,942 A 11/1997 Ball
5,688,933 A 11/1997 Evans et al.
5,729,249 A 3/1998 Yasutake
5,729,250 A 3/1998 Bishop et al.
5,736,686 A 4/1998 Perret et al.
5,740,224 A 4/1998 Mueller et al.
5,746,423 A 5/1998 Arov
5,764,223 A 6/1998 Chang et al.
5,767,517 A 6/1998 Hawkins
5,775,792 A 7/1998 Wiese
5,808,606 A 9/1998 Kodama et al.
5,945,980 A 8/1999 Moissev et al.
5,945,981 A 8/1999 Paull et al.
5,959,617 A 9/1999 Bird et al.
6,031,524 A 2/2000 Kunert
6,061,177 A 5/2000 Fujimoto
6,067,079 A 5/2000 Shieh
6,072,450 A 6/2000 Yamada et al.
6,100,538 A 8/2000 Ogawa
6,122,394 A 9/2000 Neukermans et al.
6,130,663 A 10/2000 Null
6,141,104 A 10/2000 Schulz et al.
6,172,667 B1 1/2001 Sayag
6,175,999 B1 1/2001 Sloan et al.
6,227,667 B1 5/2001 Halldorsson et al.
6,229,529 B1 5/2001 Yano et al.
6,315,156 B1 11/2001 Mahoney et al.
6,333,735 B1 12/2001 Anvekar
6,340,967 B1 1/2002 Maxted
6,366,276 B1 4/2002 Kunimatsu et al.
6,380,732 B1 4/2002 Gilboa
6,380,740 B1 4/2002 Laub
6,390,370 B1 5/2002 Plesko
6,429,857 B1 8/2002 Masters et al.
6,452,996 B1 9/2002 Hsieh
6,476,797 B1 11/2002 Kurihara et al.
6,480,187 B1 11/2002 Sano et al.
6,492,633 B2 12/2002 Nakazawa et al.
6,495,832 B1 12/2002 Kirby
6,504,143 B2 1/2003 Koops et al.
6,504,530 B1 1/2003 Wilson et al.
6,524,749 B1 2/2003 Kaneda et al.
6,529,327 B1 3/2003 Graindorge
6,535,213 B1 3/2003 Ogino et al.
6,538,644 B1 3/2003 Muraoka
6,587,099 B2 7/2003 Takekawa
6,648,485 B1 11/2003 Colgan et al.
6,660,964 B1 12/2003 Benderly
6,664,498 B2 12/2003 Forsman et al.
6,664,952 B2 12/2003 Iwamoto et al.
6,677,934 B1 1/2004 Blanchard
6,690,363 B2 2/2004 Newton
6,692,807 B2 2/2004 Bries et al.
6,707,027 B2 3/2004 Liess et al.
6,710,767 B1 3/2004 Hasegawa et al.
6,738,051 B2 5/2004 Boyd et al.
6,748,098 B1 6/2004 Rosenfeld
6,784,948 B2 8/2004 Kawashima et al.
6,799,141 B1 9/2004 Stoustrup et al.
6,803,900 B1 10/2004 Berkoff et al.
6,806,871 B1 10/2004 Yasue
6,828,959 B2 12/2004 Takekawa et al.
6,911,646 B1 6/2005 Weitekamp
6,927,384 B2 8/2005 Reime et al.
6,940,286 B2 9/2005 Wang et al.
6,965,836 B2 11/2005 Richardson
6,972,401 B2 12/2005 Akitt et al.
6,972,753 B1 12/2005 Kimura et al.
6,985,137 B2 1/2006 Kaikuranta

(56) References Cited

U.S. PATENT DOCUMENTS 7,042,444 B2 5/2006 Cok
7,084,859 B1 8/2006 Pryor
7,087,907 B1 8/2006 Lalovic et al.
7,117,157 B1 10/2006 Taylor et al.
7,133,031 B2 11/2006 Wang et al.
7,133,032 B2 11/2006 Cok
7,151,530 B2 12/2006 Roeber et al.
7,176,904 B2 2/2007 Satoh
7,199,932 B2 4/2007 Sugiura
7,359,041 B2 4/2008 Xie et al.
7,397,418 B1 7/2008 Doerry et al.
7,432,893 B2 10/2008 Ma et al.
7,435,940 B2 10/2008 Eliasson et al.
7,436,443 B2 10/2008 Hirunuma et al.
7,442,914 B2 10/2008 Eliasson et al.
7,465,914 B2 12/2008 Eliasson et al.
7,528,898 B2 5/2009 Hashimoto
D602,498 S 10/2009 Arnell
7,613,375 B2 11/2009 Shimizu
7,629,968 B2 12/2009 Miller et al.
7,646,379 B1 1/2010 Drennan et al.
7,646,833 B1 1/2010 He et al.
7,653,883 B2 1/2010 Hotelling et al.
7,655,901 B2 2/2010 Idzik et al.
7,705,835 B2 4/2010 Eikman
7,712,041 B2 5/2010 Toyama et al.
7,729,056 B2 6/2010 Hwang et al.
7,812,826 B2 10/2010 Ording et al.
7,847,789 B2 12/2010 Kolmykov-Zotov et al.
7,855,716 B2 12/2010 McCreary et al.
7,859,519 B2 12/2010 Tulbert
7,924,272 B2 4/2011 Boer et al.
7,932,899 B2 4/2011 Newton et al.
7,956,847 B2 6/2011 Christie
7,969,410 B2 6/2011 Kakarala
7,995,039 B2 8/2011 Eliasson et al.
8,013,845 B2 9/2011 Ostergaard et al.
8,031,186 B2 10/2011 Ostergaard
8,077,147 B2 12/2011 Krah et al.
8,093,545 B2 1/2012 Leong et al.
8,094,136 B2 1/2012 Eliasson et al.
8,094,910 B2 1/2012 Xu et al.
8,139,046 B2 3/2012 Kweon et al.
8,149,211 B2 4/2012 Hayakawa et al.
8,149,221 B2 4/2012 Newton
8,154,418 B2 4/2012 Peterson et al.
8,184,108 B2 5/2012 Smits
8,194,036 B1 6/2012 Braun et al.
8,217,854 B2 7/2012 Bhogal et al.
8,218,154 B2 7/2012 Oestergaard et al.
8,274,495 B2 9/2012 Lee
D669,497 S 10/2012 Lee et al.
8,314,773 B2 11/2012 Low et al.
8,319,729 B2 11/2012 Choi et al.
8,325,158 B2 12/2012 Yatsuda et al.
8,339,379 B2 12/2012 Goertz et al.
8,345,023 B1 1/2013 Drennan et al.
8,350,827 B2 1/2013 Chung et al.
D675,644 S 2/2013 Frost et al.
8,384,010 B2 2/2013 Hong et al.
8,384,693 B2 2/2013 Newton
8,407,606 B1 3/2013 Davidson et al.
8,436,833 B2 5/2013 King et al.
8,441,467 B2 5/2013 Han
8,445,834 B2 5/2013 Hong et al.
8,466,901 B2 6/2013 Yen et al.
8,482,547 B2 7/2013 Christiansson et al.
8,542,217 B2 9/2013 Wassvik et al.
8,553,014 B2 10/2013 Holmgren et al.
8,567,257 B2 10/2013 Van et al.
8,571,171 B2 10/2013 Tischenko et al.
8,581,884 B2 11/2013 Fåhraeus et al.
8,587,562 B2 11/2013 Goertz et al.
8,599,140 B2 12/2013 Crockett et al.
8,610,672 B2 12/2013 Kun et al.
8,624,858 B2 1/2014 Fyke et al.
8,674,963 B2 3/2014 Cornish et al.
8,676,007 B2 3/2014 Holmgren et al.
8,686,974 B2 4/2014 Christiansson et al.
8,692,807 B2 4/2014 Foehraeus et al.
8,716,614 B2 5/2014 Wassvik
8,727,581 B2 5/2014 Saccomanno
8,745,514 B1 6/2014 Davidson
8,749,527 B2 6/2014 Douxchamps et al.
8,780,066 B2 7/2014 Christiansson et al.
8,830,181 B1 9/2014 Clark et al.
8,837,882 B2 9/2014 Holmgren et al.
8,860,696 B2 10/2014 Wassvik et al.
8,866,870 B1 10/2014 Smith
8,872,098 B2 10/2014 Bergstrm et al.
8,872,801 B2 10/2014 Bergstrm et al.
D716,820 S 11/2014 Wood
8,884,900 B2 11/2014 Wassvik
8,890,843 B2 11/2014 Wassvik et al.
8,890,849 B2 11/2014 Christiansson et al.
8,896,558 B2 11/2014 Lee et al.
8,896,575 B2 11/2014 Goertz et al.
8,902,196 B2 12/2014 Goertz et al.
8,913,035 B2 12/2014 Lai et al.
8,922,526 B2 12/2014 Wang
8,928,590 B1 1/2015 El Dokor
8,928,609 B2 1/2015 Italia et al.
8,963,886 B2 2/2015 Wassvik
8,982,084 B2 3/2015 Christiansson et al.
9,001,086 B1 4/2015 Saini
9,024,896 B2 5/2015 Chen
9,024,916 B2 5/2015 Christiansson
9,025,855 B1 5/2015 Christoph et al.
9,035,909 B2 5/2015 Christiansson
9,052,771 B2 6/2015 Goertz et al.
9,063,614 B2 6/2015 Pettersson et al.
9,063,617 B2 6/2015 Eliasson et al.
9,086,763 B2 7/2015 Johansson et al.
9,092,091 B2 7/2015 Piot et al.
9,092,094 B1 7/2015 Baldwin
9,128,250 B2 9/2015 Charters et al.
9,134,854 B2 9/2015 Wassvik et al.
9,137,891 B2 9/2015 Gibbs et al.
9,158,401 B2 10/2015 Christiansson et al.
9,158,415 B2 10/2015 Song et al.
9,158,416 B2 10/2015 Eriksson et al.
9,164,625 B2 10/2015 Holmgren et al.
9,195,344 B2 11/2015 Goertz et al.
9,201,520 B2 12/2015 Benko et al.
9,207,800 B1 12/2015 Eriksson et al.
9,213,443 B2 12/2015 Goertz et al.
9,213,445 B2 12/2015 King et al.
9,223,441 B1 12/2015 Bohn
9,274,645 B2 3/2016 Christiansson et al.
9,280,237 B2 3/2016 Kukulj
9,291,845 B2 3/2016 Shin et al.
9,292,132 B2 3/2016 An et al.
9,317,146 B1 4/2016 Hufnagel
9,317,168 B2 4/2016 Christiansson et al.
9,318,156 B2 4/2016 Kanapathippillai et al.
9,323,396 B2 4/2016 Han et al.
9,335,867 B2 5/2016 Holmgren et al.
9,366,565 B2 6/2016 Krister
9,366,802 B2 6/2016 Lee et al.
9,377,882 B2 6/2016 Kim
9,377,884 B2 6/2016 Christiansson et al.
9,389,730 B2 7/2016 Goertz et al.
9,389,732 B2 7/2016 Craven-Bartle
9,411,430 B2 8/2016 Holmgren et al.
9,411,444 B2 8/2016 Christiansson et al.
9,411,464 B2 8/2016 Wallander et al.
9,430,079 B2 8/2016 Christiansson et al.
9,442,574 B2 9/2016 Fåhraeus et al.
D768,674 S 10/2016 Hanover
9,471,170 B2 10/2016 Goertz et al.
9,547,393 B2 1/2017 Christiansson et al.
9,552,103 B2 1/2017 Craven-Bartle et al.
9,557,846 B2 1/2017 Baharav et al.
9,563,298 B2 2/2017 Sakashita et al.

(56) References Cited

U.S. PATENT DOCUMENTS

D782,516 S 3/2017 Höhne et al.
9,588,619 B2 3/2017 Christiansson et al.
9,594,467 B2 3/2017 Christiansson et al.
D783,042 S 4/2017 Kim et al.
9,618,682 B2 4/2017 Yoon et al.
9,619,084 B2 4/2017 Deichmann et al.
9,626,018 B2 4/2017 Christiansson et al.
9,626,040 B2 4/2017 Wallander et al.
9,639,210 B2 5/2017 Wallander et al.
9,645,679 B2 5/2017 Eriksson et al.
9,652,082 B1 5/2017 Lin et al.
9,671,900 B2 6/2017 Piot et al.
9,678,601 B2 6/2017 Pettersson et al.
9,678,602 B2 6/2017 Wallander
9,684,414 B2 6/2017 Christiansson et al.
9,710,101 B2 7/2017 Christiansson et al.
9,720,499 B2 8/2017 Han et al.
9,741,184 B2 8/2017 Iyer et al.
D798,893 S 10/2017 Anzures et al.
9,785,287 B2 10/2017 Bergstrom et al.
9,811,163 B2 11/2017 Eriksson et al.
9,811,209 B2 11/2017 Christiansson et al.
9,817,510 B2 11/2017 Kim
D807,388 S 1/2018 Butcher et al.
D808,416 S 1/2018 Anzures et al.
9,857,916 B2 1/2018 Bergström et al.
9,857,917 B2 1/2018 Wassvik et al.
9,864,412 B2 1/2018 Park et al.
9,864,470 B2 1/2018 Christiansson
9,874,978 B2 1/2018 Wall
9,921,661 B2 3/2018 Eriksson et al.
9,927,921 B2 3/2018 Lee
9,971,424 B2 5/2018 Rao et al.
9,983,626 B2 5/2018 Cao et al.
9,983,717 B2 5/2018 Pacheco et al.
9,996,196 B2 6/2018 Christiansson et al.
10,001,881 B2 6/2018 Wallander et al.
10,004,985 B2 6/2018 Holmgren et al.
D824,412 S 7/2018 Anzures et al.
10,013,107 B2 7/2018 Christiansson et al.
10,019,113 B2 7/2018 Christiansson et al.
10,024,741 B2 7/2018 Povazay et al.
10,031,623 B2 7/2018 Christiansson et al.
10,048,773 B2 8/2018 Fahraeus et al.
10,088,919 B2 10/2018 Tamura
10,088,957 B2 10/2018 Johansson et al.
10,126,882 B2 11/2018 Wassvik
10,126,897 B2 11/2018 Kwon et al.
10,139,854 B2 11/2018 Krishnakumar et al.
10,146,376 B2 12/2018 Wassvik et al.
10,151,866 B2 12/2018 Craven-Bartle et al.
10,152,176 B2 12/2018 Wallander
10,161,886 B2 12/2018 Ohlsson et al.
D837,829 S 1/2019 Balles et al.
D838,280 S 1/2019 Coburn et al.
10,168,835 B2 1/2019 Wallander et al.
D842,312 S 3/2019 Na et al.
10,261,639 B2 4/2019 Lee et al.
10,268,288 B1 4/2019 Wang et al.
10,268,319 B2 4/2019 Wassvik et al.
10,282,035 B2 5/2019 Kocovski et al.
10,317,200 B1 6/2019 Han et al.
10,318,041 B2 6/2019 Björklund et al.
10,318,074 B2 6/2019 Klinghult et al.
10,324,565 B2 6/2019 Rosengren et al.
10,324,566 B2 6/2019 Christiansson
D852,842 S 7/2019 Hung et al.
10,365,768 B2 7/2019 Craven-Bartle et al.
10,372,265 B2 8/2019 Christiansson et al.
10,397,638 B2 8/2019 Kanematsu et al.
10,401,546 B2 9/2019 Craven-Bartle et al.
10,417,219 B1 9/2019 Yang et al.
10,437,358 B2 10/2019 Geaghan et al.
10,437,389 B2 10/2019 Skagmo et al.
10,459,589 B2 10/2019 Xu et al.
10,459,590 B2 10/2019 Lin et al.
10,474,249 B2 11/2019 Fahraeus et al.
10,481,737 B2 11/2019 Christiansson et al.
10,496,227 B2 12/2019 Wassvik et al.
10,579,227 B1 3/2020 Bura et al.
10,606,414 B2 3/2020 Christiansson et al.
10,606,416 B2 3/2020 Skagmo et al.
10,642,386 B2 5/2020 Makelainen et al.
10,649,585 B1 5/2020 Van et al.
10,691,638 B1 6/2020 Lyadvinsky et al.
D892,855 S 8/2020 Liu
10,739,916 B2 8/2020 Skagmo et al.
10,761,657 B2 9/2020 Christiansson et al.
10,775,935 B2 9/2020 Kocovski et al.
10,775,937 B2 9/2020 Christiansson et al.
10,845,923 B2 11/2020 Skagmo et al.
10,853,315 B1 12/2020 Faibish et al.
10,860,142 B1 12/2020 Northcott et al.
10,884,275 B2 1/2021 Yang et al.
10,884,553 B2 1/2021 Weilbacher et al.
10,892,303 B2 1/2021 Li
10,963,104 B2 3/2021 Bergström et al.
11,016,605 B2 5/2021 Christiansson et al.
11,029,783 B2 6/2021 Wassvik et al.
11,099,688 B2 8/2021 Christiansson et al.
11,106,312 B2 8/2021 Christiansson et al.
11,106,314 B2 8/2021 Krishnakumar et al.
11,119,565 B2 9/2021 Avila et al.
11,175,756 B2 11/2021 Andersson et al.
11,182,023 B2 11/2021 Ohlsson et al.
11,188,730 B1 11/2021 Kwon et al.
11,243,640 B2 2/2022 Ancona et al.
11,256,371 B2 2/2022 Craven-Bartle et al.
11,263,028 B2 3/2022 Momchilov
11,269,460 B2 3/2022 Skagmo et al.
11,281,335 B2 3/2022 Kocovski et al.
11,281,338 B2 3/2022 Skagmo et al.
11,301,089 B2 4/2022 Christiansson et al.
11,474,644 B2 10/2022 Kocovski et al.
11,567,610 B2 1/2023 Bergström et al.
11,579,731 B2 2/2023 Kocovski et al.
11,579,732 B2 2/2023 Skagmo et al.
11,650,699 B2 5/2023 Bergström et al.
11,740,741 B2 8/2023 Bergström et al.
11,868,568 B2 1/2024 Kocovski et al.
11,893,189 B2 2/2024 Bergström et al.
11,909,033 B2 2/2024 Tsuzuki et al.
11,914,819 B2 2/2024 Kocovski et al.
11,943,563 B2 3/2024 Wassvik et al.
12,055,969 B2 8/2024 Svensson et al.
12,056,316 B2 8/2024 Andersson et al.
12,086,362 B2 9/2024 Bergström et al.
12,135,847 B2 11/2024 Andreasson
12,175,044 B2 12/2024 Bergström et al.
12,282,653 B2 4/2025 Andreasson et al.
12,386,461 B2 8/2025 Bergström et al.
12,461,630 B2 11/2025 Andersson et al.
12,524,116 B2 1/2026 Bergström et al.
12,524,117 B2 1/2026 Bergström et al.
2001/0002694 A1 6/2001 Nakazawa et al.
2001/0005004 A1 6/2001 Shiratsuki et al.
2001/0005308 A1 6/2001 Oishi et al.
2001/0030642 A1 10/2001 Sullivan et al.
2001/0055411 A1 12/2001 Black
2002/0067348 A1 6/2002 Masters et al.
2002/0075243 A1 6/2002 Newton
2002/0085003 A1 7/2002 Nagashima
2002/0118177 A1 8/2002 Newton
2002/0130883 A1 9/2002 Huang et al.
2002/0158823 A1 10/2002 Zavracky et al.
2002/0158853 A1 10/2002 Sugawara et al.
2002/0163505 A1 11/2002 Takekawa
2002/0175901 A1 11/2002 Gettemy
2003/0016450 A1 1/2003 Bluemel et al.
2003/0034439 A1 2/2003 Reime et al.
2003/0034935 A1 2/2003 Amanai et al.
2003/0048257 A1 3/2003 Mattila
2003/0052257 A1 3/2003 Sumriddetchkajorn
2003/0085882 A1 5/2003 Lu

(56) References Cited

U.S. PATENT DOCUMENTS

| | | | |
|---|---|---|---|
| 2003/0095399 | A1 | 5/2003 | Grenda et al. |
| 2003/0107748 | A1 | 6/2003 | Lee |
| 2003/0137494 | A1 | 7/2003 | Tulbert |
| 2003/0156100 | A1 | 8/2003 | Gettemy |
| 2003/0160155 | A1 | 8/2003 | Liess |
| 2003/0210537 | A1 | 11/2003 | Engelmann |
| 2003/0214486 | A1 | 11/2003 | Roberts |
| 2004/0027339 | A1 | 2/2004 | Schulz |
| 2004/0032401 | A1 | 2/2004 | Nakazawa et al. |
| 2004/0090432 | A1 | 5/2004 | Takahashi et al. |
| 2004/0109664 | A1 | 6/2004 | Ohtsuki et al. |
| 2004/0130338 | A1 | 7/2004 | Wang et al. |
| 2004/0134772 | A1 | 7/2004 | Cohen et al. |
| 2004/0136564 | A1 | 7/2004 | Roeber et al. |
| 2004/0174541 | A1 | 9/2004 | Freifeld |
| 2004/0179001 | A1 | 9/2004 | Morrison et al. |
| 2004/0201579 | A1 | 10/2004 | Graham |
| 2004/0212603 | A1 | 10/2004 | Cok |
| 2004/0238627 | A1 | 12/2004 | Silverbrook et al. |
| 2004/0239702 | A1 | 12/2004 | Kang et al. |
| 2004/0245438 | A1 | 12/2004 | Payne et al. |
| 2004/0252091 | A1 | 12/2004 | Ma et al. |
| 2004/0252867 | A1 | 12/2004 | Lan et al. |
| 2005/0005319 | A1 | 1/2005 | Della-Cioppa et al. |
| 2005/0012714 | A1 | 1/2005 | Russo et al. |
| 2005/0022130 | A1 | 1/2005 | Fabritius |
| 2005/0024624 | A1 | 2/2005 | Gruhlke et al. |
| 2005/0041013 | A1 | 2/2005 | Tanaka |
| 2005/0052635 | A1 | 3/2005 | Xie et al. |
| 2005/0053191 | A1 | 3/2005 | Gohno et al. |
| 2005/0057522 | A1 | 3/2005 | Godler |
| 2005/0057903 | A1 | 3/2005 | Choi |
| 2005/0073508 | A1 | 4/2005 | Pittel et al. |
| 2005/0083293 | A1 | 4/2005 | Dixon |
| 2005/0092900 | A1 | 5/2005 | Reime et al. |
| 2005/0128190 | A1 | 6/2005 | Ryynanen |
| 2005/0143923 | A1 | 6/2005 | Keers et al. |
| 2005/0156914 | A1 | 7/2005 | Lipman et al. |
| 2005/0162398 | A1 | 7/2005 | Eliasson et al. |
| 2005/0168134 | A1 | 8/2005 | Nishikawa |
| 2005/0179977 | A1 | 8/2005 | Chui et al. |
| 2005/0200613 | A1 | 9/2005 | Kobayashi et al. |
| 2005/0212774 | A1 | 9/2005 | Ho et al. |
| 2005/0237317 | A1 | 10/2005 | Cok |
| 2005/0248540 | A1 | 11/2005 | Newton |
| 2005/0248848 | A1 | 11/2005 | Whitehead et al. |
| 2005/0253834 | A1 | 11/2005 | Sakamaki et al. |
| 2005/0276053 | A1 | 12/2005 | Nortrup et al. |
| 2006/0001650 | A1 | 1/2006 | Robbins et al. |
| 2006/0001653 | A1 | 1/2006 | Smits |
| 2006/0007185 | A1 | 1/2006 | Kobayashi |
| 2006/0008164 | A1 | 1/2006 | Wu et al. |
| 2006/0013353 | A1 | 1/2006 | Hein |
| 2006/0017706 | A1 | 1/2006 | Cutherell et al. |
| 2006/0017709 | A1 | 1/2006 | Okano |
| 2006/0033725 | A1 | 2/2006 | Marggraff et al. |
| 2006/0038698 | A1 | 2/2006 | Chen |
| 2006/0061861 | A1 | 3/2006 | Munro et al. |
| 2006/0066586 | A1 | 3/2006 | Gally et al. |
| 2006/0098004 | A1 | 5/2006 | Cok |
| 2006/0114237 | A1 | 6/2006 | Crockett et al. |
| 2006/0132454 | A1 | 6/2006 | Chen et al. |
| 2006/0139340 | A1 | 6/2006 | Geaghan |
| 2006/0144237 | A1 | 7/2006 | Liang et al. |
| 2006/0158437 | A1 | 7/2006 | Blythe et al. |
| 2006/0161871 | A1 | 7/2006 | Hotelling et al. |
| 2006/0164443 | A1 | 7/2006 | Kettle et al. |
| 2006/0170658 | A1 | 8/2006 | Nakamura et al. |
| 2006/0182345 | A1 | 8/2006 | Geidl et al. |
| 2006/0202974 | A1 | 9/2006 | Thielman |
| 2006/0227120 | A1 | 10/2006 | Eikman |
| 2006/0254513 | A1 | 11/2006 | Kang et al. |
| 2006/0255248 | A1 | 11/2006 | Eliasson |
| 2006/0256092 | A1 | 11/2006 | Lee |
| 2006/0279558 | A1 | 12/2006 | Van et al. |
| 2006/0281543 | A1 | 12/2006 | Sutton et al. |
| 2006/0290684 | A1 | 12/2006 | Giraldo et al. |
| 2007/0014486 | A1 | 1/2007 | Schiwietz et al. |
| 2007/0024598 | A1 | 2/2007 | Miller et al. |
| 2007/0034783 | A1 | 2/2007 | Eliasson et al. |
| 2007/0038691 | A1 | 2/2007 | Candes et al. |
| 2007/0052684 | A1 | 3/2007 | Gruhlke et al. |
| 2007/0070056 | A1 | 3/2007 | Sato et al. |
| 2007/0075648 | A1 | 4/2007 | Blythe et al. |
| 2007/0083575 | A1 | 4/2007 | Leung et al. |
| 2007/0120833 | A1 | 5/2007 | Yamaguchi et al. |
| 2007/0125937 | A1 | 6/2007 | Eliasson et al. |
| 2007/0132710 | A1 | 6/2007 | Tateuchi et al. |
| 2007/0146337 | A1 | 6/2007 | Ording et al. |
| 2007/0152985 | A1 | 7/2007 | Ostergaard et al. |
| 2007/0165008 | A1 | 7/2007 | Crockett |
| 2007/0176162 | A1 | 8/2007 | Kang |
| 2007/0195404 | A1 | 8/2007 | Iijima |
| 2007/0201042 | A1 | 8/2007 | Eliasson et al. |
| 2007/0285406 | A1 | 12/2007 | Kukulj et al. |
| 2007/0296688 | A1 | 12/2007 | Nakamura et al. |
| 2008/0006766 | A1 | 1/2008 | Oon et al. |
| 2008/0007540 | A1 | 1/2008 | Ostergaard |
| 2008/0007541 | A1 | 1/2008 | Eliasson et al. |
| 2008/0007542 | A1 | 1/2008 | Eliasson et al. |
| 2008/0011944 | A1 | 1/2008 | Chua et al. |
| 2008/0012835 | A1 | 1/2008 | Rimon et al. |
| 2008/0029691 | A1 | 2/2008 | Han |
| 2008/0036743 | A1 | 2/2008 | Westerman et al. |
| 2008/0062150 | A1 | 3/2008 | Lee |
| 2008/0068691 | A1 | 3/2008 | Miyatake |
| 2008/0074401 | A1 | 3/2008 | Chung et al. |
| 2008/0074402 | A1 | 3/2008 | Cornish et al. |
| 2008/0080811 | A1 | 4/2008 | Deane |
| 2008/0088603 | A1 | 4/2008 | Eliasson et al. |
| 2008/0115081 | A1 | 5/2008 | Sankaravadivelu et al. |
| 2008/0121442 | A1 | 5/2008 | Boer et al. |
| 2008/0122792 | A1 | 5/2008 | Izadi et al. |
| 2008/0122803 | A1 | 5/2008 | Izadi et al. |
| 2008/0130979 | A1 | 6/2008 | Ren et al. |
| 2008/0133265 | A1 | 6/2008 | Silkaitis et al. |
| 2008/0150846 | A1 | 6/2008 | Chung |
| 2008/0150848 | A1 | 6/2008 | Chung et al. |
| 2008/0150915 | A1 | 6/2008 | Shibue et al. |
| 2008/0151126 | A1 | 6/2008 | Yu |
| 2008/0158176 | A1 | 7/2008 | Land et al. |
| 2008/0180404 | A1 | 7/2008 | Han et al. |
| 2008/0189046 | A1 | 8/2008 | Eliasson et al. |
| 2008/0192025 | A1 | 8/2008 | Jaeger et al. |
| 2008/0198144 | A1 | 8/2008 | Shimizu et al. |
| 2008/0238433 | A1 | 10/2008 | Joutsenoja et al. |
| 2008/0246388 | A1 | 10/2008 | Cheon et al. |
| 2008/0252619 | A1 | 10/2008 | Crockett et al. |
| 2008/0259975 | A1 | 10/2008 | Kamijima |
| 2008/0266266 | A1 | 10/2008 | Kent et al. |
| 2008/0278460 | A1 | 11/2008 | Arnett et al. |
| 2008/0280952 | A1 | 11/2008 | Giblin et al. |
| 2008/0284925 | A1 | 11/2008 | Han |
| 2008/0285406 | A1 | 11/2008 | Moro et al. |
| 2008/0291668 | A1 | 11/2008 | Aylward et al. |
| 2008/0297482 | A1 | 12/2008 | Weiss |
| 2008/0297998 | A1 | 12/2008 | Choi |
| 2008/0309626 | A1 | 12/2008 | Westerman et al. |
| 2009/0000831 | A1 | 1/2009 | Miller et al. |
| 2009/0002340 | A1 | 1/2009 | Van Genechten |
| 2009/0006292 | A1 | 1/2009 | Block |
| 2009/0013562 | A1 | 1/2009 | Pelletier |
| 2009/0040786 | A1 | 2/2009 | Mori |
| 2009/0058832 | A1 | 3/2009 | Newton |
| 2009/0058833 | A1 | 3/2009 | Newton |
| 2009/0066647 | A1 | 3/2009 | Kerr et al. |
| 2009/0067178 | A1 | 3/2009 | Huang et al. |
| 2009/0073142 | A1 | 3/2009 | Yamashita et al. |
| 2009/0077501 | A1 | 3/2009 | Partridge et al. |
| 2009/0085894 | A1 | 4/2009 | Gandhi et al. |
| 2009/0091554 | A1 | 4/2009 | Keam |
| 2009/0100383 | A1 | 4/2009 | Sunday et al. |
| 2009/0115919 | A1 | 5/2009 | Tanaka et al. |
| 2009/0122020 | A1 | 5/2009 | Eliasson et al. |

(56) References Cited

U.S. PATENT DOCUMENTS

| | | | |
|---|---|---|---|
| 2009/0122027 | A1 | 5/2009 | Newton |
| 2009/0127005 | A1 | 5/2009 | Zachut et al. |
| 2009/0128499 | A1 | 5/2009 | Izadi et al. |
| 2009/0128508 | A1 | 5/2009 | Sohn et al. |
| 2009/0135162 | A1 | 5/2009 | Van et al. |
| 2009/0143141 | A1 | 6/2009 | Wells et al. |
| 2009/0153519 | A1 | 6/2009 | Suarez Rovere |
| 2009/0161026 | A1 | 6/2009 | Wu et al. |
| 2009/0168459 | A1 | 7/2009 | Holman et al. |
| 2009/0174679 | A1 | 7/2009 | Westerman |
| 2009/0187842 | A1 | 7/2009 | Collins et al. |
| 2009/0189857 | A1 | 7/2009 | Benko et al. |
| 2009/0189874 | A1 | 7/2009 | Chene et al. |
| 2009/0189878 | A1 | 7/2009 | Goertz et al. |
| 2009/0209420 | A1 | 8/2009 | Kalgutkar et al. |
| 2009/0219256 | A1 | 9/2009 | Newton |
| 2009/0229892 | A1 | 9/2009 | Fisher et al. |
| 2009/0251439 | A1 | 10/2009 | Westerman et al. |
| 2009/0254869 | A1 | 10/2009 | Ludwig et al. |
| 2009/0256817 | A1 | 10/2009 | Perlin et al. |
| 2009/0259967 | A1 | 10/2009 | Davidson et al. |
| 2009/0267919 | A1 | 10/2009 | Chao et al. |
| 2009/0273794 | A1 | 11/2009 | Oestergaard et al. |
| 2009/0273795 | A1 | 11/2009 | Bacher et al. |
| 2009/0278795 | A1 | 11/2009 | Hansen et al. |
| 2009/0278816 | A1 | 11/2009 | Colson |
| 2009/0278913 | A1 | 11/2009 | Rosenfeld et al. |
| 2009/0295752 | A1 | 12/2009 | Liu et al. |
| 2009/0297009 | A1 | 12/2009 | Xu et al. |
| 2010/0007331 | A1 | 1/2010 | Hawkins et al. |
| 2010/0014024 | A1 | 1/2010 | Tatsumi et al. |
| 2010/0026667 | A1 | 2/2010 | Bernstein |
| 2010/0033444 | A1 | 2/2010 | Kobayashi |
| 2010/0038545 | A1 | 2/2010 | Cavallucci et al. |
| 2010/0045629 | A1 | 2/2010 | Newton |
| 2010/0045634 | A1 | 2/2010 | Su et al. |
| 2010/0057235 | A1 | 3/2010 | Wang et al. |
| 2010/0059295 | A1 | 3/2010 | Hotelling et al. |
| 2010/0060896 | A1 | 3/2010 | Van et al. |
| 2010/0066016 | A1 | 3/2010 | Van et al. |
| 2010/0066704 | A1 | 3/2010 | Kasai |
| 2010/0073318 | A1 | 3/2010 | Hu et al. |
| 2010/0073327 | A1 | 3/2010 | Mau et al. |
| 2010/0078545 | A1 | 4/2010 | Leong et al. |
| 2010/0079407 | A1 | 4/2010 | Suggs |
| 2010/0079408 | A1 | 4/2010 | Leong et al. |
| 2010/0097345 | A1 | 4/2010 | Jang et al. |
| 2010/0097348 | A1 | 4/2010 | Park et al. |
| 2010/0097353 | A1 | 4/2010 | Newton |
| 2010/0103133 | A1 | 4/2010 | Park et al. |
| 2010/0125438 | A1 | 5/2010 | Audet |
| 2010/0127975 | A1 | 5/2010 | Jensen |
| 2010/0128985 | A1 | 5/2010 | El-Sana et al. |
| 2010/0130257 | A1 | 5/2010 | Jang |
| 2010/0130280 | A1 | 5/2010 | Arezina et al. |
| 2010/0133409 | A1 | 6/2010 | Park et al. |
| 2010/0134435 | A1 | 6/2010 | Kimura et al. |
| 2010/0141604 | A1 | 6/2010 | Cai et al. |
| 2010/0142823 | A1 | 6/2010 | Wang et al. |
| 2010/0166276 | A1 | 7/2010 | Dube et al. |
| 2010/0176732 | A1 | 7/2010 | Schenk et al. |
| 2010/0187422 | A1 | 7/2010 | Kothari et al. |
| 2010/0189376 | A1 | 7/2010 | Bertram et al. |
| 2010/0193259 | A1 | 8/2010 | Wassvik |
| 2010/0195804 | A1 | 8/2010 | Dafni et al. |
| 2010/0207874 | A1 | 8/2010 | Yuxin et al. |
| 2010/0229091 | A1 | 9/2010 | Homma et al. |
| 2010/0238139 | A1 | 9/2010 | Goertz et al. |
| 2010/0238686 | A1 | 9/2010 | Weber et al. |
| 2010/0245292 | A1 | 9/2010 | Wu |
| 2010/0253645 | A1 | 10/2010 | Bolender |
| 2010/0259939 | A1 | 10/2010 | Chen et al. |
| 2010/0265170 | A1 | 10/2010 | Norieda |
| 2010/0277431 | A1 | 11/2010 | Klinghult |
| 2010/0277436 | A1 | 11/2010 | Feng et al. |
| 2010/0277728 | A1 | 11/2010 | Imura |
| 2010/0283785 | A1 | 11/2010 | Satulovsky |
| 2010/0284596 | A1 | 11/2010 | Miao et al. |
| 2010/0289754 | A1 | 11/2010 | Sleeman et al. |
| 2010/0295821 | A1 | 11/2010 | Chang et al. |
| 2010/0302196 | A1 | 12/2010 | Han et al. |
| 2010/0302209 | A1 | 12/2010 | Large |
| 2010/0302210 | A1 | 12/2010 | Han et al. |
| 2010/0302240 | A1 | 12/2010 | Lettvin |
| 2010/0309139 | A1 | 12/2010 | Ng |
| 2010/0315379 | A1 | 12/2010 | Allard et al. |
| 2010/0321328 | A1 | 12/2010 | Chang et al. |
| 2010/0321341 | A1 | 12/2010 | Cho et al. |
| 2010/0322550 | A1 | 12/2010 | Trott |
| 2010/0325547 | A1 | 12/2010 | Keng et al. |
| 2010/0328265 | A1 | 12/2010 | Hotelling et al. |
| 2011/0007021 | A1 | 1/2011 | Bernstein et al. |
| 2011/0037735 | A1 | 2/2011 | Land et al. |
| 2011/0043490 | A1 | 2/2011 | Powell et al. |
| 2011/0049388 | A1 | 3/2011 | Delaney et al. |
| 2011/0050576 | A1 | 3/2011 | Forutanpour et al. |
| 2011/0050649 | A1 | 3/2011 | Newton et al. |
| 2011/0051394 | A1 | 3/2011 | Bailey |
| 2011/0057102 | A1 | 3/2011 | Yao |
| 2011/0065424 | A1 | 3/2011 | Estevez et al. |
| 2011/0068256 | A1 | 3/2011 | Hong et al. |
| 2011/0069039 | A1 | 3/2011 | Lee et al. |
| 2011/0069807 | A1 | 3/2011 | Dennerlein et al. |
| 2011/0074725 | A1 | 3/2011 | Westerman et al. |
| 2011/0074734 | A1 | 3/2011 | Wassvik et al. |
| 2011/0074735 | A1 | 3/2011 | Wassvik et al. |
| 2011/0080361 | A1 | 4/2011 | Miller et al. |
| 2011/0084939 | A1 | 4/2011 | Gepner et al. |
| 2011/0090176 | A1 | 4/2011 | Christiansson et al. |
| 2011/0096293 | A1 | 4/2011 | Hirose et al. |
| 2011/0102320 | A1 | 5/2011 | Hauke et al. |
| 2011/0102374 | A1 | 5/2011 | Wassvik et al. |
| 2011/0102538 | A1 | 5/2011 | Tan |
| 2011/0115748 | A1 | 5/2011 | Xu |
| 2011/0121323 | A1 | 5/2011 | Wu et al. |
| 2011/0122075 | A1 | 5/2011 | Seo et al. |
| 2011/0122091 | A1 | 5/2011 | King et al. |
| 2011/0122094 | A1 | 5/2011 | Tsang et al. |
| 2011/0134079 | A1 | 6/2011 | Stark |
| 2011/0140106 | A1 | 6/2011 | Forbes |
| 2011/0141062 | A1 | 6/2011 | Yu et al. |
| 2011/0147569 | A1 | 6/2011 | Drumm |
| 2011/0148820 | A1 | 6/2011 | Song |
| 2011/0157095 | A1 | 6/2011 | Drumm |
| 2011/0157096 | A1 | 6/2011 | Drumm |
| 2011/0163996 | A1 | 7/2011 | Wassvik et al. |
| 2011/0163997 | A1 | 7/2011 | Kim |
| 2011/0163998 | A1 | 7/2011 | Goertz et al. |
| 2011/0169756 | A1 | 7/2011 | Ogawa et al. |
| 2011/0169780 | A1 | 7/2011 | Goertz et al. |
| 2011/0175852 | A1 | 7/2011 | Goertz et al. |
| 2011/0181552 | A1 | 7/2011 | Goertz et al. |
| 2011/0199297 | A1 | 8/2011 | Antonyuk et al. |
| 2011/0205186 | A1 | 8/2011 | Newton et al. |
| 2011/0205189 | A1 | 8/2011 | Newton |
| 2011/0205750 | A1 | 8/2011 | Krijn et al. |
| 2011/0210946 | A1 | 9/2011 | Goertz et al. |
| 2011/0216042 | A1 | 9/2011 | Wassvik et al. |
| 2011/0220794 | A1 | 9/2011 | Censor et al. |
| 2011/0221705 | A1 | 9/2011 | Yi et al. |
| 2011/0221997 | A1 | 9/2011 | Kim et al. |
| 2011/0227036 | A1 | 9/2011 | Vaufrey |
| 2011/0234537 | A1 | 9/2011 | Kim et al. |
| 2011/0254864 | A1 | 10/2011 | Tsuchikawa et al. |
| 2011/0255305 | A1 | 10/2011 | Chen et al. |
| 2011/0260829 | A1 | 10/2011 | Lee |
| 2011/0261020 | A1 | 10/2011 | Song et al. |
| 2011/0266423 | A1 | 11/2011 | Koeppe et al. |
| 2011/0267264 | A1 | 11/2011 | Mccarthy et al. |
| 2011/0267296 | A1 | 11/2011 | Noguchi et al. |
| 2011/0287317 | A1 | 11/2011 | Nakanishi |
| 2011/0291944 | A1 | 12/2011 | Simmons et al. |
| 2011/0291988 | A1 | 12/2011 | Bamji et al. |
| 2011/0291989 | A1 | 12/2011 | Lee |

(56) References Cited

U.S. PATENT DOCUMENTS

| | | | |
|---|---|---|---|
| 2011/0298743 | A1 | 12/2011 | Machida et al. |
| 2011/0304577 | A1 | 12/2011 | Brown et al. |
| 2011/0309325 | A1 | 12/2011 | Park et al. |
| 2011/0310045 | A1 | 12/2011 | Toda et al. |
| 2011/0310537 | A1 | 12/2011 | Imamura et al. |
| 2011/0316005 | A1 | 12/2011 | Murao et al. |
| 2012/0007835 | A1 | 1/2012 | Chang et al. |
| 2012/0017182 | A1 | 1/2012 | Bau |
| 2012/0019448 | A1 | 1/2012 | Pitkanen et al. |
| 2012/0026408 | A1 | 2/2012 | Lee et al. |
| 2012/0038593 | A1 | 2/2012 | Roenkae et al. |
| 2012/0044572 | A1 | 2/2012 | Simmonds et al. |
| 2012/0045170 | A1 | 2/2012 | Shibata et al. |
| 2012/0050336 | A1 | 3/2012 | Nave et al. |
| 2012/0056081 | A1 | 3/2012 | Kozodoy |
| 2012/0056807 | A1 | 3/2012 | Chapman et al. |
| 2012/0056814 | A1 | 3/2012 | Sudo |
| 2012/0062474 | A1 | 3/2012 | Weishaupt et al. |
| 2012/0062489 | A1 | 3/2012 | Andersson et al. |
| 2012/0062492 | A1 | 3/2012 | Katoh |
| 2012/0068973 | A1 | 3/2012 | Christiansson et al. |
| 2012/0075213 | A1 | 3/2012 | Huang et al. |
| 2012/0086673 | A1 | 4/2012 | Chien et al. |
| 2012/0089348 | A1 | 4/2012 | Perlin et al. |
| 2012/0091912 | A1 | 4/2012 | Brown Elliott |
| 2012/0096383 | A1 | 4/2012 | Sakamoto et al. |
| 2012/0098733 | A1 | 4/2012 | Masuda et al. |
| 2012/0110447 | A1 | 5/2012 | Chen |
| 2012/0131490 | A1 | 5/2012 | Lin et al. |
| 2012/0139866 | A1 | 6/2012 | Jung et al. |
| 2012/0141001 | A1 | 6/2012 | Zhang et al. |
| 2012/0146930 | A1 | 6/2012 | Lee |
| 2012/0146950 | A1 | 6/2012 | Park et al. |
| 2012/0146957 | A1 | 6/2012 | Dunagan |
| 2012/0153134 | A1 | 6/2012 | Bergstroem et al. |
| 2012/0154338 | A1 | 6/2012 | Bergstroem et al. |
| 2012/0154339 | A1 | 6/2012 | Land et al. |
| 2012/0162142 | A1 | 6/2012 | Christiansson et al. |
| 2012/0162144 | A1 | 6/2012 | Faahraeus et al. |
| 2012/0169672 | A1 | 7/2012 | Christiansson |
| 2012/0170056 | A1 | 7/2012 | Jakobsen et al. |
| 2012/0173343 | A1 | 7/2012 | Koning |
| 2012/0176328 | A1 | 7/2012 | Brown et al. |
| 2012/0176343 | A1 | 7/2012 | Holmgren et al. |
| 2012/0181419 | A1 | 7/2012 | Momtahan |
| 2012/0182266 | A1 | 7/2012 | Han |
| 2012/0188205 | A1 | 7/2012 | Jansson et al. |
| 2012/0188206 | A1 | 7/2012 | Sparf et al. |
| 2012/0191993 | A1 | 7/2012 | Drader et al. |
| 2012/0200532 | A1 | 8/2012 | Powell et al. |
| 2012/0200538 | A1 | 8/2012 | Christiansson et al. |
| 2012/0206375 | A1 | 8/2012 | Fyke et al. |
| 2012/0212441 | A1 | 8/2012 | Christiansson et al. |
| 2012/0212457 | A1 | 8/2012 | Drumm |
| 2012/0217882 | A1 | 8/2012 | Wong et al. |
| 2012/0218200 | A1 | 8/2012 | Glazer et al. |
| 2012/0218229 | A1 | 8/2012 | Drumm |
| 2012/0221715 | A1 | 8/2012 | Hamada |
| 2012/0223916 | A1 | 9/2012 | Kukulj |
| 2012/0235892 | A1 | 9/2012 | Narendra et al. |
| 2012/0235955 | A1 | 9/2012 | Ng et al. |
| 2012/0242622 | A1 | 9/2012 | Tseng et al. |
| 2012/0249477 | A1 | 10/2012 | Popovich et al. |
| 2012/0249478 | A1 | 10/2012 | Chang et al. |
| 2012/0249485 | A1 | 10/2012 | Ye et al. |
| 2012/0256882 | A1 | 10/2012 | Christiansson et al. |
| 2012/0257004 | A1 | 10/2012 | Smith et al. |
| 2012/0262407 | A1 | 10/2012 | Hinckley et al. |
| 2012/0268403 | A1 | 10/2012 | Christiansson |
| 2012/0268427 | A1 | 10/2012 | Slobodin |
| 2012/0274559 | A1 | 11/2012 | Mathai et al. |
| 2012/0274583 | A1 | 11/2012 | Haggerty |
| 2012/0299852 | A1 | 11/2012 | Hsu et al. |
| 2012/0305755 | A1 | 12/2012 | Hong et al. |
| 2012/0313865 | A1 | 12/2012 | Pearce |
| 2013/0002536 | A1 | 1/2013 | Yoshida et al. |
| 2013/0007579 | A1 | 1/2013 | Dancy et al. |
| 2013/0016059 | A1 | 1/2013 | Lowles et al. |
| 2013/0021300 | A1 | 1/2013 | Wassvik |
| 2013/0021302 | A1 | 1/2013 | Drumm |
| 2013/0027404 | A1 | 1/2013 | Sarnoff |
| 2013/0050141 | A1 | 2/2013 | Park et al. |
| 2013/0055080 | A1 | 2/2013 | Komer et al. |
| 2013/0055143 | A1 | 2/2013 | Martin et al. |
| 2013/0076697 | A1 | 3/2013 | Goertz et al. |
| 2013/0082980 | A1 | 4/2013 | Gruhlke et al. |
| 2013/0093838 | A1 | 4/2013 | Tan et al. |
| 2013/0106709 | A1 | 5/2013 | Simmons |
| 2013/0107569 | A1 | 5/2013 | Suganuma |
| 2013/0113715 | A1 | 5/2013 | Grant et al. |
| 2013/0120274 | A1 | 5/2013 | Ha et al. |
| 2013/0120320 | A1 | 5/2013 | Liu et al. |
| 2013/0120324 | A1 | 5/2013 | Diverdi et al. |
| 2013/0125016 | A1 | 5/2013 | Pallakoff et al. |
| 2013/0127765 | A1 | 5/2013 | Behdasht et al. |
| 2013/0127790 | A1 | 5/2013 | Wassvik |
| 2013/0135258 | A1 | 5/2013 | King et al. |
| 2013/0135259 | A1 | 5/2013 | King et al. |
| 2013/0136304 | A1 | 5/2013 | Anabuki et al. |
| 2013/0141388 | A1 | 6/2013 | Ludwig et al. |
| 2013/0141395 | A1 | 6/2013 | Holmgren et al. |
| 2013/0141397 | A1 | 6/2013 | Dunagan |
| 2013/0155027 | A1 | 6/2013 | Holmgren et al. |
| 2013/0155655 | A1 | 6/2013 | Lee et al. |
| 2013/0155723 | A1 | 6/2013 | Coleman |
| 2013/0158504 | A1 | 6/2013 | Ruchti et al. |
| 2013/0162588 | A1 | 6/2013 | Wen |
| 2013/0181896 | A1 | 7/2013 | Gruhlke et al. |
| 2013/0181908 | A1 | 7/2013 | Santiago et al. |
| 2013/0181953 | A1 | 7/2013 | Hinckley et al. |
| 2013/0187891 | A1 | 7/2013 | Eriksson et al. |
| 2013/0187957 | A1 | 7/2013 | Andersson et al. |
| 2013/0201142 | A1 | 8/2013 | Suarez Rovere |
| 2013/0205963 | A1 | 8/2013 | Prochello et al. |
| 2013/0208506 | A1 | 8/2013 | Ye et al. |
| 2013/0222344 | A1 | 8/2013 | Lu et al. |
| 2013/0222346 | A1 | 8/2013 | Chen et al. |
| 2013/0229357 | A1 | 9/2013 | Powell et al. |
| 2013/0234991 | A1 | 9/2013 | Sparf |
| 2013/0241886 | A1 | 9/2013 | Eriksson et al. |
| 2013/0241887 | A1 | 9/2013 | Sharma |
| 2013/0249833 | A1 | 9/2013 | Christiansson et al. |
| 2013/0250354 | A1 | 9/2013 | Kato et al. |
| 2013/0254314 | A1 | 9/2013 | Chow |
| 2013/0257793 | A1 | 10/2013 | Zeliff et al. |
| 2013/0257810 | A1 | 10/2013 | Niu et al. |
| 2013/0263042 | A1 | 10/2013 | Buening |
| 2013/0263240 | A1 | 10/2013 | Moskovitch |
| 2013/0269867 | A1 | 10/2013 | Trott |
| 2013/0271487 | A1 | 10/2013 | Lincoln |
| 2013/0275082 | A1 | 10/2013 | Follmer et al. |
| 2013/0279190 | A1 | 10/2013 | Huang |
| 2013/0285920 | A1 | 10/2013 | Colley |
| 2013/0285968 | A1 | 10/2013 | Christiansson et al. |
| 2013/0285977 | A1 | 10/2013 | Baharav et al. |
| 2013/0300714 | A1 | 11/2013 | Goh et al. |
| 2013/0307795 | A1 | 11/2013 | Suarez Rovere |
| 2013/0307796 | A1 | 11/2013 | Liu et al. |
| 2013/0314368 | A1 | 11/2013 | Li et al. |
| 2013/0321740 | A1 | 12/2013 | An et al. |
| 2013/0328790 | A1 | 12/2013 | Liu et al. |
| 2013/0342490 | A1 | 12/2013 | Wallander et al. |
| 2014/0002400 | A1 | 1/2014 | Christiansson et al. |
| 2014/0009430 | A1 | 1/2014 | Italia et al. |
| 2014/0015803 | A1 | 1/2014 | Drumm |
| 2014/0028575 | A1 | 1/2014 | Parivar et al. |
| 2014/0028604 | A1 | 1/2014 | Morinaga et al. |
| 2014/0028629 | A1 | 1/2014 | Drumm et al. |
| 2014/0032735 | A1 | 1/2014 | Kapoor |
| 2014/0035836 | A1 | 2/2014 | Cui et al. |
| 2014/0036203 | A1 | 2/2014 | Guillou et al. |
| 2014/0055421 | A1 | 2/2014 | Christiansson et al. |
| 2014/0063853 | A1 | 3/2014 | Nichol et al. |
| 2014/0071653 | A1 | 3/2014 | Thompson et al. |

(56) References Cited

U.S. PATENT DOCUMENTS

2014/0085241 A1 3/2014 Christiansson et al.
2014/0092052 A1 4/2014 Grunthaner et al.
2014/0098032 A1 4/2014 Ng et al.
2014/0098058 A1 4/2014 Baharav et al.
2014/0104190 A1 4/2014 Davidson
2014/0104195 A1 4/2014 Davidson
2014/0109219 A1 4/2014 Rohrweck et al.
2014/0111416 A1 4/2014 Sugiura
2014/0111478 A1 4/2014 Lin et al.
2014/0111480 A1 4/2014 Kim et al.
2014/0118295 A1 5/2014 Motoi
2014/0139467 A1 5/2014 Ghosh et al.
2014/0149880 A1 5/2014 Farouki
2014/0152624 A1 6/2014 Piot et al.
2014/0160762 A1 6/2014 Dudik et al.
2014/0168153 A1 6/2014 Deichmann et al.
2014/0192023 A1 7/2014 Hoffman
2014/0204036 A1 7/2014 Schillings et al.
2014/0210793 A1 7/2014 Eriksson et al.
2014/0218467 A1 8/2014 You et al.
2014/0225868 A1 8/2014 Huang et al.
2014/0226084 A1 8/2014 Utukuri et al.
2014/0226266 A1 8/2014 Kang et al.
2014/0232669 A1 8/2014 Ohlsson et al.
2014/0237401 A1 8/2014 Krus et al.
2014/0237408 A1 8/2014 Ohlsson et al.
2014/0237422 A1 8/2014 Ohlsson et al.
2014/0253514 A1 9/2014 Omura et al.
2014/0253520 A1 9/2014 Cueto et al.
2014/0253831 A1 9/2014 Craven-Bartle
2014/0259029 A1 9/2014 Choi et al.
2014/0267147 A1 9/2014 Buelow et al.
2014/0292690 A1 10/2014 Sugihara
2014/0292699 A1 10/2014 Ando
2014/0292701 A1 10/2014 Christiansson et al.
2014/0300572 A1 10/2014 Ohlsson et al.
2014/0320459 A1 10/2014 Pettersson et al.
2014/0324953 A1 10/2014 Seo et al.
2014/0334767 A1 11/2014 Lim et al.
2014/0362046 A1 12/2014 Yoshida
2014/0362053 A1 12/2014 Holmgren et al.
2014/0362404 A1 12/2014 Miyasaka
2014/0367873 A1 12/2014 Yang et al.
2014/0375607 A1 12/2014 Christiansson et al.
2014/0380193 A1 12/2014 Coplen et al.
2015/0002386 A1 1/2015 Mankowski et al.
2015/0002470 A1 1/2015 Zhu et al.
2015/0009687 A1 1/2015 Lin
2015/0015497 A1 1/2015 Leigh
2015/0026630 A1 1/2015 Bullock
2015/0035774 A1 2/2015 Christiansson et al.
2015/0035803 A1 2/2015 Wassvik et al.
2015/0053850 A1 2/2015 Krister
2015/0054759 A1 2/2015 Christiansson et al.
2015/0054791 A1 2/2015 Omura
2015/0062021 A1 3/2015 Skaljak et al.
2015/0062085 A1 3/2015 Lu et al.
2015/0070327 A1 3/2015 Hsieh et al.
2015/0083891 A1 3/2015 Wallander
2015/0091832 A1 4/2015 Mizunuma et al.
2015/0091875 A1 4/2015 Li
2015/0092233 A1 4/2015 Park et al.
2015/0103013 A9 4/2015 Huang
2015/0103051 A1 4/2015 Wyrwas et al.
2015/0109403 A1 4/2015 Krishnan et al.
2015/0121691 A1 5/2015 Wang
2015/0131010 A1 5/2015 Sugiyama
2015/0138105 A1 5/2015 Christiansson et al.
2015/0138161 A1 5/2015 Wassvik
2015/0154291 A1 6/2015 Shepherd et al.
2015/0160851 A1 6/2015 Michihata et al.
2015/0169948 A1 6/2015 Motoi
2015/0193141 A1 7/2015 Goldsmith et al.
2015/0193585 A1 7/2015 Sunna
2015/0194668 A1 7/2015 Ueda et al.
2015/0199071 A1 7/2015 Hou
2015/0205439 A1 7/2015 Xu et al.
2015/0205441 A1 7/2015 Bergstrm et al.
2015/0212607 A1 7/2015 Miller et al.
2015/0215450 A1 7/2015 Seo et al.
2015/0227261 A1 8/2015 Huang et al.
2015/0242055 A1 8/2015 Wallander
2015/0253568 A1 9/2015 Kobayashi
2015/0256658 A1 9/2015 Shin et al.
2015/0261323 A1 9/2015 Cui et al.
2015/0261375 A1 9/2015 Leigh et al.
2015/0271481 A1 9/2015 Guthrie et al.
2015/0277636 A1 10/2015 Holmgren et al.
2015/0277663 A1 10/2015 Goertz et al.
2015/0286698 A1 10/2015 Gagnier et al.
2015/0286810 A1 10/2015 Lebert
2015/0288327 A1 10/2015 Cherukupalli et al.
2015/0293600 A1 10/2015 Sears
2015/0302026 A1 10/2015 Nam et al.
2015/0309662 A1 10/2015 Wyrwas et al.
2015/0309765 A1 10/2015 Nagahara
2015/0324028 A1 11/2015 Wassvik et al.
2015/0325848 A1 11/2015 Yamashita et al.
2015/0331461 A1 11/2015 Delano et al.
2015/0331544 A1 11/2015 Bergstrom et al.
2015/0331545 A1 11/2015 Wassvik et al.
2015/0332655 A1 11/2015 Krus et al.
2015/0334138 A1 11/2015 Conklin et al.
2015/0334139 A1 11/2015 Conklin et al.
2015/0339000 A1 11/2015 Lee et al.
2015/0346856 A1 12/2015 Wassvik
2015/0363041 A1 12/2015 Zeliff et al.
2015/0363042 A1 12/2015 Krus et al.
2015/0373864 A1 12/2015 Jung
2015/0378466 A1 12/2015 Emery et al.
2016/0004898 A1 1/2016 Holz
2016/0021833 A1 1/2016 Nishimura et al.
2016/0026297 A1 1/2016 Shinkai et al.
2016/0026337 A1 1/2016 Wassvik et al.
2016/0034109 A1 2/2016 Cho et al.
2016/0037657 A1 2/2016 Yoshizumi et al.
2016/0041629 A1 2/2016 Rao et al.
2016/0050263 A1 2/2016 Hwang et al.
2016/0050746 A1 2/2016 Wassvik et al.
2016/0056471 A1 2/2016 Sugimori et al.
2016/0062549 A1 3/2016 Drumm et al.
2016/0065633 A1 3/2016 Kawakubo
2016/0070416 A1 3/2016 Wassvik
2016/0077616 A1 3/2016 Durojaiye et al.
2016/0092021 A1 3/2016 Tu et al.
2016/0098148 A1 4/2016 Gandra et al.
2016/0098152 A1 4/2016 Drumm et al.
2016/0103026 A1 4/2016 Povazay et al.
2016/0117019 A1 4/2016 Takeda
2016/0124546 A1 5/2016 Chen et al.
2016/0124551 A1 5/2016 Christiansson et al.
2016/0147375 A1 5/2016 Bok et al.
2016/0154532 A1 6/2016 Campbell
2016/0154533 A1 6/2016 Eriksson et al.
2016/0179261 A1 6/2016 Drumm
2016/0195975 A1 7/2016 Baum et al.
2016/0202801 A1 7/2016 Odagiri et al.
2016/0202841 A1 7/2016 Christiansson et al.
2016/0209886 A1 7/2016 Suh et al.
2016/0210306 A1 7/2016 Kumarasamy et al.
2016/0216844 A1 7/2016 Bergström
2016/0227381 A1 8/2016 Bargetzi et al.
2016/0231833 A1 8/2016 Gu et al.
2016/0239153 A1 8/2016 Holmgren et al.
2016/0246390 A1 8/2016 Lukanc et al.
2016/0253568 A1 9/2016 Idzik et al.
2016/0255713 A1 9/2016 Kim et al.
2016/0269329 A1 9/2016 Willis
2016/0295711 A1 10/2016 Ryu et al.
2016/0299583 A1 10/2016 Watanabe
2016/0306501 A1 10/2016 Drumm et al.
2016/0328090 A1 11/2016 Klinghult
2016/0342282 A1 11/2016 Wassvik
2017/0031516 A1 2/2017 Sugiyama et al.

(56) References Cited

U.S. PATENT DOCUMENTS

2017/0060346 A1 3/2017 Park et al.
2017/0075476 A1 3/2017 Kwon et al.
2017/0075484 A1 3/2017 Kali et al.
2017/0075494 A1 3/2017 Kwon et al.
2017/0083164 A1 3/2017 Sheng et al.
2017/0090598 A1 3/2017 Morrison et al.
2017/0094051 A1 3/2017 Sakamoto
2017/0094224 A1 3/2017 Hasegawa et al.
2017/0115823 A1 4/2017 Huang et al.
2017/0123257 A1 5/2017 Zhao
2017/0131846 A1 5/2017 Huitema
2017/0147105 A1 5/2017 Kwon et al.
2017/0153763 A1 6/2017 Vavra et al.
2017/0160871 A1 6/2017 Drumm
2017/0185186 A1 6/2017 Liu
2017/0185230 A1 6/2017 Wallander et al.
2017/0185269 A1 6/2017 Anttila et al.
2017/0192493 A1 7/2017 Ofek et al.
2017/0192596 A1 7/2017 Lee et al.
2017/0205995 A1 7/2017 Johansson
2017/0220204 A1 8/2017 Huang et al.
2017/0235537 A1 8/2017 Liu et al.
2017/0237871 A1 8/2017 Fan
2017/0242579 A1 8/2017 Poon et al.
2017/0249030 A1 8/2017 Park et al.
2017/0255337 A1 9/2017 Drumm
2017/0264865 A1 9/2017 Huangfu
2017/0277355 A1 9/2017 Kang
2017/0285789 A1 10/2017 Barel
2017/0308236 A1 10/2017 Lee
2017/0318115 A1 11/2017 Peng et al.
2017/0336891 A1 11/2017 Rosenberg et al.
2018/0049014 A1 2/2018 Patil et al.
2018/0062158 A1 3/2018 Kim et al.
2018/0074654 A1 3/2018 Tanaka et al.
2018/0106692 A1 4/2018 Ciocarlie et al.
2018/0107373 A1 4/2018 Cheng
2018/0113569 A1 4/2018 Pommier et al.
2018/0129311 A1 5/2018 Westhues et al.
2018/0136787 A1 5/2018 Echols et al.
2018/0136788 A1 5/2018 He et al.
2018/0149792 A1 5/2018 Lee et al.
2018/0168153 A1 6/2018 Chen et al.
2018/0203557 A1 7/2018 Kim
2018/0204877 A1 7/2018 Jalili et al.
2018/0205989 A1 7/2018 Srinivasan et al.
2018/0225006 A1 8/2018 Wall
2018/0235017 A1 8/2018 Sakamoto
2018/0253187 A1 9/2018 Christiansson et al.
2018/0263130 A1 9/2018 Curran et al.
2018/0275830 A1 9/2018 Christiansson et al.
2018/0275836 A1 9/2018 Hermans et al.
2018/0279454 A1 9/2018 Takeshita et al.
2018/0293436 A1 10/2018 Jeon et al.
2018/0314206 A1 11/2018 Lee et al.
2018/0349014 A1 12/2018 Samuel et al.
2019/0004668 A1 1/2019 Jeong et al.
2019/0012027 A1 1/2019 Park et al.
2019/0025977 A1 1/2019 Christiansson et al.
2019/0025984 A1 1/2019 Weilbacher et al.
2019/0050074 A1 2/2019 Kocovski
2019/0065030 A1 2/2019 Kang et al.
2019/0079638 A1 3/2019 Kocovski et al.
2019/0107923 A1 4/2019 Drumm
2019/0146630 A1 5/2019 Chen et al.
2019/0155495 A1 5/2019 Klein et al.
2019/0196660 A1 6/2019 Skagmo et al.
2019/0227670 A1 7/2019 O'Cleirigh et al.
2019/0235665 A1 8/2019 Kim et al.
2019/0235701 A1 8/2019 Han et al.
2019/0250755 A1 8/2019 Liu et al.
2019/0250769 A1 8/2019 Wallander
2019/0258353 A1 8/2019 Drumm et al.
2019/0265941 A1 8/2019 Baba
2019/0272052 A1 9/2019 Wallander et al.
2019/0324570 A1 10/2019 Kolundzija et al.
2019/0377431 A1 12/2019 Drumm
2019/0377435 A1 12/2019 Piot et al.
2020/0001645 A1 1/2020 Yano et al.
2020/0006761 A1 1/2020 Fujino et al.
2020/0012359 A1 1/2020 Jakobson et al.
2020/0012408 A1 1/2020 Drumm et al.
2020/0026479 A1 1/2020 Chen
2020/0026675 A1 1/2020 Chen
2020/0064937 A1 2/2020 Wassvik et al.
2020/0073509 A1 3/2020 Shih et al.
2020/0096854 A1 3/2020 Schiavoni et al.
2020/0098147 A1 3/2020 Ha et al.
2020/0125189 A1 4/2020 Kim et al.
2020/0159382 A1 5/2020 Drumm
2020/0167033 A1 5/2020 Kim et al.
2020/0173050 A1 6/2020 Curran et al.
2020/0174644 A1 6/2020 Weibull et al.
2020/0177742 A1 6/2020 Homma et al.
2020/0249777 A1 8/2020 Hou et al.
2020/0293136 A1 9/2020 Jakobson et al.
2020/0310621 A1 10/2020 Piot et al.
2020/0337173 A1 10/2020 Wang et al.
2020/0341587 A1 10/2020 Drumm
2020/0348473 A1 11/2020 Drumm
2020/0348817 A1 11/2020 Ohlsson et al.
2020/0387237 A1 12/2020 Drumm
2021/0026587 A1 1/2021 Christiansson et al.
2021/0041970 A1 2/2021 Bergström et al.
2021/0050086 A1 2/2021 Rose et al.
2021/0081071 A1 3/2021 Koh et al.
2021/0089164 A1 3/2021 Christiansson et al.
2021/0096604 A1 4/2021 Curran et al.
2021/0168231 A1 6/2021 Baker et al.
2021/0352120 A1 11/2021 Masi et al.
2021/0373701 A1* 12/2021 Chen .................... G06F 3/0421
2022/0035481 A1 2/2022 Bergström et al.
2022/0100313 A1 3/2022 Holmgren
2022/0100345 A1 3/2022 Katsuta
2022/0221955 A1 7/2022 Bergström et al.
2023/0057020 A1 2/2023 Wassvik
2023/0082401 A1 3/2023 Andreasson et al.
2023/0168775 A1 6/2023 Skagmo et al.
2023/0229266 A1 7/2023 Bergstrom et al.
2023/0393692 A1 12/2023 Krus
2023/0400948 A1 12/2023 Bergström et al.
2024/0111367 A1 4/2024 Wassvik et al.
2024/0248565 A1 7/2024 Bergstrom et al.
2024/0280847 A1 8/2024 Kocovski et al.
2024/0427460 A1 12/2024 Andersson et al.
2025/0060930 A1 2/2025 Berglund et al.
2025/0291475 A1 9/2025 Andreasson et al.
2025/0341923 A1 11/2025 Bergström et al.
2026/0037091 A1 2/2026 Andersson et al.

FOREIGN PATENT DOCUMENTS

CA 2745422 A1 6/2010
CA 2762681 A1 7/2012
CN 1794157 A 6/2006
CN 101019071 A 8/2007
CN 101075168 A 11/2007
CN 101174191 A 5/2008
CN 101206550 A 6/2008
CN 201233592 Y 5/2009
CN 101644854 A 2/2010
CN 201437963 U 4/2010
CN 201465071 U 5/2010
CN 101882034 A 11/2010
CN 102103441 A 6/2011
CN 102117155 A 7/2011
CN 102929449 A 2/2013
CN 202887145 U 4/2013
CN 103123556 A 5/2013
CN 103164086 A 6/2013
CN 203189466 U 9/2013
CN 203224848 U 10/2013
CN 203453994 U 2/2014
CN 102414646 B 4/2014

(56) References Cited

FOREIGN PATENT DOCUMENTS

| | | | |
|---|---|---|---|
| CN | 203720812 | U | 7/2014 |
| CN | 203786707 | U | 8/2014 |
| CN | 203786708 | U | 8/2014 |
| CN | 203825586 | U | 9/2014 |
| CN | 104391611 | A | 3/2015 |
| CN | 104487923 | A | 4/2015 |
| CN | 204288179 | U | 4/2015 |
| CN | 104641330 | A | 5/2015 |
| CN | 104808843 | A | 7/2015 |
| CN | 204695282 | U | 10/2015 |
| CN | 105183241 | A | 12/2015 |
| CN | 205015574 | U | 2/2016 |
| CN | 205384833 | U | 7/2016 |
| CN | 205680073 | U | 11/2016 |
| CN | 106648222 | A | 5/2017 |
| CN | 106708335 | A | 5/2017 |
| CN | 206400503 | U | 8/2017 |
| CN | 108345414 | A | 7/2018 |
| CN | 110300950 | A | 10/2019 |
| CN | 110515482 | A | 11/2019 |
| CN | 105320382 | B | 4/2021 |
| CN | 113010053 | A | 6/2021 |
| DE | 3511330 | A1 | 10/1986 |
| DE | 68902419 | T2 | 3/1993 |
| DE | 69000920 | T2 | 6/1993 |
| DE | 19809934 | A1 | 9/1999 |
| DE | 10026201 | A1 | 12/2000 |
| DE | 10025175 | A1 | 12/2001 |
| DE | 102009003990 | A1 | 7/2010 |
| DE | 102010000473 | A1 | 8/2010 |
| EP | 0600576 | A1 | 6/1994 |
| EP | 0845812 | A2 | 6/1998 |
| EP | 0897161 | A1 | 2/1999 |
| EP | 0931731 | A1 | 7/1999 |
| EP | 1126236 | A1 | 8/2001 |
| EP | 1457870 | A2 | 9/2004 |
| EP | 1471459 | A2 | 10/2004 |
| EP | 1512989 | A2 | 3/2005 |
| EP | 1798630 | A2 | 6/2007 |
| EP | 1835464 | A1 | 9/2007 |
| EP | 2077490 | A2 | 7/2009 |
| EP | 2088501 | A1 | 8/2009 |
| EP | 2314203 | A1 | 4/2011 |
| EP | 2325735 | A2 | 5/2011 |
| EP | 2339437 | A2 | 6/2011 |
| EP | 0985206 | B1 | 3/2012 |
| EP | 2442180 | A1 | 4/2012 |
| EP | 2466428 | A2 | 6/2012 |
| EP | 2466429 | A1 | 6/2012 |
| EP | 2479642 | A1 | 7/2012 |
| EP | 2515216 | A1 | 10/2012 |
| EP | 2565770 | A2 | 3/2013 |
| EP | 2765622 | A2 | 8/2014 |
| EP | 2778849 | A1 | 9/2014 |
| EP | 2797143 | A1 | 10/2014 |
| EP | 2840470 | A2 | 2/2015 |
| EP | 3002666 | A1 | 4/2016 |
| EP | 3007156 | A1 | 4/2016 |
| EP | 3043242 | A1 | 7/2016 |
| EP | 3058561 | A1 | 8/2016 |
| EP | 3535640 | A1 | 9/2019 |
| EP | 3537269 | A1 | 9/2019 |
| EP | 3557370 | A1 | 10/2019 |
| EP | 3644167 | A1 | 4/2020 |
| FR | 2172828 | A1 | 10/1973 |
| FR | 2617619 | A1 | 1/1989 |
| FR | 2617620 | A1 | 1/1989 |
| FR | 2614711 | B1 | 3/1992 |
| FR | 2676275 | A1 | 11/1992 |
| GB | 1380144 | A | 1/1975 |
| GB | 2131544 | A | 6/1984 |
| GB | 2204126 | A | 11/1988 |
| GB | 2263765 | A | 8/1993 |
| GB | 2472444 | A | 2/2011 |
| JP | 62-159213 | A | 7/1987 |
| JP | 05-190066 | A | 7/1993 |
| JP | 11-085399 | A | 3/1999 |
| JP | 2000-506655 | A | 5/2000 |
| JP | 2000-172438 | A | 6/2000 |
| JP | 2000-259334 | A | 9/2000 |
| JP | 2000-268824 | A | 9/2000 |
| JP | 2000-293311 | A | 10/2000 |
| JP | 2003-330603 | A | 11/2003 |
| JP | 2005-004278 | A | 1/2005 |
| JP | 2008-506173 | A | 2/2008 |
| JP | 2009-004139 | A | 1/2009 |
| JP | 2009-543173 | A | 12/2009 |
| JP | 2010-238426 | A | 10/2010 |
| JP | 2011-530124 | A | 12/2011 |
| JP | 2015-038862 | A | 2/2015 |
| JP | 2015-049965 | A | 3/2015 |
| JP | 2015-158831 | A | 9/2015 |
| JP | 2016-192688 | A | 11/2016 |
| JP | 6211595 | B2 | 10/2017 |
| KR | 10-2001-0060254 | A | 7/2001 |
| KR | 10-0359400 | B1 | 10/2002 |
| KR | 10-0940435 | B1 | 2/2010 |
| KR | 10-1081586 | B1 | 11/2011 |
| KR | 10-1319543 | B1 | 10/2013 |
| KR | 10-2015-0125374 | A | 11/2015 |
| KR | 10-2016-0075643 | A | 6/2016 |
| KR | 10-1933889 | B1 | 12/2018 |
| NL | 2019782 | B1 | 4/2019 |
| TW | M517370 | U | 2/2016 |
| WO | 84/03186 | A1 | 8/1984 |
| WO | 95/27919 | A2 | 10/1995 |
| WO | 96/10148 | A1 | 4/1996 |
| WO | 96/23649 | A1 | 8/1996 |
| WO | 98/07127 | A1 | 2/1998 |
| WO | 99/46602 | A1 | 9/1999 |
| WO | 00/50807 | A1 | 8/2000 |
| WO | 01/20781 | A1 | 3/2001 |
| WO | 01/27867 | A1 | 4/2001 |
| WO | 01/71654 | A1 | 9/2001 |
| WO | 01/84251 | A2 | 11/2001 |
| WO | 02/07072 | A2 | 1/2002 |
| WO | 02/35460 | A1 | 5/2002 |
| WO | 02/77915 | A2 | 10/2002 |
| WO | 02/95668 | A1 | 11/2002 |
| WO | 03/41006 | A1 | 5/2003 |
| WO | 03/76870 | A1 | 9/2003 |
| WO | 2004/032210 | A2 | 4/2004 |
| WO | 2004/081502 | A2 | 9/2004 |
| WO | 2004/081956 | A2 | 9/2004 |
| WO | 2005/026938 | A2 | 3/2005 |
| WO | 2005/029172 | A2 | 3/2005 |
| WO | 2005/029395 | A2 | 3/2005 |
| WO | 2005/125011 | A1 | 12/2005 |
| WO | 2006/003245 | A1 | 1/2006 |
| WO | 2006/081633 | A1 | 8/2006 |
| WO | 2006/095320 | A2 | 9/2006 |
| WO | 2006/124551 | A2 | 11/2006 |
| WO | 2007/003196 | A2 | 1/2007 |
| WO | 2007/047685 | A2 | 4/2007 |
| WO | 2007/058924 | A2 | 5/2007 |
| WO | 2007/112742 | A1 | 10/2007 |
| WO | 2008/004097 | A2 | 1/2008 |
| WO | 2008/004103 | A2 | 1/2008 |
| WO | 2008/007276 | A2 | 1/2008 |
| WO | 2008/007372 | A2 | 1/2008 |
| WO | 2008/017077 | A2 | 2/2008 |
| WO | 2008/032270 | A2 | 3/2008 |
| WO | 2008/034184 | A1 | 3/2008 |
| WO | 2008/038066 | A2 | 4/2008 |
| WO | 2008/039006 | A1 | 4/2008 |
| WO | 2008/044024 | A2 | 4/2008 |
| WO | 2008/068607 | A2 | 6/2008 |
| WO | 2009/000289 | A1 | 12/2008 |
| WO | 2009/007704 | A1 | 1/2009 |
| WO | 2009/029764 | A1 | 3/2009 |
| WO | 2009/048365 | A1 | 4/2009 |
| WO | 2009/077962 | A2 | 6/2009 |
| WO | 2009/102681 | A2 | 8/2009 |
| WO | 2009/135320 | A1 | 11/2009 |

(56) References Cited

FOREIGN PATENT DOCUMENTS

| | | | |
|---|---|---|---|
| WO | 2009/137355 | A2 | 11/2009 |
| WO | 2010/006882 | A2 | 1/2010 |
| WO | 2010/006883 | A2 | 1/2010 |
| WO | 2010/006884 | A2 | 1/2010 |
| WO | 2010/006885 | A2 | 1/2010 |
| WO | 2010/006886 | A2 | 1/2010 |
| WO | 2010/015408 | A1 | 2/2010 |
| WO | 2010/015410 | A2 | 2/2010 |
| WO | 2010/046539 | A1 | 4/2010 |
| WO | 2010/056177 | A1 | 5/2010 |
| WO | 2010/064983 | A2 | 6/2010 |
| WO | 2010/081702 | A2 | 7/2010 |
| WO | 2010/112404 | A1 | 10/2010 |
| WO | 2010/123809 | A2 | 10/2010 |
| WO | 2010/134865 | A1 | 11/2010 |
| WO | 2011/028169 | A1 | 3/2011 |
| WO | 2011/028170 | A1 | 3/2011 |
| WO | 2011/031215 | A1 | 3/2011 |
| WO | 2011/049511 | A1 | 4/2011 |
| WO | 2011/049512 | A1 | 4/2011 |
| WO | 2011/049513 | A1 | 4/2011 |
| WO | 2011/057572 | A1 | 5/2011 |
| WO | 2011/078769 | A1 | 6/2011 |
| WO | 2011/082477 | A1 | 7/2011 |
| WO | 2011/104673 | A1 | 9/2011 |
| WO | 2011/119483 | A1 | 9/2011 |
| WO | 2011/139213 | A1 | 11/2011 |
| WO | 2012/002894 | A1 | 1/2012 |
| WO | 2012/005051 | A1 | 1/2012 |
| WO | 2012/010078 | A1 | 1/2012 |
| WO | 2012/012165 | A1 | 1/2012 |
| WO | 2012/015810 | A2 | 2/2012 |
| WO | 2012/018176 | A2 | 2/2012 |
| WO | 2012/050510 | A1 | 4/2012 |
| WO | 2012/082055 | A1 | 6/2012 |
| WO | 2012/105893 | A1 | 8/2012 |
| WO | 2012/121652 | A1 | 9/2012 |
| WO | 2012/158105 | A2 | 11/2012 |
| WO | 2012/171181 | A1 | 12/2012 |
| WO | 2012/172302 | A1 | 12/2012 |
| WO | 2012/176801 | A1 | 12/2012 |
| WO | 2013/011571 | A1 | 1/2013 |
| WO | 2013/014534 | A2 | 1/2013 |
| WO | 2013/036192 | A1 | 3/2013 |
| WO | 2013/048312 | A2 | 4/2013 |
| WO | 2013/055282 | A2 | 4/2013 |
| WO | 2013/062471 | A2 | 5/2013 |
| WO | 2013/081818 | A1 | 6/2013 |
| WO | 2013/089622 | A2 | 6/2013 |
| WO | 2013/108031 | A2 | 7/2013 |
| WO | 2013/126005 | A2 | 8/2013 |
| WO | 2013/133756 | A1 | 9/2013 |
| WO | 2013/133757 | A2 | 9/2013 |
| WO | 2013/138003 | A1 | 9/2013 |
| WO | 2013/095271 | A3 | 10/2013 |
| WO | 2013/115710 | A3 | 10/2013 |
| WO | 2013/159472 | A1 | 10/2013 |
| WO | 2013/165305 | A2 | 11/2013 |
| WO | 2013/165306 | A2 | 11/2013 |
| WO | 2013/176613 | A2 | 11/2013 |
| WO | 2013/176614 | A2 | 11/2013 |
| WO | 2013/176615 | A2 | 11/2013 |
| WO | 2013/191638 | A1 | 12/2013 |
| WO | 2014/016685 | A1 | 1/2014 |
| WO | 2014/017973 | A1 | 1/2014 |
| WO | 2014/027241 | A2 | 2/2014 |
| WO | 2014/037963 | A1 | 3/2014 |
| WO | 2014/044181 | A1 | 3/2014 |
| WO | 2014/055809 | A1 | 4/2014 |
| WO | 2014/042576 | A3 | 5/2014 |
| WO | 2014/065601 | A1 | 5/2014 |
| WO | 2014/085726 | A2 | 6/2014 |
| WO | 2014/086084 | A1 | 6/2014 |
| WO | 2014/093937 | A1 | 6/2014 |
| WO | 2014/098740 | A1 | 6/2014 |
| WO | 2014/098741 | A1 | 6/2014 |
| WO | 2014/098742 | A1 | 6/2014 |
| WO | 2014/098743 | A1 | 6/2014 |
| WO | 2014/098744 | A1 | 6/2014 |
| WO | 2014/104967 | A1 | 7/2014 |
| WO | 2014/130515 | A1 | 8/2014 |
| WO | 2014/131221 | A1 | 9/2014 |
| WO | 2014/168567 | A1 | 10/2014 |
| WO | 2014/168568 | A1 | 10/2014 |
| WO | 2014/168569 | A1 | 10/2014 |
| WO | 2015/005847 | A1 | 1/2015 |
| WO | 2015/029350 | A1 | 3/2015 |
| WO | 2015/076731 | A1 | 5/2015 |
| WO | 2015/084644 | A1 | 6/2015 |
| WO | 2015/108477 | A1 | 7/2015 |
| WO | 2015/108479 | A1 | 7/2015 |
| WO | 2015/108480 | A1 | 7/2015 |
| WO | 2015/123322 | A1 | 8/2015 |
| WO | 2015/108478 | A3 | 11/2015 |
| WO | 2015/175586 | A1 | 11/2015 |
| WO | 2015/199602 | A1 | 12/2015 |
| WO | 2016/122385 | A1 | 8/2016 |
| WO | 2016/130074 | A1 | 8/2016 |
| WO | 2016/140612 | A1 | 9/2016 |
| WO | 2016/160745 | A1 | 10/2016 |
| WO | 2016/177592 | A1 | 11/2016 |
| WO | 2017/026821 | A1 | 2/2017 |
| WO | 2017/099657 | A1 | 6/2017 |
| WO | 2017/138863 | A1 | 8/2017 |
| WO | 2018/003929 | A1 | 1/2018 |
| WO | 2018/090060 | A1 | 5/2018 |
| WO | 2018/096430 | A1 | 5/2018 |
| WO | 2018/106172 | A1 | 6/2018 |
| WO | 2018/106176 | A1 | 6/2018 |
| WO | 2018/141948 | A1 | 8/2018 |
| WO | 2018/147782 | A1 | 8/2018 |
| WO | 2018/182476 | A1 | 10/2018 |
| WO | 2019/032014 | A1 | 2/2019 |
| WO | 2019/039984 | A1 | 2/2019 |
| WO | 2019/045629 | A1 | 3/2019 |
| WO | 2019/050459 | A1 | 3/2019 |
| WO | 2019/156609 | A1 | 8/2019 |
| WO | 2019/172826 | A1 | 9/2019 |
| WO | 2019/172827 | A1 | 9/2019 |
| WO | 2019/172829 | A1 | 9/2019 |
| WO | 2019/177515 | A1 | 9/2019 |
| WO | 2019/187537 | A1 | 10/2019 |
| WO | 2020/022096 | A1 | 1/2020 |
| WO | 2020/078339 | A1 | 4/2020 |
| WO | 2020/078749 | A1 | 4/2020 |
| WO | 2020/080992 | A1 | 4/2020 |
| WO | 2020/153890 | A1 | 7/2020 |
| WO | 2020/168802 | A1 | 8/2020 |
| WO | 2020/236072 | A1 | 11/2020 |
| WO | 2021/107840 | A1 | 6/2021 |
| WO | 2021/112754 | A1 | 6/2021 |
| WO | 2021/158164 | A1 | 8/2021 |
| WO | 2021/158167 | A1 | 8/2021 |
| WO | 2021/162602 | A1 | 8/2021 |
| WO | 2022/086396 | A1 | 4/2022 |
| WO | 2022/108508 | A1 | 5/2022 |
| WO | 2022/173353 | A1 | 8/2022 |

OTHER PUBLICATIONS

Anderson, R. Rox, B.S., and John A. Parrish, M.D. "The Optics of Human Skin." Journal of Investiaative Dermatoloav 77.1 (1981): 13-19.

ASTM International, "Standard Specification for Heat-Treated Flat Glass-Kind HS, Kind FT Coated and Uncoated Glass," Designation: C 1048-04, in 7 pages.

Barzilai et al., "Two-Point Step Size Gradient Methods", IMA Journal of Numerical Analysis, 1988, pp. 141-148.

Bose, R, "Strongly regular graphs, partial geometries and partially balanced designs", Pacific J. Math., vol. 13, No. 2 (1963), pp. 389-419.

(56) References Cited

OTHER PUBLICATIONS

British Standard, "Glass in building—Thermally toughened soda lime silicate safety glass," EN 12150- 1:2000, ISBN 580 36171 3, Aug. 15, 2000, in 28 pages.
Chen. Yhun, "Using micro-structures to couple light into thin light-guides," Master of Science Thesis, Stockholm, 2011.
Chou, N., et al., "Generalized pseudo-polar Fourier grids and applications in regfersting optical coherence tomography images," 43rd Asilomar Conference on Signals, Systems and Computers, Nov. 2009, in 5 paaes.
Civil Cover Sheet *Flatfrog Laboratories AB* v. *Promethean Ltd. and Promethean Inc*., dated Dec. 10, 2019, in 1 page.
Complaint for Patent Infringement, *Flatfrog Laboratories AB* v. *Promethean Ltd. and Promethean Inc*., C.A. No. 19-2246, dated Dec. 10, 2019, in 83 pages.
Cornelissen, Hugo J. et al. "Injecting Light of High-Power LEDs into Thin Light Guides." Proc. SPIE 7652. International Optical Design Conference (2010): 7652121-7652126.
Defendants Promethean Ltd. and Promethean Inc.'s Preliminary Proposed Claim Constructions, *Flatfrog Laboratories AB* v. *Promethean Ltd. and Promethean Inc*., C.A. No. 1:19-cv-02246-MN, dated May 24, 2021, in 8 pages.
Defendants' Sur-Reply Claim Construction Brief, *Flatfrog Laboratories AB* v. *Promethean Ltd. and Promethean Inc*., C.A. No. 1:19-cv-02246-MN, dated Sep. 13, 2021, in 24 pages.
Defendants' Answer to Second Amended Complaint and Defendant Promethean Inc.'s Counterclaims Against FlatFrog Laboratories AB., C.A. No. 19-2246, dated May 22, 2020, in 29 pages.
Defendants' Initial Invalidity Contentions, *Flatfrog Laboratories AB* v. *Promethean Ltd. and Promethean Inc*., C.A. No. 1:19-cv-02246-MN, dated Apr. 23, 2021, in 26 pages.
Ericson, Chris, "Real-Time Collision Detection", The Morgan Kaufmann Series in Interactive 30 Technology (2005) Chapters 5-9, pp. 125-412.
European Search Report dated Apr. 19, 2012 issued in European Application No. 09830665.7.
European Search Report dated Jan. 23, 2014 issued in corresponding European Appln. No. 13183545.6.
European Search Report issued in European Application No. 11777650. 0, dated Nov. 22, 2013.
Executed Summons in a Civil Action to Promethean Inc., C.A. No. 19-2246, dated Dec. 10, 2019 in 2 pages.
Exhibit 1: Invalidity Claim Chart Against U.S. Pat. No. 10,775,935 Based on Prior Public Use and/or Commercial Offer for Sale of Defendant Promethean Inc.'s ActivPanel 4.5 Product, *Flatfrog Laboratories AB* v. *Promethean Ltd. and Promethean Inc*., C.A. No. 1:19-cv-02246-MN, dated Apr. 23, 2021, in 43 pages.
Exhibit 10: Invalidity Claim Chart Against U.S. Pat. No. 10,739,916 Based on International App. Pub. No. WO2014131221 to Chen et al., *Flatfrog Laboratories AB* v. *Promethean Ltd. and Promethean Inc*., C.A. No. 1:19-cv-02246-MN, dated Apr. 23, 2021, in 4 pages.
Exhibit 11: Invalidity Claim Chart Against U.S. Pat. No. 10,739,916 Based on Chinese Pub. App. No. 104391611 A to Hu et al., *Flatfrog Laboratories AB* v. *Promethean Ltd. and Promethean Inc*., C.A. No. 1:19- cv-02246-MN, dated Apr. 23, 2021, in 4 pages.
Exhibit 12: Invalidity Claim Chart Against U.S. Pat. No. 10,739,916 Based on Chinese Utility Model No. 203786708 U to Cao, *Flatfrog Laboratories AB* v. *Promethean Ltd. and Promethean Inc*., C.A. No. 1:19- cv-02246-MN, dated Apr. 23, 2021, in 4 pages.
Exhibit 13: Invalidity Claim Chart Against U.S. Pat. No. 10,739,916 Based on Chinese Utility Model No. 204288179 U to Mo et al., *Flatfrog Laboratories AB* v. *Promethean Ltd. and Promethean Inc*., C.A. No. 1:19- cv-02246-MN, dated Apr. 23, 2021, in 4 pages.
Exhibit 2: Invalidity Claim Chart Against U.S. Pat. No. 10,775,935 Based on U.S. Patent No. U.S. Pre-Grant Pub. No. 2019/0235701 to Han et al., *Flatfrog Laboratories AB* v. *Promethean Ltd. and Promethean Inc*., C.A. No. 1:19-cv-02246-MN, dated Apr. 23, 2021, in 16 pages.
Exhibit 3A: Invalidity Claim Chart Against U.S. Pat. No. 10,775,935 Based on U.S. Pat. No. 4,751,379 to Sasaki et al., *Flatfrog Laboratories AB* v. *Promethean Ltd. and Promethean Inc*., C.A. No. 1:19-cv-02246-MN, dated Apr. 23, 2021, in 13 pages.
Exhibit 3B: Invalidity Claim Chart Against U.S. Pat. No. 10,775,935 Based on U.S. Pat. No. 4,751,379 to Sasaki et al., *Flatfrog Laboratories AB* v. *Promethean Ltd. and Promethean Inc*., C.A. No. 1:19-cv-02246- MN, dated Apr. 23, 2021, in 14 pages.
Exhibit 3C: Invalidity Claim Chart Against U.S. Pat. No. 10,775,935 Based on U.S. Pat. No. 4,751,379 to Sasaki et al., *Flatfrog Laboratories AB* v. *Promethean Ltd. and Promethean Inc*., C.A. No. 1:19-cv-02246- MN, dated Apr. 23, 2021, in 13 pages.
Exhibit 4A: Invalidity Claim Chart Against U.S. Pat. No. 10,775,935 Based on U.S. Pre-Grant Pub. No. 2019/0004668 to Jeong et al., *Flatfrog Laboratories AB* v. *Promethean Ltd. and Promethean Inc*., C. A. No. 1:19-cv-02246-MN, dated Apr. 23, 2021, in 14 pages.
Exhibit 4B: Invalidity Claim Chart Against U.S. Pat. No. 10,775,935 Based on U.S. Pre-Grant Pub. No. 2019/0004668 to Jeong et al., *Flatfrog Laboratories AB* v. *Promethean Ltd. and Promethean Inc*., C. A. No. 1:19-cv-02246-MN, dated Apr. 23, 2021, in 15 pages.
Exhibit 4C: Invalidity Claim Chart Against U.S. Pat. No. 10,775,935 Based on U.S. Pre-Grant Pub. No. 2019/0004668 to Jeong et al., *Flatfrog Laboratories AB* v. *Promethean Ltd. and Promethean Inc*., C. A. No. 1:19-cv-02246-MN, dated Apr. 23, 2021, in 14 pages.
Exhibit 5A: Invalidity Claim Chart Against U.S. Pat. No. 10,775,935 Based on U.S. Pat. No. 9,983,626 to Cao et al., *Flatfrog Laboratories AB* v. *Promethean Ltd. and Promethean Inc*., C.A. No. 1:19-cv-02246-MN, dated Apr. 23, 2021, in 13 pages.
Exhibit 5B: Invalidity Claim Chart Against U.S. Pat. No. 10,775,935 Based on U.S. Pat. No. 9,983,626 to Cao et al., *Flatfrog Laboratories AB* v. *Promethean Ltd. and Promethean Inc*., C.A. No. 1:19-cv-02246-MN, dated Apr. 23, 2021, in 15 pages.
Exhibit 5C: Invalidity Claim Chart Against U.S. Pat. No. 10,775,935 Based on U.S. Pat. No. 9,983,626 to Cao et al., *Flatfrog Laboratories AB* v. *Promethean Ltd. and Promethean Inc*., C.A. No. 1:19-cv-02246-MN, dated Apr. 23, 2021, in 13 pages.
Exhibit 6A: Invalidity Claim Chart Against U.S. Pat. No. 10,775,935 Based on U.S. Pre-Grant Pub. No. 2019/0025984 to Weilbacher et al., *Flatfrog Laboratories AB* v. *Promethean Ltd. and Promethean Inc*., C.A. No. 1:19-cv-02246-MN, dated Apr. 23, 2021, in 9 pages.
Exhibit 6B: Invalidity Claim Chart Against U.S. Pat. No. 10,775,935 Based on U.S. Pre-Grant Pub. No. 2019/0025984 to Weilbacher et al., *Flatfrog Laboratories AB* v. *Promethean Ltd. and Promethean Inc*., C.A. No. 1:19-cv-02246-MN, dated Apr. 23, 2021, in 9 pages.
Exhibit 6C: Invalidity Claim Chart Against U.S. Pat. No. 10,775,935 Based on U.S. Pre-Grant Pub. No. 2019/0025984 to Weilbacher et al., *Flatfrog Laboratories AB* v. *Promethean Ltd. and Promethean Inc*., C.A. No. 1:19-cv-02246-MN, dated Apr. 23, 2021, in 9 pages.
Exhibit 7A: Invalidity Claim Chart Against U.S. Pat. No. 10,775,935 Based on U.S. Pat. No. 9,207,800 to Eriksson et al., *Flatfrog Laboratories AB* v. *Promethean Ltd. and Promethean Inc*., C.A. No. 1:19-cv-02246- MN, dated Apr. 23, 2021, in 9 pages.
Exhibit 7B: Invalidity Claim Chart Against U.S. Pat. No. 10,775,935 Based on U.S. Pat. No. 9,207,800 to Eriksson et al., *Flatfrog Laboratories AB* v. *Promethean Ltd. and Promethean Inc*., C.A. No. 1:19-cv-02246-MN, dated Apr. 23, 2021, in 9 pages.
Exhibit 7C: Invalidity Claim Chart Against U.S. Pat. No. 10,775,935 Based on U.S. Pat. No. 9,207,800 to Eriksson et al., *Flatfrog Laboratories AB* v. *Promethean Ltd. and Promethean Inc*., C.A. No. 1:19-cv-02246-MN, dated Apr. 23, 2021, in 9 pages.
Exhibit 8: Invalidity Claim Chart Against U.S. Pat. No. 10,739,916 Based on Prior Public Use and/or Commercial Offer for Sale of Defendant Promethean Inc.'s ActivPanel 4.5 Product, *Flatfrog Laboratories AB* v. *Promethean Ltd. and Promethean Inc*., C.A. No. 1:19-cv-02246-MN, dated Apr. 23, 2021, in 21 pages.
Exhibit 9: Invalidity Claim Chart Against U.S. Pat. No. 10,739,916 Based on Chinese Utility Model No. CN 203786707 U to Chen et al., *Flatfrog Laboratories AB* v. *Promethean Ltd. and Promethean Inc*., C.A. No. 1:19-cv-02246-MN, dated Apr. 23, 2021, in 4 pages.
Extended (Supplementary) European Search Report dated Apr. 30, 2021, issued in counterpart EP application No. 19775915.2. (8 pages).
Extended European Search Report for European App. No. 16743795. 3, dated Sep. 11, 2018, in 5 pages.

(56) References Cited

OTHER PUBLICATIONS

Extended European Search Report for European App. No. 18772178.2, dated Dec. 10, 2020, in 8 pages.
Extended European Search Report for European App. No. 18772370.5, dated Dec. 9, 2020, in 8 pages.
Extended European Search Report for European App. No. 18774232.5, dated Dec. 21, 2020, in 9 pages.
Extended European Search Report in European Application No. 16873465.5, date Jun. 25, 2019 in 9 pages.
Extended European Search Report in European Application No. 17750516.1, dated Jul. 16, 2019 in 4 pages.
Extended European Search Report in European Application No. 19165019.1, dated Jul. 18, 2019 in 8 pages.
Farghal, et al., "Electromagnetic Modeling of Outcoupling Efficiency and Light Emission In Near- Infrared Quantum Dot Light Emitting Devices", published in Progress In Electromagnetics Research B., vol. 24, 263-284, 2010.
Fihn, M., "Touch Panel—Special Edition," Veritas et Visus, Nov. 2011, in 1 page.
Fourmont, K., "Non-Equispaced Fast Fourier Transforms with Applications to Tomography," Journal of Fourier Analysis and Applications, vol. 9, Issue 5, 2003, in 20 pages.
Giphy | Stickers | Closer Look Sticker by Cavan Infante, posted on May 24, 2019 by Cavan Infante, no copyright date posted [online], [site visited Oct. 13, 2020], Available from Internet, <URL: https://giphy.com/stickers/circle-underline-cavan-ZbB9ICitwN43fJvNSz/>.
Giphy I Randy, the Badly Drawn Horse, posted on Feb. 12, 2020 by T.L. McBeth, no copyright date posted [online], [site visited Oct. 13, 2020]. Available from Internet, <URL: https://giphy.com/stories/randy-the-badly-drawn-horse-258d6753-fb29/>.
Golub et al: "Matrix Norms" in: "Matrix Computations" Aug. 21, 2005 (Aug. 21, 2005), Johns Hopkins University Press, oaaes 54-59.s.
Hartig, B, "Using a tablet as a whiteboard in MS Teams", 2020, Retrieved from the Internet: URL: https://www.youtube.com/watch?v=CC4991ivXQO, retrieved on Jun. 28, 2023, see video from 0:34-3:53.
Holzammer, Andereas "Combining Diffuse Illumination and Frustrated Total Internal Reflection for touch detection", Oct. 22, 2009 (Oct. 22, 2009), Retrieved from the Internet: URL:http://www.eecs.tu-berlin.de/fileadmin/fg144/Research/Theses/Holzammer/Thesis Andreas holzammer.pdf.
Horwood, A. et al: "Image Normalization, a Basic Requirement for Computer-based Automatic Diagnostic Applications", May 1, 2001 (May 1, 2001), retrieved from the Internet: URL:http://facweb.cs.depaul.edu/research/vc/seminar/Paper/Feb22_2008Emili_1mageNormali zation.pdf*Paae 9, line 1- Paae 14, line 1.
Iizuka, K., "Boundaries, Near-Field Optics, and Near-Field Imaging," Elements of Photonics, vol. 1: In Free Space and Special Media, Wiley & Sons, 2002, in 57 pages.
International Preliminary Report on Patentability received for PCT Patent Application No. PCT/EP2018/052757, mailed on Aug. 15, 2019, 7 pages.
International Preliminary Report on Patentability received for PCT Patent Application No. PCT/EP2019/077054, mailed on Apr. 29, 2021, 7 pages.
International Preliminary Report on Patentability received for PCT Patent Application No. PCT/IB2017/057201, mailed on Jun. 6, 2019, 8 pages.
International Preliminary Report on Patentability received for PCT Patent Application No. PCT/JP2019/001801, mailed on Oct. 15, 2020, 12 pages (6 pages of English Translation and 6 pages of Original Document).
International Preliminary Report on Patentability received for PCT Patent Application No. PCT/SE2009/051364, mailed on Jun. 16, 2011, 11 pages.
International Preliminary Report on Patentability received for PCT Patent Application No. PCT/SE2011/050520, mailed on Nov. 15, 2012, 6 pages.
International Preliminary Report on Patentability received for PCT Patent Application No. PCT/SE2011/050871, mailed on Jan. 17, 2013, 10 pages.
International Preliminary Report on Patentability received for PCT Patent Application No. PCT/SE2012/050086, mailed on Aug. 15, 2013, 8 pages.
International Preliminary Report on Patentability received for PCT Patent Application No. PCT/SE2012/051419, mailed on Jul. 3, 2014, 6 pages.
International Preliminary Report on Patentability received for PCT Patent Application No. PCT/SE2013/050064, mailed on Aug. 14, 2014, 7 pages.
International Preliminary Report on Patentability received for PCT Patent Application No. PCT/SE2013/050137, mailed on Sep. 4, 2014, 6 pages.
International Preliminary Report on Patentability received for PCT Patent Application No. PCT/SE2013/050473, mailed on Nov. 13, 2014, 8 pages.
International Preliminary Report on Patentability received for PCT Patent Application No. PCT/SE2013/050585, mailed on Dec. 4, 2014, 10 pages.
International Preliminary Report on Patentability received for PCT Patent Application No. PCT/SE2013/051044, mailed on Mar. 26, 2015, 7 pages.
International Preliminary Report on Patentability received for PCT Patent Application No. PCT/SE2013/051533, mailed on Jul. 2, 2015, 8 pages.
International Preliminary Report on Patentability received for PCT Patent Application No. PCT/SE2013/051534, mailed on Jul. 2, 2015, 8 pages.
International Preliminary Report on Patentability received for PCT Patent Application No. PCT/SE2013/051537, mailed on Jul. 2, 2015, 9 pages.
International Preliminary Report on Patentability received for PCT Patent Application No. PCT/SE2014/050435, mailed on Oct. 22, 2015, 8 pages.
International Preliminary Report on Patentability received for PCT Patent Application No. PCT/SE2014/050437, mailed on Oct. 22, 2015, 6 pages.
International Preliminary Report on Patentability received for PCT Patent Application No. PCT/SE2014/050438, mailed on Oct. 22, 2015, 6 pages.
International Preliminary Report on Patentability received for PCT Patent Application No. PCT/SE2014/050701, mailed on Jan. 21, 2016, 8 pages.
International Preliminary Report on Patentability received for PCT Patent Application No. PCT/SE2014/051363, mailed on Jun. 2, 2016, 6 pages.
International Preliminary Report on Patentability received for PCT Patent Application No. PCT/SE2015/050041, mailed on Jul. 28, 2016, 10 pages.
International Preliminary Report on Patentability received for PCT Patent Application No. PCT/SE2015/050042, mailed on Jul. 28, 2016, 10 pages.
International Preliminary Report on Patentability received for PCT Patent Application No. PCT/SE2015/050043, mailed on Jul. 28, 2016, 9 pages.
International Preliminary Report on Patentability received for PCT Patent Application No. PCT/SE2015/050044, mailed on Jul. 28, 2016, 8 pages.
International Preliminary Report on Patentability received for PCT Patent Application No. PCT/SE2015/050724, mailed on Jan. 5, 2017, 7 pages.
International Preliminary Report on Patentability received for PCT Patent Application No. PCT/SE2016/050053, mailed on Aug. 10, 2017, 13 pages.
International Preliminary Report on Patentability received for PCT Patent Application No. PCT/SE2016/050098, mailed on Aug. 24, 2017, 9 pages.
International Preliminary Report on Patentability received for PCT Patent Application No. PCT/SE2016/050155, mailed on Sep. 14, 2017, 7 pages.

(56) References Cited

OTHER PUBLICATIONS

International Preliminary Report on Patentability received for PCT Patent Application No. PCT/SE2016/051229, mailed on Jun. 21, 2018, 15 pages.
International Preliminary Report on Patentability received for PCT Patent Application No. PCT/SE2017/050102, mailed on Aug. 23, 2018, 9 pages.
International Preliminary Report on Patentability received for PCT Patent Application No. PCT/SE2017/051224, mailed on Feb. 26, 2019, 13 pages.
International Preliminary Report on Patentability received for PCT Patent Application No. PCT/SE2018/050070, mailed on Aug. 22, 2019, 10 pages.
International Preliminary Report on Patentability received for PCT Patent Application No. PCT/SE2018/050109, mailed on Oct. 10, 2019, 12 pages.
International Preliminary Report on Patentability received for PCT Patent Application No. PCT/SE2018/050817, mailed on Mar. 5, 2020, 9 pages.
International Preliminary Report on Patentability received for PCT Patent Application No. PCT/SE2018/050896, mailed on Mar. 19, 2020, 10 pages.
International Preliminary Report on Patentability received for PCT Patent Application No. PCT/SE2019/050189, mailed on Sep. 17, 2020, 9 pages.
International Preliminary Report on Patentability received for PCT Patent Application No. PCT/SE2019/050190, mailed on Sep. 17, 2020, 8 pages.
International Preliminary Report on Patentability received for PCT Patent Application No. PCT/SE2019/050193, mailed on Sep. 17, 2020, 8 pages.
International Preliminary Report on Patentability received for PCT Patent Application No. PCT/SE2019/050195, mailed on Oct. 1, 2020, 10 pages.
International Preliminary Report on Patentability received for PCT Patent Application No. PCT/SE2019/050953, mailed on Apr. 29, 2021, 11 pages.
International Preliminary Report on Patentability received for PCT Patent Application No. PCT/SE2020/050504, mailed on Dec. 2, 2021, 10 pages.
International Preliminary Report on Patentability received for PCT Patent Application No. PCT/SE2020/051117, mailed on Jun. 9, 2022, 10 pages.
International Preliminary Report on Patentability received for PCT Patent Application No. PCT/SE2020/051172, mailed on Jun. 16, 2022, 8 pages.
International Preliminary Report on Patentability received for PCT Patent Application No. PCT/SE2021/050040, mailed on Aug. 25, 2022, 13 pages.
International Preliminary Report on Patentability received for PCT Patent Application No. PCT/SE2021/050095, mailed on Aug. 18, 2022, 11 pages.
International Preliminary Report on Patentability received for PCT Patent Application No. PCT/SE2021/051018, mailed on May 4, 2023, 8 pages.
International Preliminary Report on Patentability received for PCT Patent Application No. PCT/SE2021/051151, mailed on Jun. 1, 2023, 10 pages.
International Preliminary Report on Patentability received for PCT Patent Application No. PCT/SE22/050139, mailed on Aug. 24, 2023, 9 pages.
International Preliminary Report on Patentability received in International Application No. PCT/SE2017/051233, dated Jun. 11, 2019, in 6 pages.
International Search and Report mailed on Sep. 23, 2022 in International Application PCT/SE2022/050575.
International Search Report and Written Opinion for International App. No. PCT/SE2019/050343, dated Sep. 3, 2019, in 13 pages.
International Search Report and Written Opinion in International Application No. PCT/SE2023/050352 dated Jul. 10, 2023.
International Search Report and Written Opinion issued in International Application No. PCT/SE2010/051103 dated Jan. 25, 2011.
International Search Report and Written Opinion issued in International Application No. PCT/SE2010/051105 dated Nov. 16, 2010.
International Search Report and Written Opinion issued in International Application No. PCT/SE2010/051107 dated Jan. 24, 2011.
International Search Report and Written Opinion of the International Searching Authority for PCT/SE2021/051018, dated Feb. 1, 2022, in 10 pages.
International Search Report and Written Opinion received for PCT Patent Application No. PCT/EP2018/052757, mailed on Apr. 23, 2018, 9 pages.
International Search Report and Written Opinion received for PCT Patent Application No. PCT/EP2019/077054, mailed on Jan. 10, 2020, 9 pages.
International Search Report and Written Opinion received for PCT Patent Application No. PCT/JP2019/001801, mailed on Apr. 23, 2019, 13 pages (6 pages of English Translation and 7 pages of Original Document).
International Search Report and Written Opinion received for PCT Patent Application No. PCT/SE2009/051364, mailed on May 4, 2010, 15 pages.
International Search Report and Written Opinion received for PCT Patent Application No. PCT/SE2011/050520, mailed on Aug. 18, 2011, 8 pages.
International Search Report and Written Opinion received for PCT Patent Application No. PCT/SE2012/050086, mailed on May 23, 2012, 9 pages.
International Search Report and Written Opinion received for PCT Patent Application No. PCT/SE2012/051419, mailed on Aug. 26, 2013, 8 pages.
International Search Report and Written Opinion received for PCT Patent Application No. PCT/SE2013/050064, mailed on Sep. 12, 2013, 10 pages.
International Search Report and Written Opinion received for PCT Patent Application No. PCT/SE2013/050137, mailed on Oct. 15, 2013, 9 pages.
International Search Report and Written Opinion received for PCT Patent Application No. PCT/SE2013/050473, mailed on Feb. 3, 2014, 11 pages.
International Search Report and Written Opinion received for PCT Patent Application No. PCT/SE2013/050585, mailed on Jan. 21, 2014, 13 pages.
International Search Report and Written Opinion received for PCT Patent Application No. PCT/SE2013/051044, mailed on Mar. 20, 2014, 9 pages.
International Search Report and Written Opinion received for PCT Patent Application No. PCT/SE2013/051533, mailed on Apr. 15, 2014, 10 pages.
International Search Report and Written Opinion received for PCT Patent Application No. PCT/SE2013/051534, mailed on May 6, 2014, 11 pages.
International Search Report and Written Opinion received for PCT Patent Application No. PCT/SE2013/051537, mailed on Apr. 25, 2014, 12 pages.
International Search Report and Written Opinion received for PCT Patent Application No. PCT/SE2014/050435, mailed on Jun. 12, 2014, 11 pages.
International Search Report and Written Opinion received for PCT Patent Application No. PCT/SE2014/050437, mailed on Jul. 1, 2014, 9 pages.
International Search Report and Written Opinion received for PCT Patent Application No. PCT/SE2014/050438, mailed on Jul. 1, 2014, 9 pages.
International Search Report and Written Opinion received for PCT Patent Application No. PCT/SE2014/050701, mailed on Nov. 6, 2014, 11 pages.
International Search Report and Written Opinion received for PCT Patent Application No. PCT/SE2014/051363, mailed on Feb. 12, 2015, 9 pages.
International Search Report and Written Opinion received for PCT Patent Application No. PCT/SE2015/050041, mailed on Apr. 29, 2015, 12 pages.

(56) References Cited

OTHER PUBLICATIONS

International Search Report and Written Opinion received for PCT Patent Application No. PCT/SE2015/050042, mailed on Sep. 28, 2015, 14 pages.
International Search Report and Written Opinion received for PCT Patent Application No. PCT/SE2015/050043, mailed on May 19, 2015, 12 pages.
International Search Report and Written Opinion received for PCT Patent Application No. PCT/SE2015/050044, mailed on May 19, 2015, 11 pages.
International Search Report and Written Opinion received for PCT Patent Application No. PCT/SE2015/050724, mailed on Oct. 6, 2015, 10 pages.
International Search Report and Written Opinion received for PCT Patent Application No. PCT/SE2016/050053, mailed on May 2, 2016, 16 pages.
International Search Report and Written Opinion received for PCT Patent Application No. PCT/SE2016/050098, mailed on Jun. 29, 2016, 13 pages.
International Search Report and Written Opinion received for PCT Patent Application No. PCT/SE2016/050155, mailed on Jul. 15, 2016, 10 pages.
International Search Report and Written Opinion received for PCT Patent Application No. PCT/SE2016/051229, mailed on Mar. 10, 2017, 18 pages.
International Search Report and Written Opinion received for PCT Patent Application No. PCT/SE2017/051233, mailed on Mar. 12, 2018, 10 pages.
International Search Report and Written Opinion received for PCT Patent Application No. PCT/SE2018/050109, mailed on May 3, 2018, 15 pages.
International Search Report and Written Opinion received for PCT Patent Application No. PCT/SE2018/050817, mailed on Jan. 28, 2019, 12 pages.
International Search Report and Written Opinion received for PCT Patent Application No. PCT/SE2018/050896, mailed on Nov. 27, 2018, 13 pages.
International Search Report and Written Opinion received for PCT Patent Application No. PCT/SE2019/050190, mailed on Jun. 12, 2019, 11 pages.
International Search Report and Written Opinion received for PCT Patent Application No. PCT/SE2019/050193, mailed on Apr. 10, 2019, 11 pages.
International Search Report and Written Opinion received for PCT Patent Application No. PCT/SE2019/050195, mailed on Jun. 12, 2019, 13 pages.
International Search Report and Written Opinion received for PCT Patent Application No. PCT/SE2020/050504, mailed on Sep. 4, 2020, 13 pages.
International Search Report and Written Opinion received for PCT Patent Application No. PCT/SE2022/050139, mailed on Apr. 8, 2022, 12 pages.
International Search Report and Written Opinion received for PCT Patent Application No. PCT/SE2011/050871, mailed on Nov. 28, 2011, 13 pages.
International Search Report and Written Opinion received in International Application No. PCT/SE2021/051151 dated Jan. 26, 2022, in 13 pages.
International Search Report and Written Opinion received in International Application No. PCT/SE2023/050456, mailed Jul. 17, 2023.
International Search Report and Written Opinion received in International Application No. PCT/SE2023/051245 dated Feb. 13, 2024.
International Search Report for International App. No. PCT/IB2017/057201, dated Mar. 6, 2018, in 4 pages.
International Search Report for International App. No. PCT/SE2017/050102, dated Apr. 5, 2017, in 4 pages.
International Search Report for International App. No. PCT/SE2017/051224, dated Feb. 23, 2018, in 5 pages.
International Search Report for International App. No. PCT/SE2018/050070, dated Apr. 25, 2018, in 4 pages.
International Search Report for International App. No. PCT/SE2019/050953, dated Nov. 26, 2019, in 4 pages.
International Search Report in App. No. PCT/SE2020/051117 dated Feb. 5, 2021 in 2 pages.
International Search Report in International Application No. PCT/SE2020/051172 dated Feb. 4, 2021 in 5 pages.
International Search Report in International Application No. PCT/SE2021/050040 dated May 10, 2021 in 3 pages.
International Search Report in International Application No. PCT/SE2021/050095 dated Jun. 2, 2021 in 7 pages.
International Search Report in PCT/SE2019/050189 dated May 29, 2019 in 5 pages.
International Search Report received for PCT Patent Application No. PCT/SE2015/050087, mailed on May 6, 2015, 4 pages.
Johnson, M., "Enhanced Optical Touch Input Panel", IBM Technical Disclosure Bulletin, 1985, in 3 pages.
Joint Appendix of Exhibits to Joint Claim Construction Brief, *Flatfrog Laboratories AB* v. *Promethean Ltd. and Promethean Inc.*, C.A. No. 1:19-cv-02246-MN, dated Sep. 20, 2021, in 127 pages, (uploaded in 4 parts, part 1 of 4).
Joint Appendix of Exhibits to Joint Claim Construction Brief, *Flatfrog Laboratories AB* v. *Promethean Ltd. and Promethean Inc.*, C.A. No. 1:19-cv-02246-MN, dated Sep. 20, 2021, in 128 pages, (uploaded in 4 parts, part 4 of 4).
Joint Appendix of Exhibits to Joint Claim Construction Brief, *Flatfrog Laboratories AB* v. *Promethean Ltd. and Promethean Inc.*, C.A. No. 1:19-cv-02246-MN, dated Sep. 20, 2021, in 63 pages, (uploaded in 4 parts, part 2 of 4).
Joint Appendix of Exhibits to Joint Claim Construction Brief, *Flatfrog Laboratories AB* v. *Promethean Ltd. and Promethean Inc.*, C.A. No. 1:19-cv-02246-MN, dated Sep. 20, 2021, in 65 pages, (uploaded in 4 parts, part 3 of 4).
Joint Claim Construction Brief, *Flatfrog Laboratories AB* v. *Promethean Ltd. and Promethean Inc.*, C.A. No. 1:19-cv-02246-MN, dated Sep. 20, 2021, in 92 pages.
Kak, et al., "Principles of Computerized Tomographic Imaging", Institute of Electrical Engineers, Inc., 1999, in 333 pages.
Kar-Han Tan, Robinson I N, Culbertson B, Apostolopoulos J, 'ConnectBoard: Enable Genuine Eye Contact and Accurate Gaze in Remote Collaboration', In: IEEE Transaction on Multimedia, 2011, June, vol. 13, No. 3, ISSN: 1520-9210.
Kart, M., "Entwicklung and Bau einer neuartigen Mehrfinger-Touchscreen basierend auf frustrierter Totalreflexion," Landeswettbewerb in Bayern 2008 Jugend Forscht, Apr. 1, 2008.
Learning and Technology with Frank: Best hardware to use with Microsoft Whiteboard—WACOM, iPad, and Surface, 2021, Retrieved from the Internet: URL: https://www.voutube.com/watch?v=qched3kwhA, retrieved on Jun. 27, 2023, see video from 5:33 to 6:43.
Liu, J., et al. "Multiple touch points identifying method, involves starting touch screen, driving specific emission tube, and computing and transmitting coordinate of touch points to computer system by direct lines through interface of touch screen," 2007, in 25 pages.
Machine translation of JP 11-85399 (Year: 1999).
Machine translation of KR20160075643A (Year: 2016).
Mu, Cong et al. "Dielectric multilayer angular filters for coupling LEDs to thin light guides." Proc SPIE 8170 (2011): 817001-1 - 817001-10.
Natterer, F., "The Mathematics of Computerized Tomography", Society for Industrial and Applied Mathematics, 2001, in 240 pages.
Natterer, F., et al. "Fourier Reconstruction," Mathematical Methods in Image Reconstruction, Society for Industrial and Applied Mathematics, 2001, in 12 pages.
Notice of Service, *Flatfrog Laboratories AB* v. *Promethean Ltd. and Promethean Inc.*, C.A. No. 1:19-cv-02246-MN, dated Apr. 23, 2021, in 2 pages.
O'Rourke, Joseph, "Computational Geometry In C", Second Edition, Cambridge University Press, (1998), pp. 252-264.
Panzer, et al., "Tunable Infrared Emission From Printed Colloidal Quantum Dot/Polymer Composite Films on Flexible Substrates", published in Journal of Display Technology, vol. 6, No. 3, Mar. 2010.

(56) References Cited

OTHER PUBLICATIONS

Paradiso, J.A., "Several Sensor Approaches that Retrofit Large Surfaces for Interactivity," ACM Ubicomp 2002 Workshop on Collaboration with Interactive Walls and Tables, 2002, in 8 pages.
Press et al., "Numerical Recipes The Art of Scientific Computing", Third Edition, Cambridge University Press, 2007, pp. 1-1235.
Report on the Filing or Determination of an Action Regarding a Patent or Trademark. For U.S. Pat. No. 10,282,035, U.S. District of Delaware, dated Dec. 10, 2019, in 1 page.
Scheuplein, Robert J., Ph.D. "A Survey of Some Fundamental Aspects of the Absorption and Reflection of Light by Tissue." J. Soc. Cos. Chem. 15 (1964): 111-122.
Summons in a Civil Action to Promethean Inc., C.A. No. 19-2246, dated Dec. 10, 2019 in 2 pages.
Supplementary European Search Report dated Aug. 14, 2015 issued in corresponding European U.S. Appl. No. 13/744,212.
Supplementary European Search Report for European App. No. EP 13752508, dated Aug. 27, 2015.
Supplementary European Search Report for European App. No. EP 16749542, dated Sep. 17, 2018, in 9 pages.
Supplementary European Search Report for European App. No. EP 16759213, dated Oct. 4, 2018, in 9 pages.
Swedish Search Report in Application No. 1350181.2 dated Dec. 11, 2013.
Swedish Search Report in Application No. 1450651.3 dated Dec. 22, 2014.
Tedaldi, M., et al. "Refractive index mapping of layered samples using optical coherence refractometry," Proceedings of SPIE, vol. 7171, 2009, in 8 pages.
The Laser Wall, MIT, 1997, http://web.media.mit.edu/'joep/SpectrumWeb/captions/Laser.html.
Tholfsen, M, "The NEW Microsoft Teams Whiteboard 2021 // A fully updated & improved Whiteboard in Teams meetings," 2021, Retrieved from the Internet: URL: https://www.youtube.com/watch?v=vDO- EUZUmiA, retrieved on Mar. 14, 2023, see video from 0:10-0:39.
Thomas, G.L et al., "Some observations on fingerprint deposits." J. Phys. D: Appl. Phys. 8 (1975): 724-729.
Tympanus/Codrops | Animated Mesh Lines, posted on Jan. 8, 2019 by Jeremie Boulay, © Codrops 2020 [online], [site visited Oct. 13, 2020], Available from Internet, <URL: https://tympanus.net/codrops/2019/01/08/animated-mesh-lines/>.
Piacenza et al., "Accurate Contact Localization and Indentation Depth Prediction With an Optics-based Tactile Sensor", arXiv:1802.06837v1, Feb. 19, 2018, 7 pages.
Machine translation of CN 108345414A (Year: 2018).
Machine translation of KR10-2016-0075643 (Year: 2017).
International Search Report and Written Opinion received in PCT/SE2024/050554 dated Aug. 28, 2024.
International Search Report and Written Opinion in PCT/SE2024/050552 dated Jul. 1, 2024.

* cited by examiner

TOUCH-SENSING APPARATUS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention pertains to touch-sensing apparatus that operate by propagating light above a panel. More specifically, it pertains to optical and mechanical solutions for controlling and tailoring the light paths above the panel via fully or partially randomized refraction, reflection or scattering.

Description of the Related Art

In one category of touch-sensitive panels known as 'above surface optical touch systems', a set of optical emitters are arranged around the periphery of a touch surface to emit light that is reflected to travel and propagate above the touch surface. A set of light detectors are also arranged around the periphery of the touch surface to receive light from the set of emitters from above the touch surface. I.E., a grid of intersecting light paths are created above the touch surface, also referred to as scanlines. An object that touches the touch surface will attenuate the light on one or more scanlines of the light and cause a change in the light received by one or more of the detectors. The location (coordinates), shape or area of the object may be determined by analyzing the received light at the detectors.

Optical and mechanical characteristics of the touch-sensitive apparatus affects the scattering of the light between the emitters/detectors and the touch surface, and the accordingly the detected touch signals. For example, the width of the scanlines affects touch performance factors such as detectability, accuracy, resolution, and the presence of reconstruction artefacts. Problems with previous prior art touch detection systems relate to sub-optimal performance with respect to the aforementioned factors. Further, variations in the alignment of the opto-mechanical components affects the detection process which may lead to a sub-optimal touch detection performance. Factors such as signal-to-noise ratio, detection accuracy, resolution, the presence of artefacts etc, in the touch detection process may be affected. While prior art systems aim to improve upon these factors, e.g. the detection accuracy, there is often an associated compromise in terms of having to incorporate more complex and expensive opto-mechanical modifications to the touch system. This typically results in a less compact touch system, and a more complicated manufacturing process, being more expensive.

SUMMARY OF THE INVENTION

An objective is to at least partly overcome one or more of the above identified limitations of the prior art.

One objective is to provide a touch-sensitive apparatus which is compact, less complex, robust and easy to assemble.

Another objective is to provide an "above-surface"-based touch-sensitive apparatus with efficient use of light.

One or more of these objectives, and other objectives that may appear from the description below, are at least partly achieved by means of touch-sensitive apparatuses according to the independent claims, embodiments thereof being defined by the dependent claims.

According to a first aspect, a touch sensing apparatus is provided comprising a panel that defines a touch surface extending in a plane having a normal axis, a plurality of emitters and detectors arranged along a perimeter of the panel, a light directing portion arranged adjacent the perimeter and comprising a light directing surface, wherein the emitters are arranged to emit light and the light directing surface is arranged to receive the light and direct the light across the touch surface, wherein the panel comprises a rear surface, opposite the touch surface, and the emitters and/or the detectors are arranged opposite the rear surface to emit and/or receive light through a channel in a frame element, the channel is arranged opposite the rear surface and extends in a direction of the normal axis, wherein the light directing surface and the channel are arranged on opposite sides of the panel and overlap in the direction of the plane, whereby the light directing surface receive light from the emitters, or direct light to the detectors, through the panel and through the channel, in the direction of the normal axis.

According to a second aspect, a method of manufacturing a frame element for a touch sensing apparatus is provided, comprising extruding the frame element to form a light directing portion and a cavity adapted to receive a substrate comprising emitters and/or detectors, and milling a wall portion of the cavity to form a channel so that, in use, a light directing surface of the light directing portion receive light from the emitters, or direct light to the detectors, through the channel.

Some examples of the disclosure provide for a more compact touch sensing apparatus.

Some examples of the disclosure provide for a touch sensing apparatus that is less costly to manufacture.

Some examples of the disclosure provide for a touch sensing apparatus with a reduced number of electro-optical components.

Some examples of the disclosure provide for a more robust touch sensing apparatus.

Some examples of the disclosure provide for a touch sensing apparatus that is more reliable to use.

Some examples of the disclosure provide for reducing stray light effects.

Some examples of the disclosure provide for reducing ambient light sensitivity.

Some examples of the disclosure provide for a touch sensing apparatus that has a better signal-to-noise ratio of the detected light.

Some examples of the disclosure provide for a touch-sensing apparatus with improved resolution and detection accuracy of small objects.

Some examples of the disclosure provide for a touch-sensing apparatus with less detection artifacts.

Some examples of the disclosure provide for a touch-sensing apparatus with a more uniform coverage of scanlines across the touch surface.

Still other objectives, features, aspects and advantages of the present disclosure will appear from the following detailed description, from the attached claims as well as from the drawings.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the invention are capable of will be apparent and elucidated from the following description of examples of the present invention, reference being made to the accompanying drawings, in which.

DETAILED DESCRIPTION OF THE PREFERRED EMBODIMENT

Figure 1A:
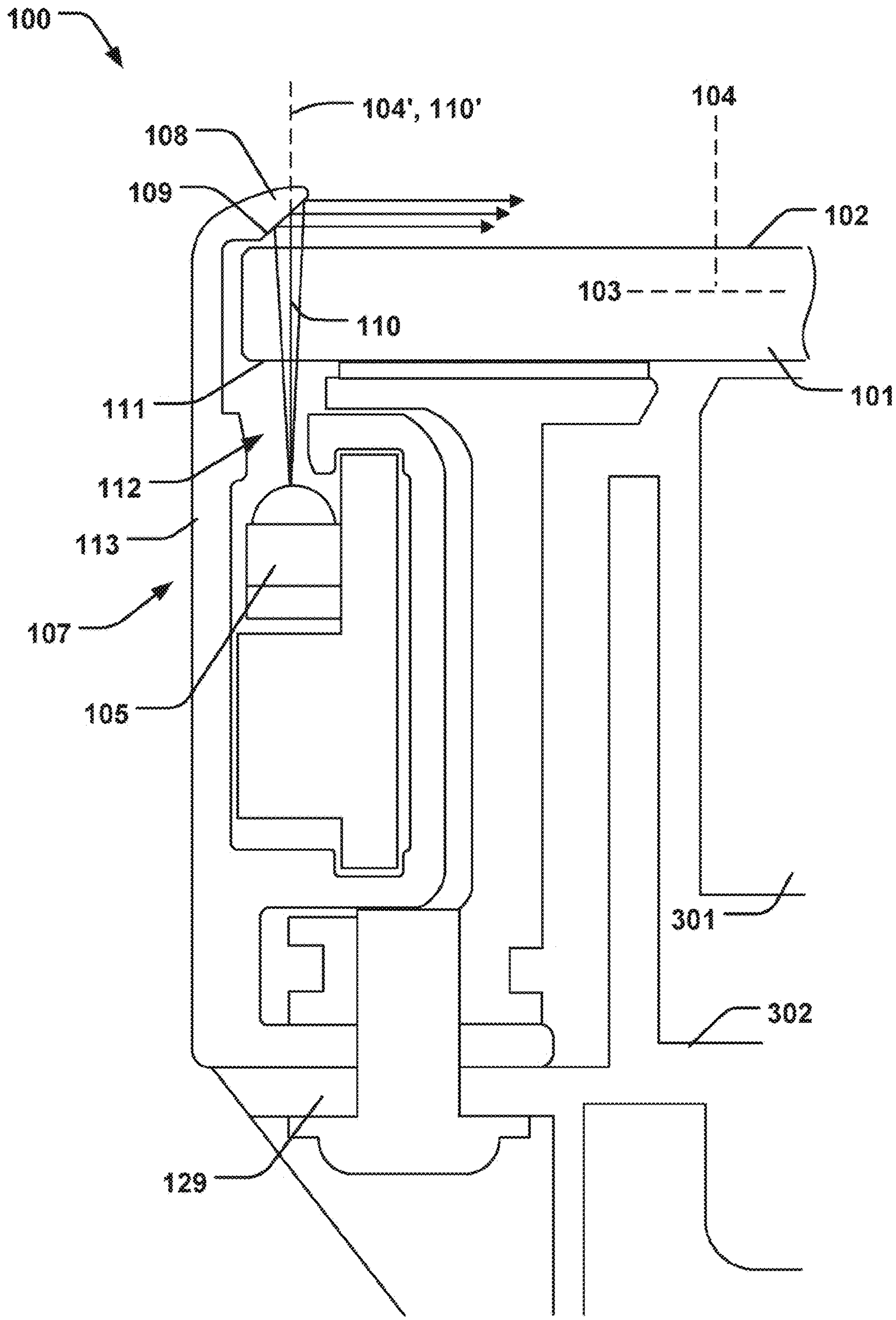
FIG. 1*a* is a schematic illustration, in a cross-sectional side view, of a touch-sensing apparatus, according to one example of the disclosure.

In the following, embodiments of the present invention will be presented for a specific example of a touch-sensitive apparatus. Throughout the description, the same reference numerals are used to identify corresponding elements.

Figure 1B:
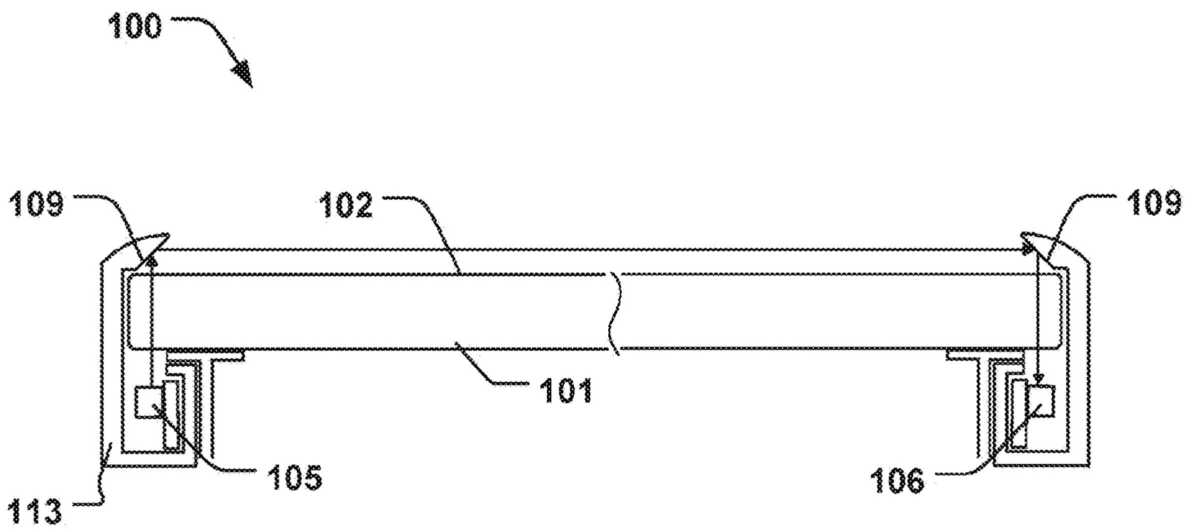
FIG. 1*b* is a schematic illustration, in a cross-sectional side view, of a touch-sensing apparatus, according to one example of the disclosure.
Figure 1C:
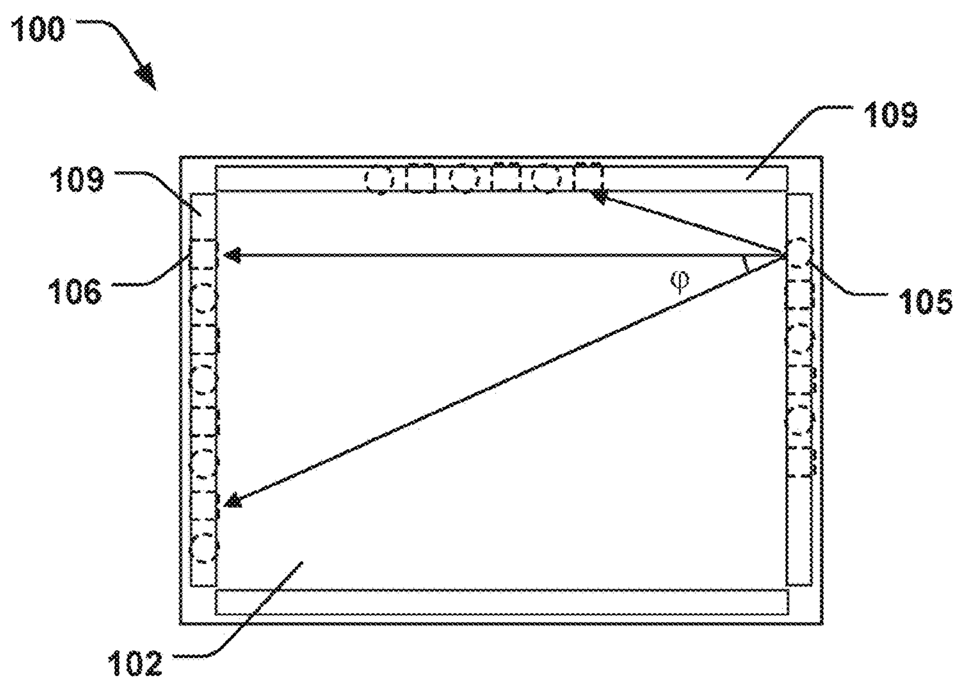
FIG. 1*c* is a schematic illustration, in a top-down view, of a touch-sensing apparatus, according to one example of the disclosure.
Figure 1D:
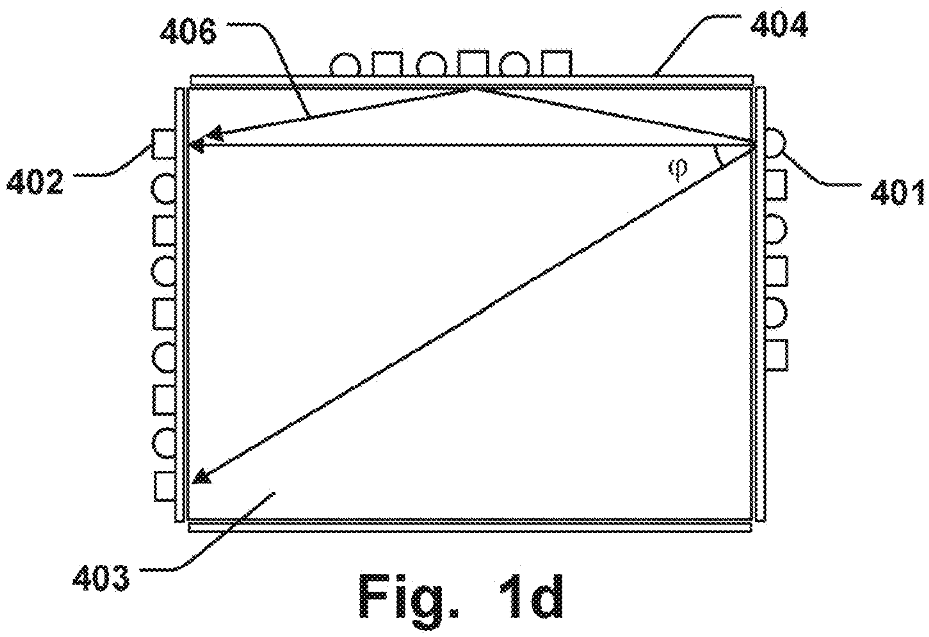
FIGS. 1*d-e* are schematic illustrations, in top-down views, of an example of a prior art touch-sensing apparatus.
Figure 1E:
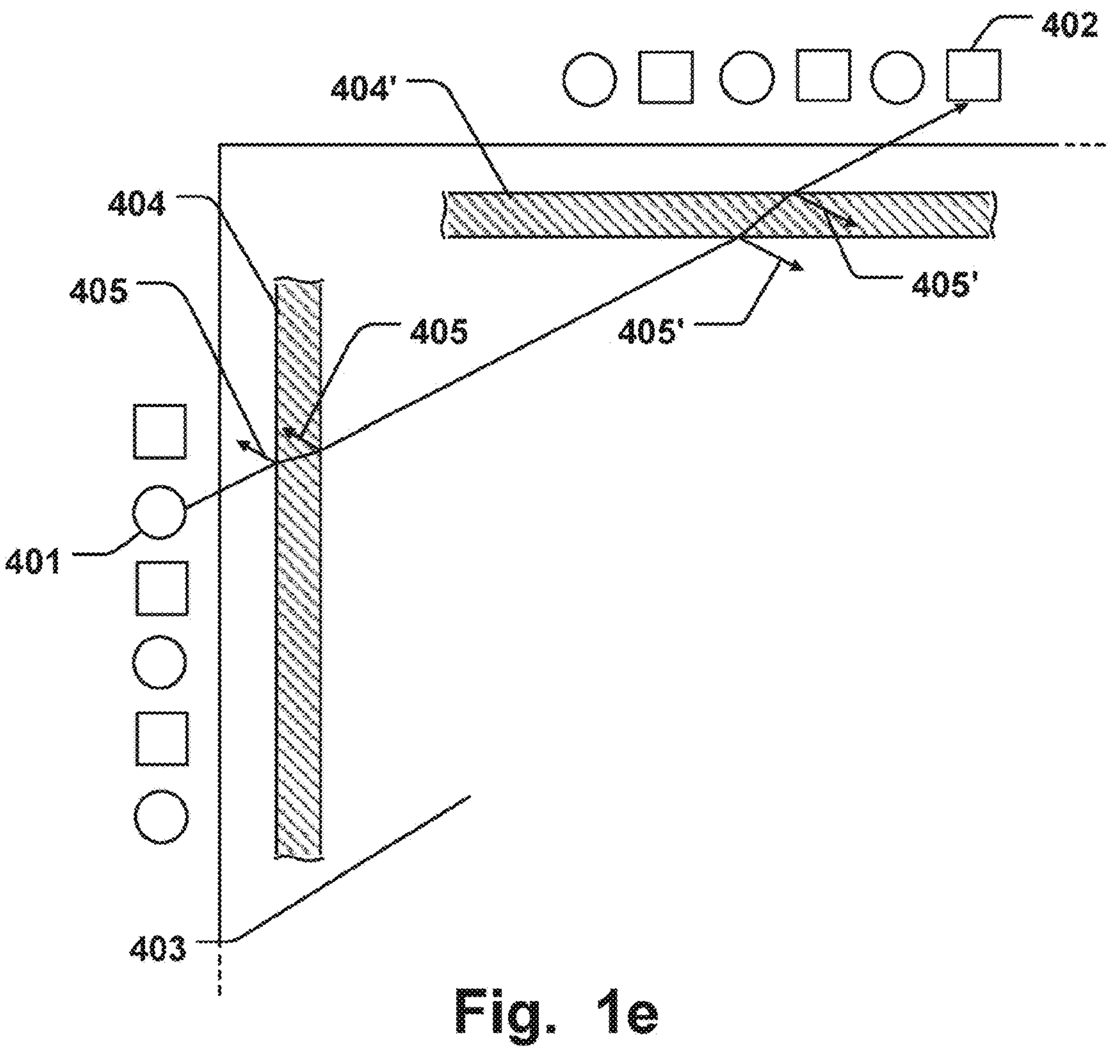
Figure 2:
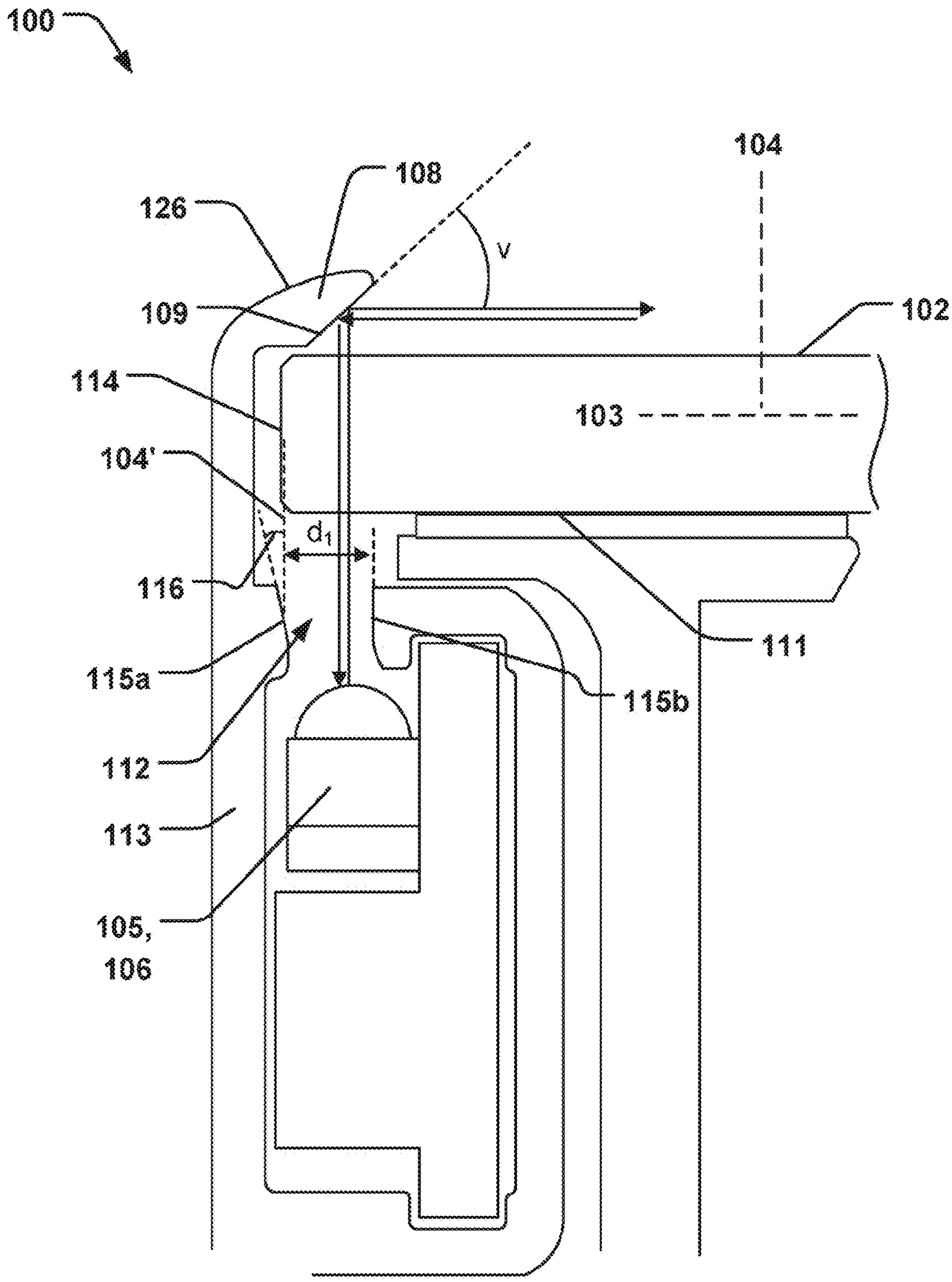
FIG. 2 is a schematic illustration, in a cross-sectional side view, of a touch-sensing apparatus, according to one example of the disclosure.
Figure 4:
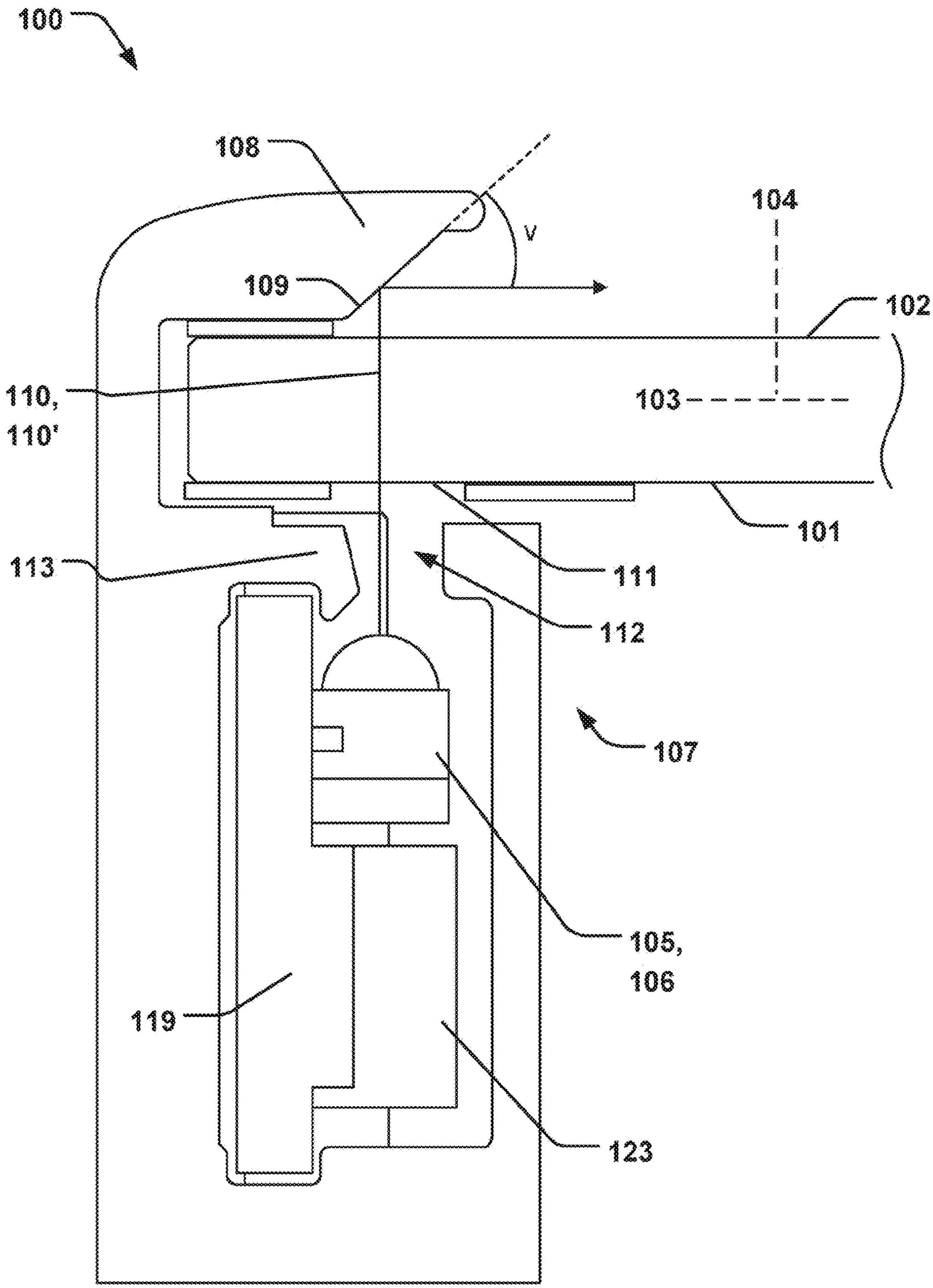
FIG. 4 is a schematic illustration, in a cross-sectional side view, of a touch-sensing apparatus, according to one example of the disclosure.

FIG. 1*a* is a schematic illustration of a touch-sensing apparatus 100 comprising a panel 101 that defines a touch surface 102 extending in a plane 103 having a normal axis 104. The panel 101 is a light transmissive panel. The touch-sensing apparatus 100 comprises a plurality of emitters 105 and detectors 106 arranged along a perimeter 107 of the panel 101. FIG. 1*a* shows only an emitter 105 for clarity of presentation, while FIG. 1*b* illustrates how light is transmitted from an emitter 105 to a detector 106 across the touch surface 102. The touch-sensing apparatus 100 comprises a light directing portion 108 arranged adjacent and along the perimeter 107. The light directing portion 108 comprises a light directing surface 109. The emitters 105 are arranged to emit light 110 and the light directing surface 109 is arranged to receive the light 110 and direct the light across touch surface 102 of the panel 101. The light is reflected to detectors 106, after propagating across the touch surface 102, via a corresponding light directing surface 109, as illustrated in FIG. 1*b*. FIG. 1*c* is a schematic top-down view of the touch-sensing apparatus 100. FIG. 2 shows also schematically the reflection from the emitters 105, and to the detectors 106. The panel 101 comprises a rear surface 111, opposite the touch surface 102, and the emitters 105 and/or the detectors 106 are arranged opposite the rear surface to emit and/or receive light 110 through a channel 112 in a frame element 113 of the touch-sensing apparatus 100. The channel 112 is arranged opposite the rear surface 111 and extends in a direction 104' of the normal axis 104, i.e. essentially in parallel with the normal axis 104. The light directing surface 109 and the channel 112 are arranged on opposite sides of the panel 101 and overlap along the direction of the plane 103. I.e. there is an overlap in the horizontal position of the light directing surface 109 and the channel 112 in FIG. 1*a*, so that the light path may extend vertically from the light directing surface 109 to the channel 112. The light directing surface 109 is arranged to receive light 110 from the emitters 105, or direct light to the detectors 106, through the panel 101 and further through the channel 112, in the direction 104' of the normal axis 104. It should be understood that the main optical axis 110' of light emission may be extending essentially along the direction 104', but that the light also has an angular spread around the optical axis 110', as indicated in FIG. 1*a*. Having the light directing surface 109 arranged above the channel 112 as exemplified in FIG. 1*a* and FIG. 4 provides for effective shielding of ambient light or system stray light. The amount of ambient or stray light reflected towards the detectors 106 may thus be minimized, and the signal to noise ratio can be improved. Having the emitters 105 emitting light 110 in the direction 104' of the normal 104, thus having an optical axis 110' of the light 110 essentially parallel with the normal axis 104, as further exemplified in FIG. 1*a* and FIG. 4, facilitates reducing the dimensions of the touch-sensing apparatus 100 along the perimeter. The cross-sectional footprint of the emitter 105—and detector 106 assembly may be minimized, e.g. in the direction of the plane 103 in FIGS. 1*a* and 4. The described arrangement may also provide for minimizing angular reflections against the panel 101, which can be advantageous in some applications. Having the light 110 propagating through the panel 101 provides for a further synergetic effect in terms of providing a compact touch-sensing apparatus 100 and minimizing the number of optical components since the panel 101 acts as a sealing element for the emitters 105 and detectors 106 from the surroundings. The panel 101 may thus act as a sealing portion to protect electronics from e.g. liquids and dust. Further optical sealing elements may thus be dispensed with. This is further advantageous in that the angle by which the light scatters across the panel 101 may be further increased, with less reflection losses, providing for an improved scanline coverage across the panel 101. For example, Fresnel reflection losses can be minimized, as described further with respect to FIG. 1*d*. FIG. 1*d* shows an example of a prior art touch-sensing apparatus, with emitters 401 and detectors 402 arranged along sides of a touch surface 403, and an optical sealing component 404 arranged along the sides. The optical sealing component 404 is arranged above the touch surface 403 and between the reflection surfaces on opposite sides which reflects the light across the touch surface 403 (i.e. corresponding to the position of the light directing surfaces 109). Having such additional optical sealing component 404 may introduce unwanted reflections by the light transmitted over the touch surface 403, in particularly when the light is reflected at high-angles along the sides of the touch surface 403, as indicated by reflection 406 in FIG. 1*d*. FIG. 1*e* is a further detailed view of the example in FIG. 1*d*, illustrating further reflections 405, 405', at each interface of such additional optical sealing component 404, 404'. Such reflections 405, 405', could lead to significant loss of light, particularly if having the additional optical sealing component 404, 404', along each side of the touch surface 403.

The reduced number of components may be particularly advantageous in some applications where additional compactness is desired. This provides also for reducing the cost of the touch-sensing apparatus 100. As will be described in more detail below, the light directing portion 108 may be formed as part of the frame element 113 so that the light directing surface 109 is formed in the material of the frame element 113. This further reduces the number of opto-mechanical components along the path of the light from the touch surface 102 to the emitters 105 and detectors 106. The number of components needing alignment is thus also reduced, which simplifies assembly. A particularly compact and robust touch-sensing apparatus 100 is thus provided, with more efficient use of detection light. Touch detection performance may thus be increased, while reducing complexity and costs.

An angle (v) between the light directing surface 109 and the plane 103 of the touch surface 102 may be less than 45 degrees, as exemplified in FIG. 2 and FIG. 4. This provides for reducing the amount of unwanted reflections of the light across the touch surface 102, again exemplified by the reflection 406 in FIG. 1*d*, which otherwise may cause artifacts or other disturbances when detecting the attenuation of the touch signal. Unwanted light reflections may instead be reflected out of the plane 103 if having the angle (v) less than 45 degrees. The angle (v) may be in the range 41-44 degrees in some examples, for a particularly advantageous reduction unwanted light reflections. The angle (v) may be more than 45 degrees. For example, having the angle (v) in the range 46-49 degrees can also reduce unwanted reflections of the type illustrated by scanline 406 in FIG. 1*d*. It should be understood that the advantageous benefits as described above for the touch-sensing apparatus 100, i.e. less complex, more compact and cost-effective manufacturing process, applies to examples where the angle (v) is both above 45 degrees and below 45 degrees.

The panel 101 has edges 114 extending between the touch surface 102 and the rear surface 111. The channel 112 extends in a direction parallel with the plane 102 with a width (d1) between a first channel wall 115*a,* arranged closest to a respective edge 114 of the panel 101, and an opposite second channel wall 115*b,* as schematically illustrated in e.g. FIG. 2 and FIG. 5. The first channel wall 115*a* may extend with an angle 116 towards the direction 104' of the normal axis 104. Having an angled channel wall 115*a* provides for reducing the amount of ambient light reflected towards detectors 106. A larger portion of any ambient light being reflected against channel wall 115*a* will be reflected in a direction past the detector 106, while also reducing light from the emitter 105 which goes directly past the light directing surface 109, which may cause stray light problems.

Figure 3:
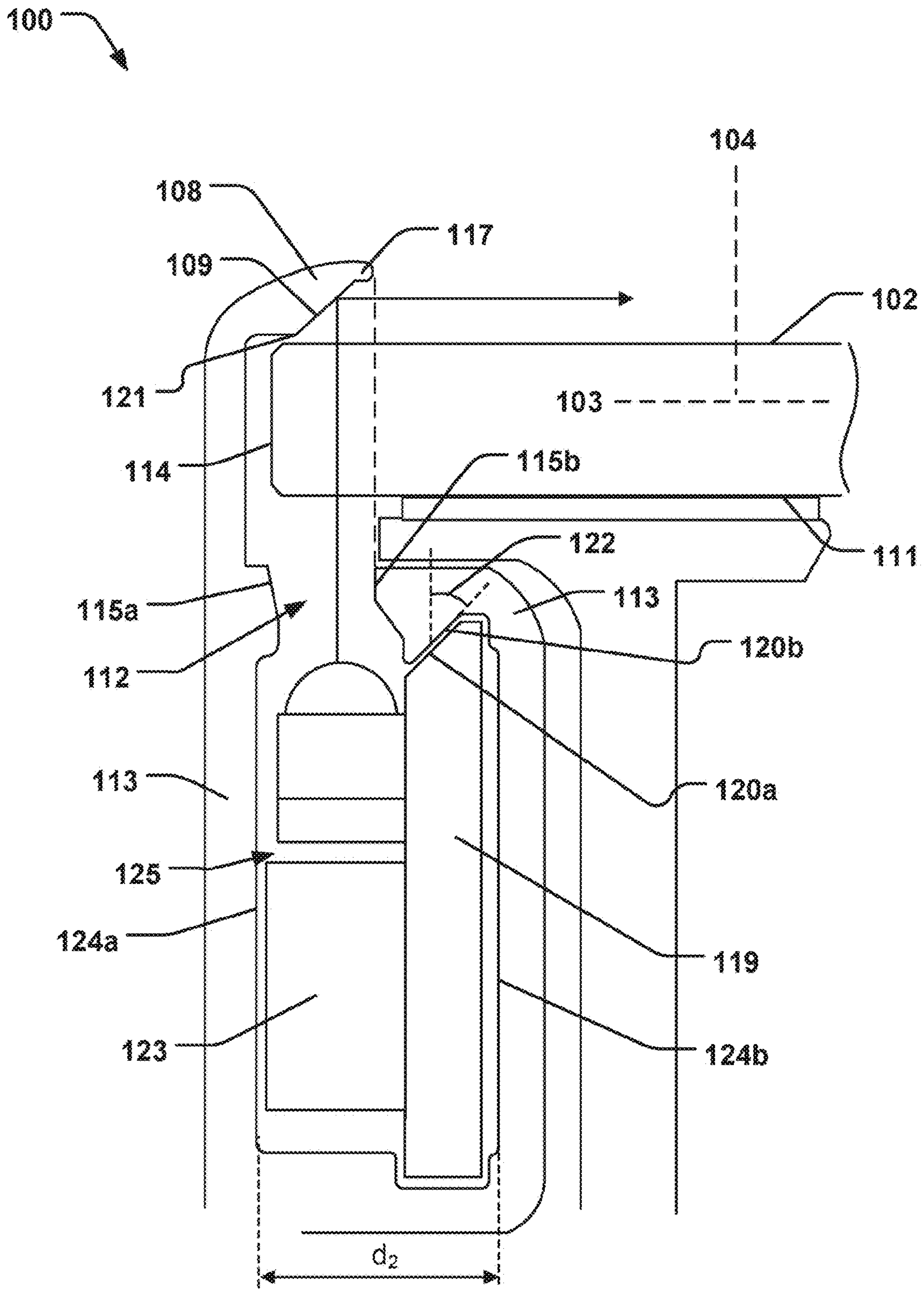
FIG. 3 is a schematic illustration, in a cross-sectional side view, of a touch-sensing apparatus, according to one example of the disclosure.
Figure 5:
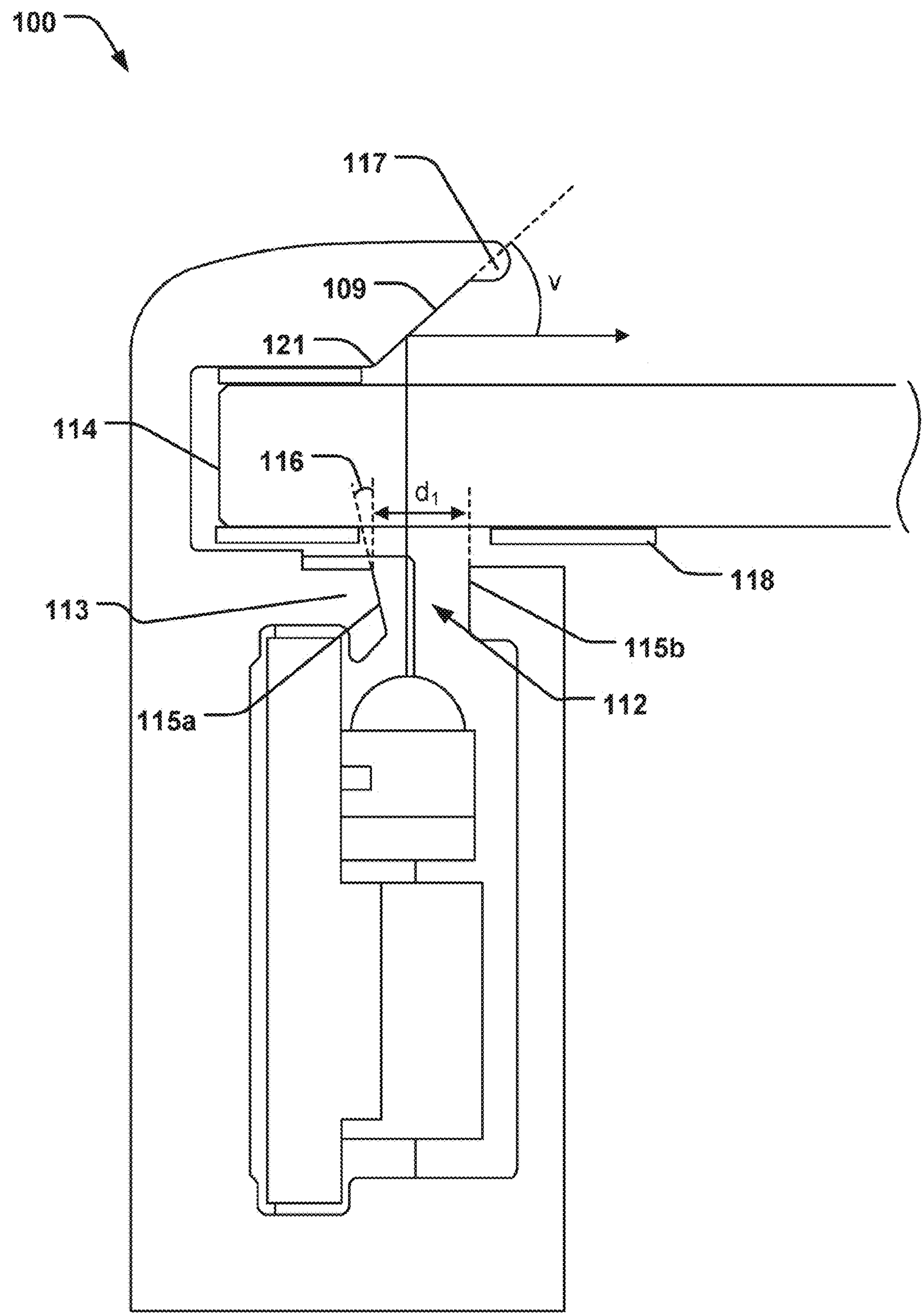
FIG. 5 is a schematic illustration, in cross-sectional side view, of a touch-sensing apparatus, according to one example of the disclosure.

The light directing portion 108 has an edge portion 121 corresponding to the part of the light directing portion 108 being arranged closest to the touch surface 102, as illustrated in FIG. 3 and FIG. 5. The light directing surface 109 may extend from the edge portion 121 of the light directing portion 108 to a protrusion 117 of the light directing portion 108, as schematically illustrated in FIG. 3 and FIG. 5. The protrusion 117 may extend in a direction parallel with the plane 103 to shield ambient light from being reflected towards the channel 112.

The width ($d_1$) of the channel 112 may be further varied for optimizing the amount of light 110 emitted towards the light directing surface 109 while providing sufficient shielding from ambient or stray light. The positions of the first and second channel walls 115*a*, 115*b,* along the direction of the plane 103 relative the emitters 105 and/or detectors 106 may be optimized depending on the particular implementation. In one example, as schematically illustrated in FIG. 3, the position of the second channel wall 115*b* is aligned with the position of the protrusion 117 along the direction of the plane 103. This may be particularly advantageous for shielding of ambient or stray light. At the same time blocking of the emitted light 110 may be avoided when optimizing the position of the emitters 105 relative the center of the channel 112. The surface properties of the channel walls 115*a,* 115*b,* may also be tailored to avoid loss of detection light or reduce the impact of ambient or stray light as described further below.

Figure 6:
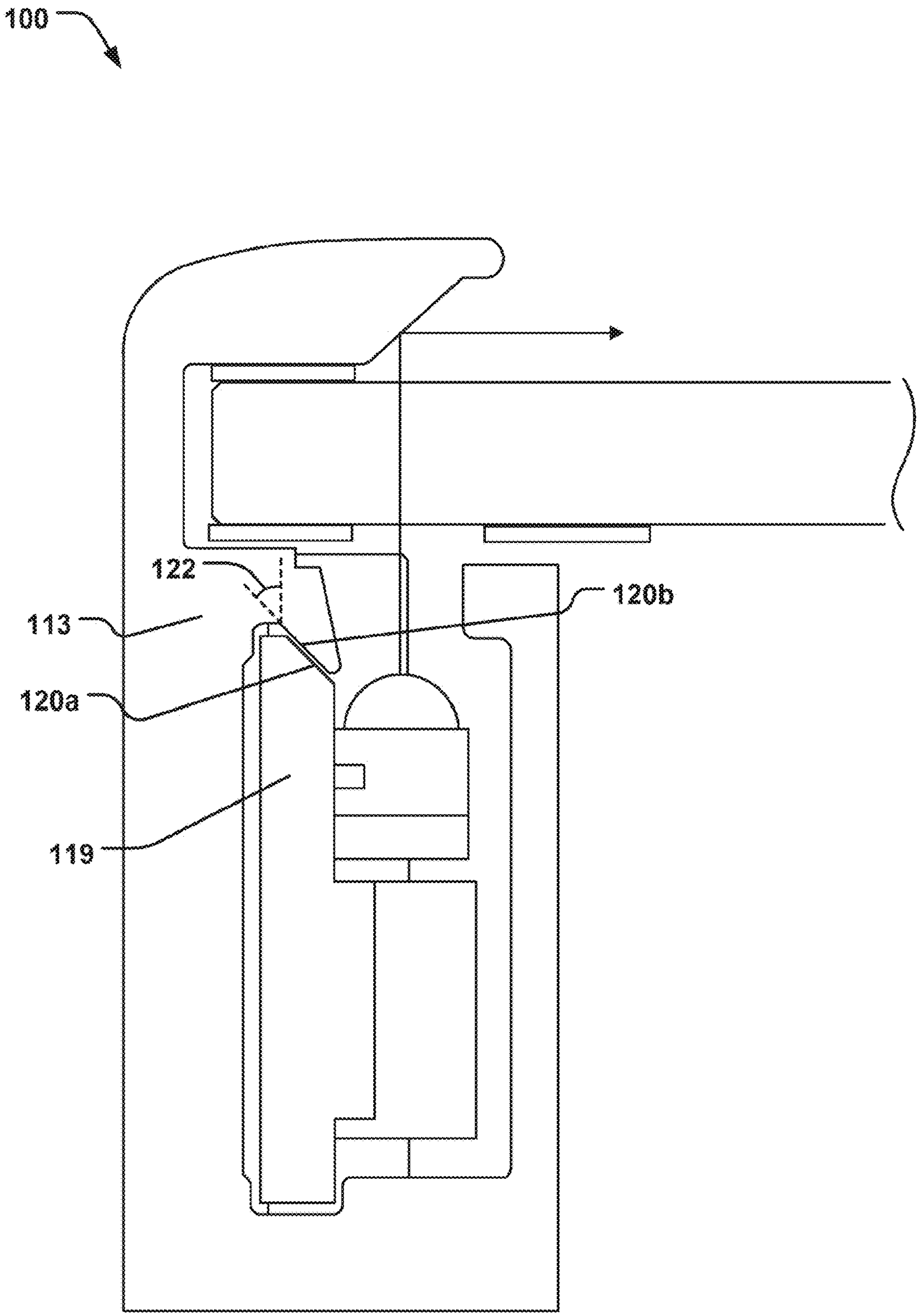
FIG. 6 is a schematic illustration, in a cross-sectional side view, of a touch-sensing apparatus, according to one example of the disclosure.

The emitters 105 and/or detectors 106 may be mounted to a substrate 119. The substrate 119 may comprise a chamfered edge 120*a* to be arranged opposite a corresponding mating surface 120*b* of the frame element 113. The mating surface 120*b* of the frame element 113 may form an angle 122 with the normal axis 104, as schematically illustrated in FIG. 3 and FIG. 6. The allows for effectively locking the substrate 119 in place in the correct position relative the frame element 113. A secure alignment of the emitters 105 and/or detectors 106 relative the light directing surface 109 may thus be facilitated, which in turn facilitates signal optimization. Providing an angled surface 120*b* of the frame element 113, as exemplified in FIG. 3, may at the same time allow for removing at least part of the second channel wall 115, closest to the substrate 119, and reduce the risk of blocking light from the emitters 105, or to the detectors 106 (see e.g. FIG. 2 versus FIG. 3).

The walls 115*a,* 115*b,* of the channel 112 may comprise a diffusive light scattering surface. The walls 115*a,* 115*b,* may thus also be utilized as reflective elements that allows better light management, e.g. recycling of light and reflecting light from lost directions towards the light directing surface 109. A larger portion of the emitted light 110 mat thus be utilized. At the same time, the surface of the walls 115*a*, 115*b*, may be tailored to provide a specular component of the reflected light. This allows for improving the directionality of the reflected light, e.g. for directing the light towards the light directing surface 109 above the panel 101. The ratio of the specular component of the reflected light may be varied by performing different surface treatments of the channel walls 115, 115*b*, to affect e.g. the surface roughness thereof. The reflecting properties of the light directing surface 109 may also be varied by such surface treatments, which may comprise etching, bead blasting, sand blasting, brushing, and/or anodization, as described in more detail below.

A support 123 may be attached to the substrate 119, as exemplified in FIG. 3 and FIG. 4. The support 123 may extending in a direction parallel with the plane 103 between the substrate 119 and a frame wall 124*a*, 124*b*, of the frame element 113. The support 123 may facilitate alignment of the substrate 119 relative the frame element 113. This may facilitate manufacturing and allow for accurate positioning of the emitters 105 and/or detectors 106 relative the frame element 113.

The frame element 113 may be shaped to form a cavity 125. The emitters 105 and/or detectors 106 are mounted to a substrate 119 and the substrate 119 may be arranged in the cavity 125 so that the emitters 105 and/or detectors 106 are arranged closer to the respective edge 114 of the panel 101 than the substrate 119, as schematically illustrated in FIG. 3. This provides for minimizing the width of the bezel, i.e. the width of the light directing portion 108 along the direction of the plane 103, since the emitters 105 and/or detectors 106 are placed closer to the edges 114 of the panel 101, while maintaining the advantageous sealing effect of the panel 101 as mentioned above. A more compact touch-sensing apparatus 100 is thus provided.

In particular, the cavity 125 may extend in a direction parallel with the plane 103 with a width ($d_2$) between a first frame wall 124*a*, arranged closest to the respective edge 114 of the panel 101, and an opposite second frame wall 124*b*. The substrate 119 may be arranged in the cavity 125 so that the emitters 105 and/or detectors 106 are arranged closer to the first frame wall 124*a* than the substrate 119, as exemplified in FIG. 3. This allows for minimizing the width of the bezel along the direction of the plane 103.

The substrate 119 may extend with an elongated shape in a direction 104' of the normal axis 104, as exemplified in FIG. 2. This provides for reducing the dimensions of the touch sensing apparatus 100 in the direction perpendicular to the normal axis 104, which may be desirable in some applications where the amount of space in this direction is limited, and/or when the ratio of available touch surface 102 to the surrounding frame components is to be optimized. Having the substrate 119 extending along the direction 104' of the normal axis 104 combined with having the emitters 105 and/or detectors 106 arranged closer to the first frame wall 124*a* than the substrate 119 provides for particularly efficient utilization of space along the direction of the plane 103.

Figure 9A:
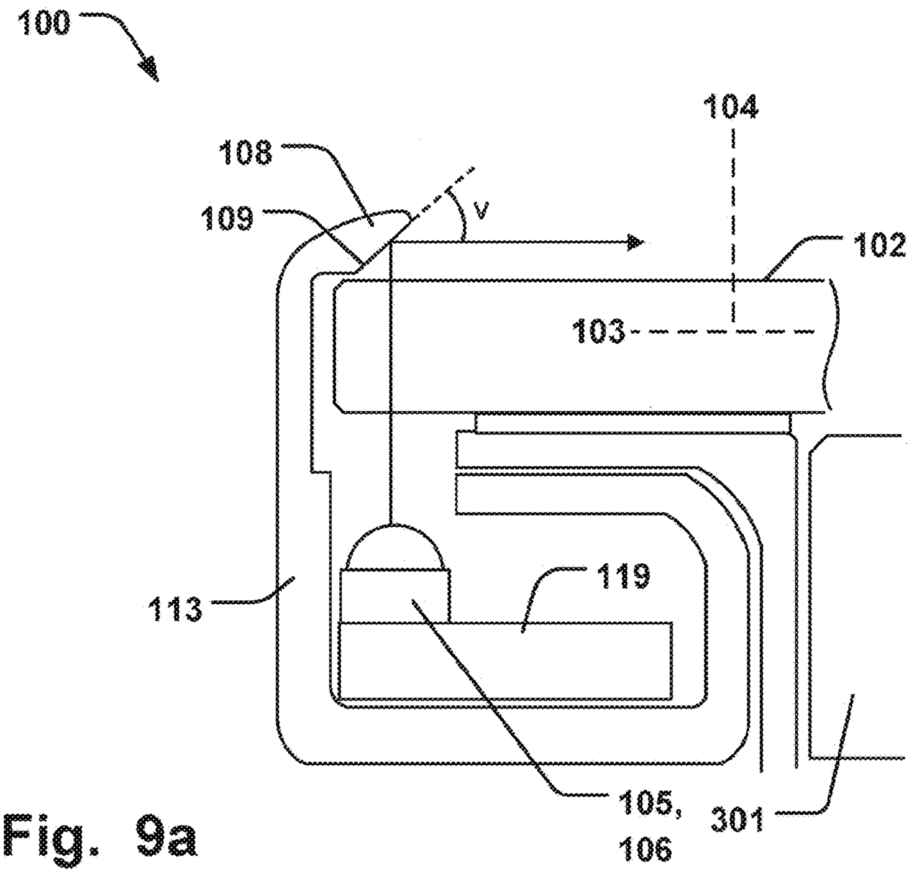
FIG. 9*a* is a schematic illustration, in a cross-sectional side view, of a touch-sensing apparatus, according to one example of the disclosure.
Figure 9B:
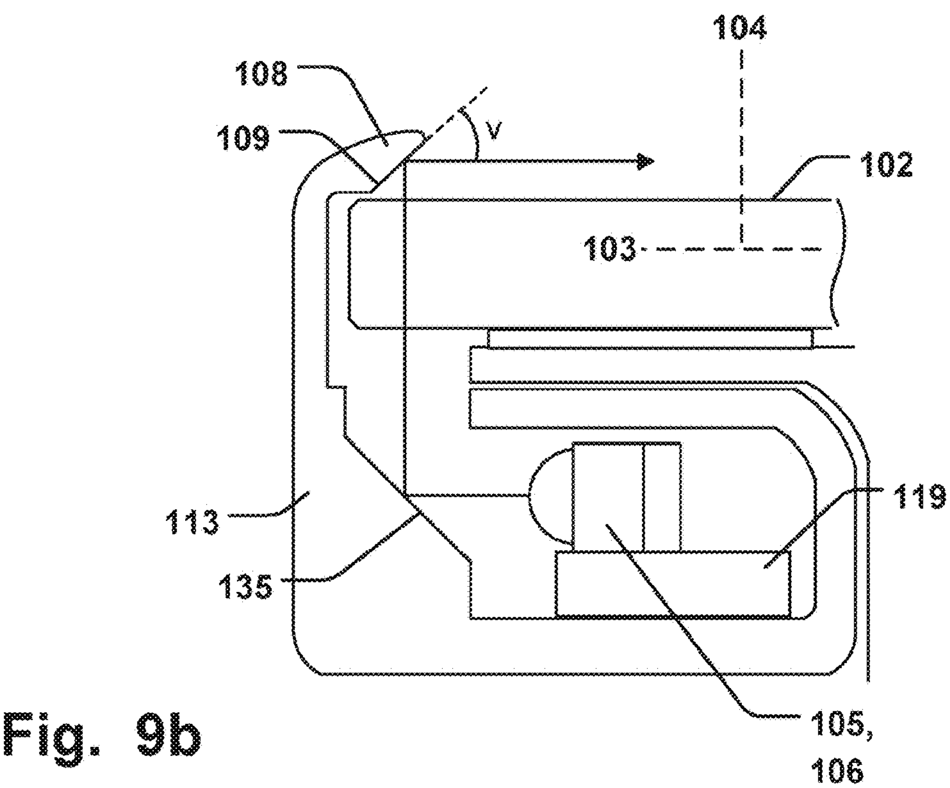
FIG. 9*b* is a schematic illustration, in a cross-sectional side view, of a touch-sensing apparatus, according to one example of the disclosure.

FIG. 9*a* show an example where the substrate 119 extends along the direction of the plane 103, which provides for achieving compact dimensions along the direction of the normal axis 104. This may be advantageous when utilized in conjunction with particularly flat display panels 301, although the dimensions in the direction of the plane 103 around the displayed area may increase in such case. FIG. 9*b* is another example where the substrate 119 extends along the direction of the plane 103, but the emitters 105 and/or detectors 106 are arranged to emit/receive light in the direction of the plane 103 via a reflective surface 135. This provides for achieving compact dimensions along the direction of the normal axis 104. The reflective surface 135 may be a specular reflective surface.

The light directing surface 109 may be anodized metal. The light directing surface 109 may also be surface treated to diffusively reflect the light 110 towards the touch surface 102. The anodization process changes the microscopic texture of the surface 109, and increases the thickness of the natural oxide layer on the surface 109. The thickness and porosity of the anodized oxide surface may be varied. The anodized surface may be dyed in various colors for achieving the desired appearance. Several different colors may provide advantageous reflectance values in the infrared range, such as over 80%, for example aluminium being anodized in black, grey or silver. Other metals may also provide advantageous reflectance characteristics, such as silver. It may be particularly advantageous to use wavelengths above 940 nm where many anodized materials start to reflect significantly. Different colors may also be provided by using different alloys of e.g. aluminium. The diffusive and specular reflection components of the reflectance may be varied by performing different surface treatments of the anodized metal or alloys. The surface roughness may thus be varied to optimize the ratio of the aforementioned reflection components. The directionality of the reflected light may be increased by increasing the specular component, whereas the amount of random scattering increased with the diffusive component. For example, increasing the specular component of the reflection from the light directing surface 109 may increase the strength of the scan lines. In such case the number and/or position of the emitters 105 may be varied to compensate for any narrowing of the scanlines resulting from reduction in diffusive light scattering. Hence, in some examples, the reflective characteristics of the light directing surface 109 may be optimized, while allowing for the desired aesthetic appearance of an anodized surface.

Different surface roughness characteristics may be achieved by various processes, such as etching, sand blasting, bead blasting, machining, brushing, polishing, as well as the anodization mentioned above. In one example, the light directing surface 109 may have a surface roughness defined by a slope RMS ($\Delta q$) between 0.1-0.35. The slope RMS ($\Delta q$) may be between 0.1-0.25 for an advantageous diffusivity. Higher values may decrease the strength of the signals, and too low signals may lead to a more tolerance sensitive systems where the angle ($\varphi$) by which the light is spread in the plane 103 across the touch surface 102 (as indicated by angle $\varphi$ in the example of in FIG. 1*c*) is reduced and limited by emitter and detectors viewing angles. Also, scanline width may become too narrow. In another example the slope RMS ($\Delta q$) may be between 0.13-0.20 for a particularly advantageous diffusivity providing for an optimized signal strength and touch detection process, while maintaining an advantageous power consumption of the components of the touch sensing apparatus 100.

When having appropriate slope variation, the height variations of blasted or etched surface are typically in the 1 to 20 um range. However the slope RMS ($\Delta q$) optimization as described above provides for the most effective tailoring of the reflective characteristics. In some examples the light directing surface 109 has a low roughness. In one example, the light directing surface 109 may be an anodized metal surface which has not undergone any processing to increase the surface roughness. The light directing surface 109 may in such case be anodized directly after the extrusion process. The light directing surface 109 may in such case be mirror-like, i.e. the surface 109 has not undergone any processing to achieve spreading of the light. In such case the slope RMS (Δq) may be between 0-0.1, for providing a mirror-like surface. Such surface may be advantageous in applications where narrow scanlines are desired for a particular touch detection process. E.g. when it is advantageous to increase the amount of available detection light in desired directions across the touch surface 102.

The frame element 113 may comprise the light directing portion 108. I.E., the light directing portion 108 is formed directly from the frame element 113 as an integral piece, e.g. by extrusion. The frame element 113, and the light directing portion 108, may be formed from various metals, such as aluminium. The light directing surface 109 may thus be an anodized metal surface of the frame element 113. The frame element 113 may thus be utilized as a diffusive light scattering element, without having to provide a separate optical component for diffusive light scattering. The number of components may thus be reduced even further with such integrated light directing surface 109. This further removes the need for having an additional optical sealing element to protect such separate optical component. A more robust touch-sensing apparatus 100 which is easier to assemble is thus provided. Further, the surface of the walls 115*a*, 115*b*, of the channel 112 may be a metal surface of the frame element 113. The reflective characteristics of the walls 115*a*, 115*b*, may be tailored as mentioned above with respect to the light directing surface 109. The frame element 113 may form a cavity 125 in which the emitters 105 and/or detectors 106 are arranged. The frame element 113 may thus be formed as a single integral piece with light directing surfaces 109, 115*a*, 115*b*, and cavity 125 for the substrate 119, as well as any mounting interface 129 to a back frame 302 for a display 301, as schematically indicated in FIG. 1*a*. This allows for minimizing the number of opto-mechanical components of the touch-sensing apparatus 100, further providing for a particularly robust touch-sensing apparatus 100 which is less complex and more viable for mass-production.

The light directing portion 108 may comprise an outer surface 126 opposite the light directing surface 109, as indicated in e.g. FIG. 2. The light directing surface 109 may have a higher reflectance than the outer surface 126. Providing the light directing portion 108 of the frame element 113 with different surface treatments allows for having an effective and optimized scattering of light across the touch surface 102, via the light directing surface 109, while the outer surface 126 facing the user has a low reflectance for minimizing light reflections towards the user. Further, this provides for giving a desired cosmetical appearance, while not affecting the optical function (e.g. avoiding having light directing surface 109 too matte by having too high slopes. A particularly effective utilization of the manufacturing materials may thus be realized, since sections of a single integral piece of the frame element 113 may be uniquely treated to achieve the desired functionality of light reflectivity. For example, alignment of separate optical components is not needed.

In one example, the walls 115*a*, 115*b* of the channel 112 may have a higher specular reflectance than the light directing surface 109. This may provide for a more controlled reflection of emitted light towards the light directing surface 109. The light directing surface 109 may in turn provide a larger diffusive component for broadening of the scanlines across the touch surface 102.

In one aspect a touch sensing apparatus 100 is provided, comprising a panel 101 that defines a touch surface 102 extending in a plane 103 having a normal axis 104. A plurality of emitters 105 and detectors 106 arranged along a perimeter 107 of the panel 101. A light directing portion 108 is arranged adjacent the perimeter 107 and comprises a light directing surface 109. The emitters 105 are arranged to emit light 110 and the light directing surface 109 is arranged to receive the light 110 and direct the light 110 across the touch surface 102. The panel 101 comprises a rear surface 111, opposite the touch surface 102. The emitters 105 and/or the detectors 106 are arranged opposite the rear surface 111 to emit and/or receive light through a channel 112 in a frame element 113. The light directing surface 109 receive light from the emitters 105, or direct light to the detectors 106, through the panel 101 and through the channel 112. The frame element 113 is formed from a metal and comprises the light directing portion 108, where the light directing surface 109 is an anodized metal surface of the frame element 113. The frame element 113 may also form a cavity 125 in which the emitters 105 and/or the detectors 106 are arranged so that an optical axis 110' of the emitted light 110 is essentially parallel with the normal axis 104. The touch sensing apparatus 100 thus provides for the advantageous benefits as described above, by providing for a compact touch sensing apparatus 100 with improved signal to noise ratio and increased touch detection performance.

Figure 7A:
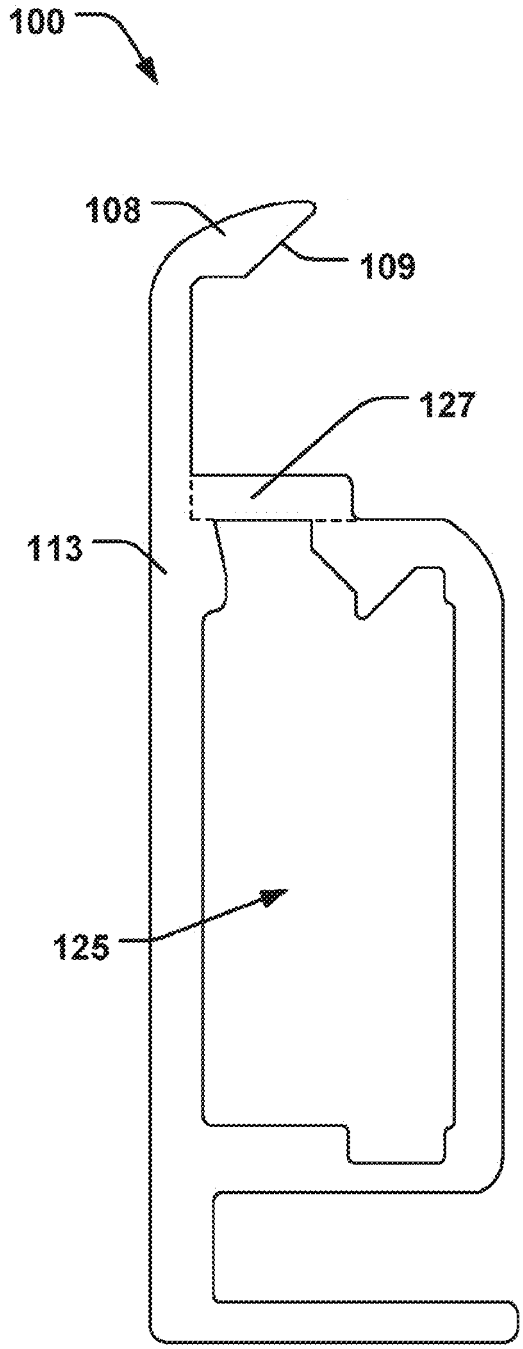
FIGS. 7*a-c* are schematic illustrations, in a cross-sectional side views, of a frame element for a touch-sensing apparatus, according to examples of the disclosure.
Figure 7B:
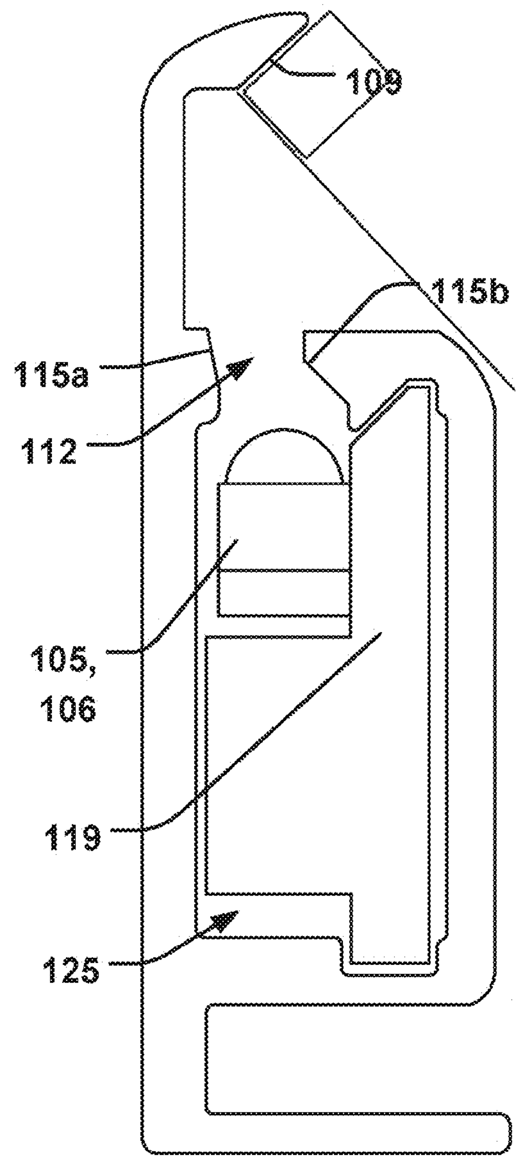
Figure 10A:
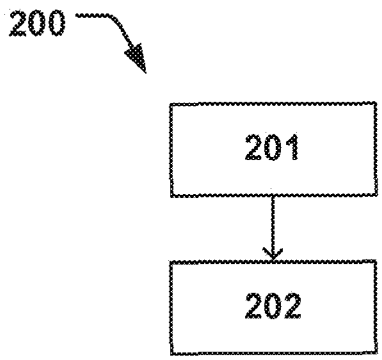
FIG. 10*a* is a flow-chart of a method of manufacturing a frame element for a touch sensing apparatus, according to one example of the disclosure.

FIG. 10*a* is a flowchart of a method 200 of manufacturing a frame element 113 for a touch sensing apparatus 100. The method 200 comprises extruding 201 the frame element 113 to form a light directing portion 108 and a cavity 125 adapted to receive a substrate 119 comprising emitters 105 and/or detectors 106. FIG. 7*a* shows an example of such extruded frame element 113. The method 200 further comprises milling 202 a wall portion 127 of the cavity 125 to form a channel 112. FIG. 7*a* indicates with dashed lines the wall portion 127 which is milled away, so that an open channel 112 is provided into the cavity 125, as exemplified in FIG. 7*b*. The channel 112 is defined by channel walls or surfaces 115*a*, 115*b*. A light directing surface 109 of the light directing portion 108 may thus receive light from the emitters 105, or direct light to the detectors 106, through the channel 112, when the substrate 119 is arranged in the cavity 125. Thus, a single integral piece of the frame element 113 may be provided, by the extrusion 201 and milling 202, which incorporates the functions of alignment and support for the substrate 119 as well as light directing surfaces 109, 115*a*, 115*b*. A facilitated manufacturing is provided while the structural integrity and the desired tolerances of the frame element 113 may be maintained during the process. Further, the milling 202 provides for customizing the dimensions of the channel 112, which is difficult during the extrusion process.

Figure 7C:
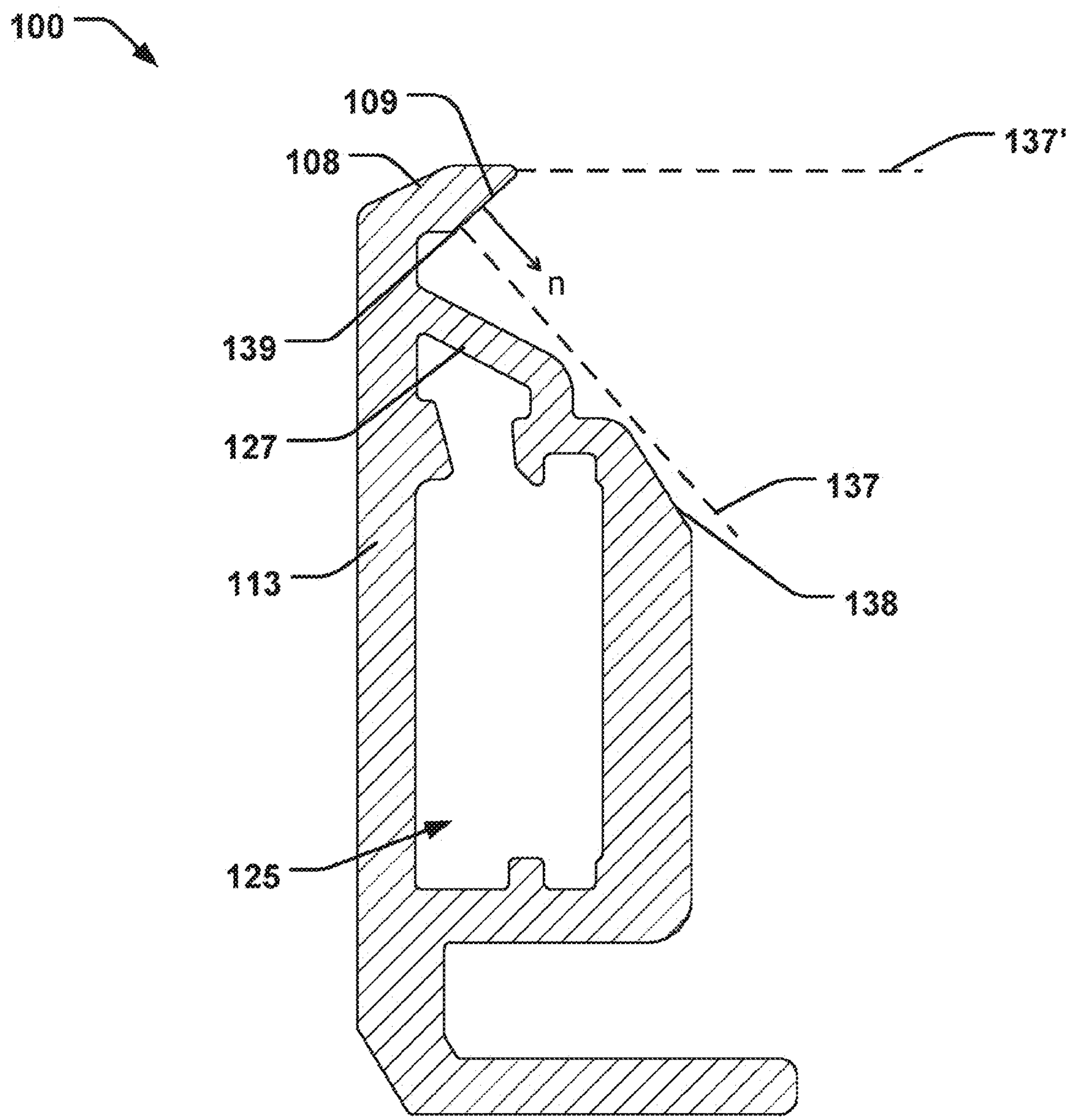

FIG. 7*c* shows another example of an extruded frame element 113. The frame element 113 may be shaped so that the light directing surface 109 has a free line of sight 137, 137'to facilitate any subsequent surface treatment of the light directing surface 109. The line of sight 137, 137', may extend in parallel with the normal (n) of the light directing surface 109. FIG. 7*c* shows an example where the line of sight of the light directing surface 109 is indicated with lower dashed line 137 corresponding a normal (n) to the surface 109, and upper dashed line 137'. Having a free line of sight 137, 137', i.e. no obstruction or intersection of the described sight lines 137, 137', by the frame element 113 allows for optimizing subsequent surface treatment processes of the light directing surface 109, such as sand blasting. Obtaining the desired characteristics of the light directing surface 109 may thus be facilitated. The frame element 113 may comprise a sloped portion 138, as schematically indicated in FIG. 7*c*, which allows for obtaining a free line of sight 137, 137', of the light directing surface 109 as described above, while maintaining a compact profile of the frame element 113. The sloped portion 138 may be arranged so that the lower sight line 137, corresponding to the intersection point of a normal (n) with the surface 109 at a lower endpoint 139 of the surface 109 (closest to the wall portion 127), may be extended beyond the frame element 113 without intersecting with the frame element 113 or the sloped portion 138, as illustrated in the example of FIG. 7*c*. This provides for a facilitated access for surface treatment of the entire light directing surface 109 while maintaining a particularly compact frame element 113. The wall portion 127 may be part of the sloped portion 138.

Figure 10B:
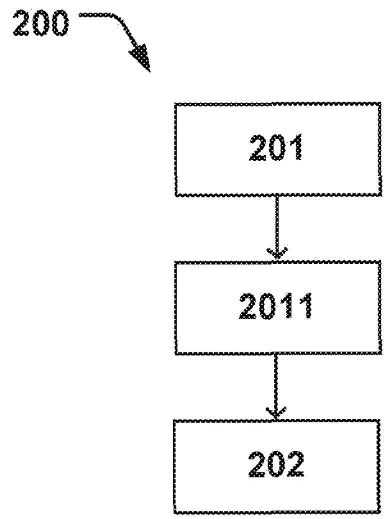
FIG. 10*b* is another flow-chart of a method of manufacturing a frame element for a touch sensing apparatus, according to one example of the disclosure.
Figure 10C:
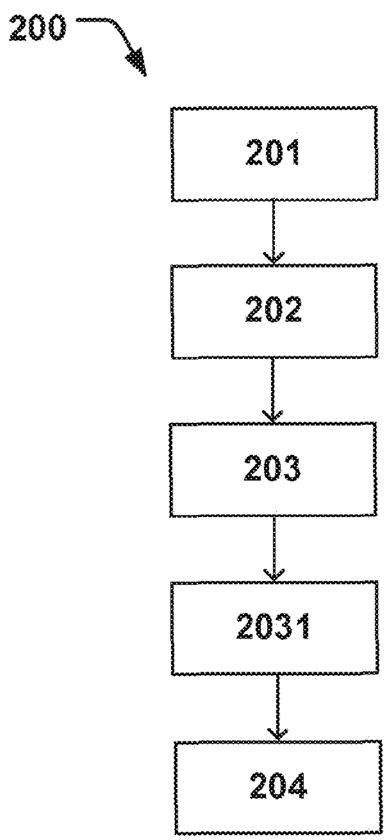
FIG. 10*c* is another flow-chart of a method of manufacturing a frame element for a touch sensing apparatus, according to one example of the disclosure.

FIGS. 10*b*-c are further flowcharts of a method 200. The method 200 may comprise etching, or bead-or sand blasting 2011, 2031, the light directing surface 109. The light directing surface 109 may thus be provided with different reflectance characteristics. In one example the etching, or bead-or sand blasting 2011 the light directing surface 109 is performed before milling 202, as indicated in FIG. 10*b*. The light directing surface 109 may thus be provided with different reflectance characteristics without affecting the surfaces 115*a*, 115*b*, of the channel 112, which are shielded by the wall portion 127, e.g. during an sand blasting process. As mentioned above, it may be advantageous to maintain a larger specular reflection component of the walls 115*a*, 115*b*, as provided after the extrusion process, while the light directing surface 109 may be subsequently treated to provide more diffusive reflection. In some examples, the etching, or bead-or sand blasting 2031 the light directing surface 109 may be performed after said milling 202, as indicated in FIG. 10*c*. In some examples, the etching, or bead-or sand blasting 2031 the light directing surface 109 may be performed after an additional milling step 203 described below, as further indicated in FIG. 10*c*. The method 200 may comprise anodization 204 of the metal of the frame element 113, as described above.

Figure 8A:
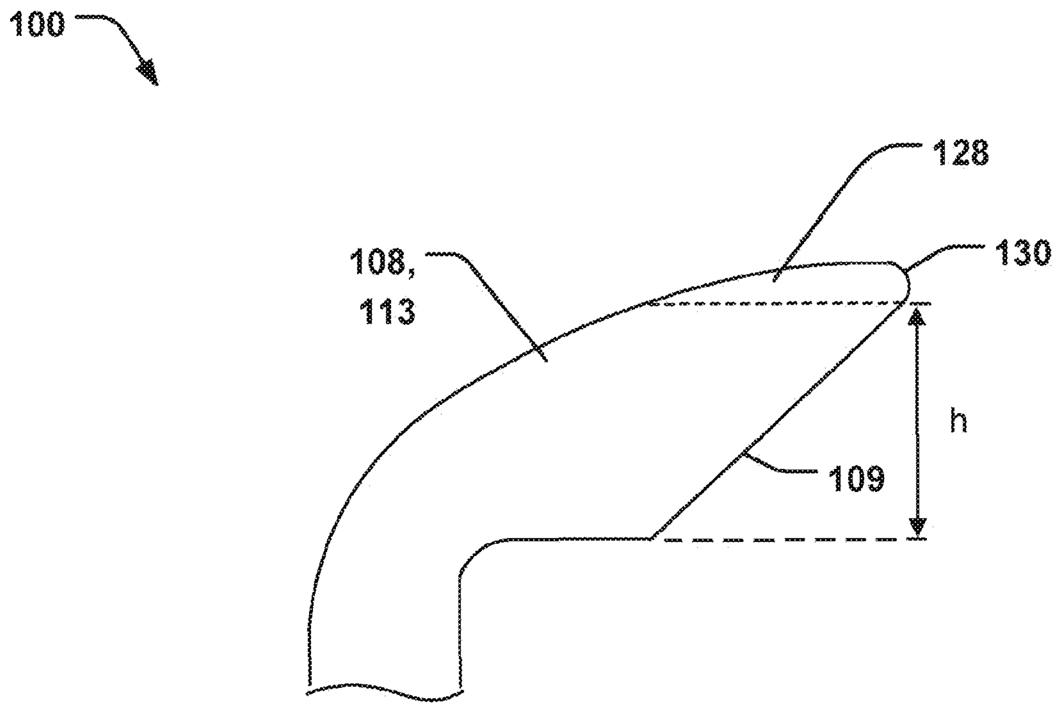
FIGS. 8*a-b* are schematic illustrations, in a cross-sectional side views, of a detail of a frame element for a touch-sensing apparatus, according to examples of the disclosure.
Figure 8B:
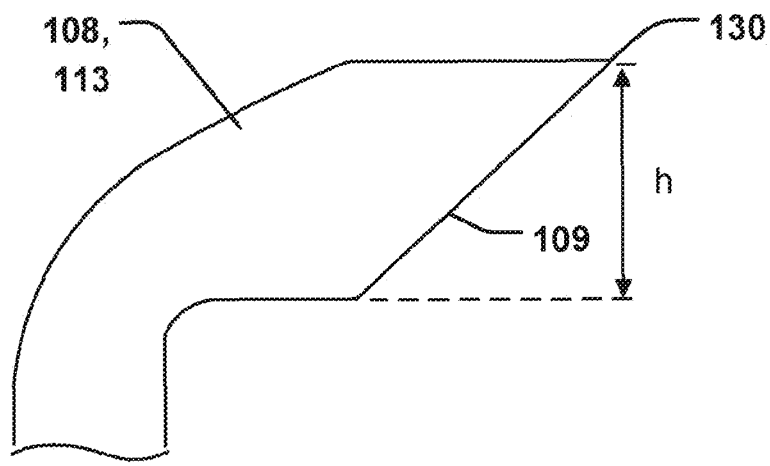

The method 200 may comprise milling 203 a top portion 128 of the extruded light directing portion 108 so that a height (h) of the light directing portion 109 above a touch surface 102 of a panel 101, when arranged in the frame element 113, is reduced. FIG. 8*a* shows a detailed view of an example of the light directing portion 108 after extrusion. The radius of tip 130 of the top portion 128 is limited by the extrusion process. FIG. 8*b* show the light directing portion 108 after the top portion 128 has been milled away along the dashed line in FIG. 8*a*. The milled light directing portion 108 has a height (h) and the corresponding tip 130', as indicated in FIG. 8*b*, is sharper, i.e. the radius is reduced compared to the tip 130 provided after the extrusion. Thus, a more compact light directing portion 108 has been provided, by milling away the top portion 128, while the portion of the light directing portion 108 which is useful for reflecting the light across the touch surface 102 is essentially unaffected. The rounded tip 130 in FIG. 8*a* is not useful for directing the light across the touch surface 102. The round tip 130 has thus been removed as illustrated in FIG. 8*b*. Milling the top portion 128 thus provides for a more effective utilization of the height of the light directing portion 108. A sufficient height, or height distribution, of the scanline above the touch surface 102 may thus be provided, to allow for secure identification of different touch objects with different tip sizes, while minimizing the bezel height. In some examples, the height is in the range 1.5-2 mm. A height of 1.8 mm may in some examples be particularly advantageous, providing the appearance of a flush bezel.

Figure 8C:
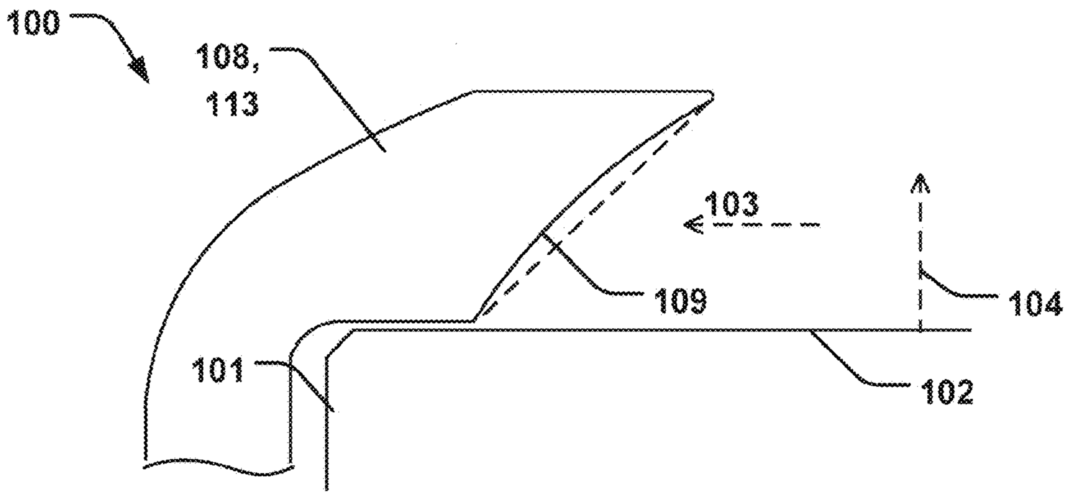
FIG. 8*c* is a schematic illustration, in a cross-sectional side views, of a detail of a frame element for a touch-sensing apparatus, according to one example of the disclosure.

The light directing surface 109 may be concave as schematically illustrated in FIG. 8*c*. Having a light directing surface 109 which is concave towards the touch surface 102 provides for controlling the direction of the reflected light as desired and increasing the signal strength of the scanlines. The light directing surface 109 may be parabolic concave. Since the light directing surface 109 may be formed directly in the frame element 113, as described above, the concave shape may be shaped directly in the frame element 113. Thus, the light reflection may be controlled by shaping the frame element directly 113, without having to introduce any additional optical component.

Figure 8D:
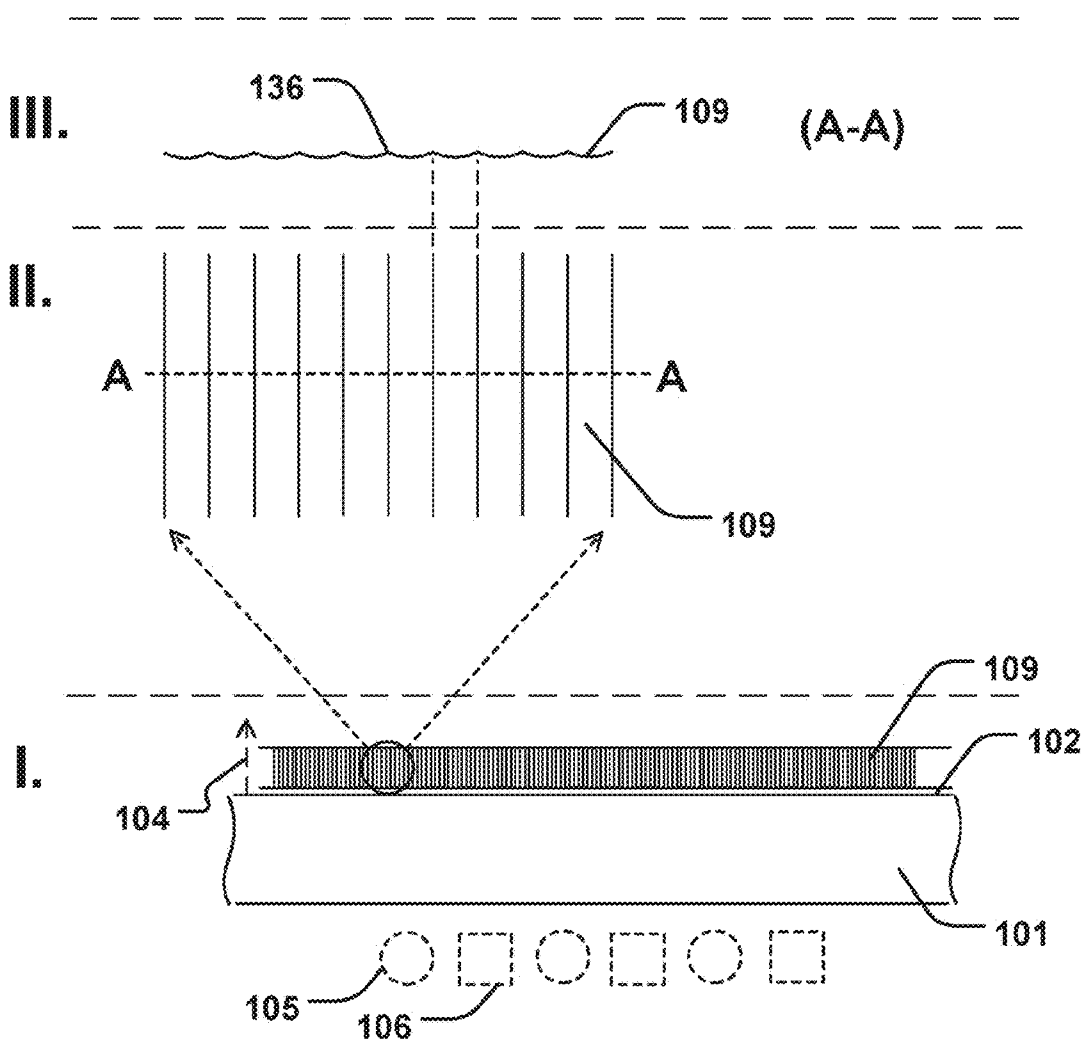
FIG. 8*d* are schematic illustrations of a detail of a frame element comprising a light directing surface, for a touch-sensing apparatus, in a view along the direction of a plane of a touch surface (I); a detailed section of the light directing surface (II), from the view in (I); and a side-view (III) of the section in (II), according to examples of the disclosure.

FIG. 8*d* are schematic illustrations of a detail the light directing surface 109, in different views I-III. The first view (I) is along the direction 103 of the plane 103, e.g. along arrow 103 in FIG. 8*c*. The light directing surface 109 is thus illustrated as an elongated portion, arranged above the panel 101, and the emitters 105 and detectors 106 below the panel 101. FIG. 8*d* shows in the second view (II) a detailed section of the light directing surface 109. The light directing surface 109 may be milled or otherwise machined to form a pattern in the surface 109. The third view (III) of FIG. 8*d* is a cross-section along A-A in view (II), where an example of such pattern is shown, with periodic ridges 136 forming an undulating pattern or grating. Different patterns may be formed directly in the frame element 113 by milling or other machining processes, to provide a light directing surface 109 with desired reflective characteristics to control the direction of the light across the touch surface 102.

Further examples of diffusive light scattering surfaces are described in the following. Any of the diffusive light scattering surfaces described may be provided on the light directing surface 109. The diffusive light scattering surface may be configured to exhibit at least 50% diffuse reflection, and preferably at least 70-85% diffuse reflection. Reflectivity at 940 nm above 70% may be achieved for materials with e.g. black appearance, by anodization as mentioned above (electrolytic coloring using metal salts, for example). A diffusive light scattering surface may be implemented as a coating, layer or film applied by e.g. by anodization, painting, spraying, lamination, gluing, etc. Etching and blasting as mentioned above is an effective procedure for reaching the desired diffusive reflectivity. In one example, the diffusive light scattering surface is implemented as matte white paint or ink. In order to achieve a high diffuse reflectivity, it may be preferable for the paint/ink to contain pigments with high refractive index. One such pigment is $TiO_2$, which has a refractive index n=2.8. The diffusive light scattering surface may comprise a material of varying refractive index. It may also be desirable, e.g. to reduce Fresnel losses, for the refractive index of the paint filler and/or the paint vehicle to match the refractive index of the material on which surface it is applied. The properties of the paint may be further improved by use of EVOQUE™ Pre-Composite Polymer Technology provided by the Dow Chemical Company. There are many other coating materials for use as a diffuser that are commercially available, e.g. the fluoropolymer Spectralon, polyurethane enamel, barium-sulphate-based paints or solutions, granular PTFE, microporous polyester, GORE® Diffuse Reflector Product, Makrofol® polycarbonate films provided by the company Bayer AG, etc. Alternatively, the diffusive light scattering surface may be implemented as a flat or sheet-like device, e.g. the above-mentioned engineered diffuser, diffuser film, or white paper which is attached by e.g. an adhesive. According to other alternatives, the diffusive light scattering surface may be implemented as a semi-randomized (non-periodic) micro-structure on an external surface possibly in combination with an overlying coating of reflective material.

A micro-structure may be provided on such external surface and/or an internal surface by etching, embossing, molding, abrasive blasting, scratching, brushing etc. The diffusive light scattering surface may comprise pockets of air along such internal surface that may be formed during a molding procedure. In another alternative, the diffusive light scattering surface may be light transmissive (e.g. a light transmissive diffusing material or a light transmissive engineered diffuser) and covered with a coating of reflective material at an exterior surface. Another example of a diffusive light scattering surface is a reflective coating provided on a rough surface.

The diffusive light scattering surface may comprise lenticular lenses or diffraction grating structures. Lenticular lens structures may be incorporated into a film. The diffusive light scattering surface may comprise various periodical structures, such as sinusoidal corrugations provided onto internal surfaces and/or external surfaces. The period length may be in the range of between 0.1 mm-1 mm. The periodical structure can be aligned to achieve scattering in the desired direction.

Hence, as described, the diffusive light scattering surface may comprise; white- or colored paint, white- or colored paper, Spectralon, a light transmissive diffusing material covered by a reflective material, diffusive polymer or metal, an engineered diffuser, a reflective semi-random micro-structure, in-molded air pockets or film of diffusive material, different engineered films including e.g. lenticular lenses, or other micro lens structures or grating structures. The diffusive light scattering surface preferably has low NIR absorption.

In a variation of any of the above embodiments wherein the diffusive light scattering element provides a reflector surface, the diffusive light scattering element may be provided with no or insignificant specular component. This may be achieved by using either a matte diffuser film in air, an internal reflective bulk diffusor or a bulk transmissive diffusor. This allows effective scanline broadening by avoiding the narrow, super-imposed specular scanline usually resulting from a diffusor interface having a specular component, and providing only a broad, diffused scanline profile. By removing the super-imposed specular scanline from the touch signal, the system can more easily use the broad, diffused scanline profile. Preferably, the diffusive light scattering surface has a specular component of less than 1%, and even more preferably, less than 0.1%. Alternatively, where the specular component is greater than 0.1%, the diffusive light scattering element is preferably configured with surface roughness to reduce glossiness, e.g. micro structured.

The panel 101 may be made of glass, poly (methyl methacrylate) (PMMA) or polycarbonates (PC). The panel 101 may be designed to be overlaid on or integrated into a display device or monitor (not shown). It is conceivable that the panel 101 does not need to be light transmissive, i.e. in case the output of the touch does not need to be presented through panel 101, via the mentioned display device, but instead displayed on another external display or communicated to any other device, processor, memory etc. The panel 101 may be provided with a shielding layer such as a print, i.e. a cover with an ink, to block unwanted ambient light. The amount of stray light and ambient light that reaches the detectors 106 may thus be reduced.

As used herein, the emitters 105 may be any type of device capable of emitting radiation in a desired wavelength range, for example a diode laser, a VCSEL (vertical-cavity surface-emitting laser), an LED (light-emitting diode), an incandescent lamp, a halogen lamp, etc. The emitter 105 may also be formed by the end of an optical fiber. The emitters 105 may generate light in any wavelength range. The following examples presume that the light is generated in the infrared (IR), i.e. at wavelengths above about 750 nm. Analogously, the detectors 106 may be any device capable of converting light (in the same wavelength range) into an electrical signal, such as a photo-detector, a CCD device, a CMOS device, etc.

With respect to the discussion above, “diffuse reflection” refers to reflection of light from a surface such that an incident ray is reflected at many angles rather than at just one angle as in “specular reflection”. Thus, a diffusively reflecting element will, when illuminated, emit light by reflection over a large solid angle at each location on the element. The diffuse reflection is also known as “scattering”. The described examples refer primarily to aforementioned elements in relation to the emitters 105, to make the presentation clear, although it should be understood that the corresponding arrangements may also apply to the detectors 106.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

For example, the specific arrangement of emitters and detectors as illustrated and discussed in the foregoing is merely given as an example. The inventive coupling structure is useful in any touch-sensing system that operates by transmitting light, generated by a number of emitters, across a panel and detecting, at a number of detectors, a change in the received light caused by an interaction with the transmitted light at the point of touch.

What is claimed is:

1. A touch sensing apparatus comprising:

a panel that defines a touch surface extending in a plane having a normal axis, a plurality of emitters and detectors arranged along a perimeter of the panel, and a light directing portion arranged adjacent the perimeter and comprising a light directing surface, wherein the emitters are arranged to emit light and the light directing surface is arranged to receive the light and direct the light across the touch surface, wherein the plurality of emitters that are configured to emit light and/or the plurality of detectors that are configured to receive light through a channel in a frame element, wherein the light directing surface and the channel are arranged on opposite sides of the panel, and whereby the light directing surface receives light from the emitters, or directs light to the plurality of detectors, through the panel and through the channel, in the direction of the normal axis, wherein the panel has edges extending between the touch surface and a rear surface of the panel, wherein the channel extends in a direction parallel with the plane with a width between a first channel wall, arranged closest to a respective edge of the panel, and an opposite second channel wall, and wherein the first channel wall extends with an angle towards the direction of the normal axis.

2. The touch sensing apparatus according to claim 1, wherein the frame element is formed of a metal, and any of the light directing surface, the first channel wall, and the second channel wall is a metal surface of the frame element.

3. The touch sensing apparatus according to claim 2, wherein the light directing surface is an anodized metal, an etched metal surface, a sand blasted metal surface, a bead blasted metal surface, or a brushed metal surface of the frame element for increasing surface roughness.

4. The touch sensing apparatus according to claim 1, wherein the light directing portion comprises an outer surface opposite the light directing surface, wherein the light directing surface has a higher reflectance than the outer surface.

5. The touch sensing apparatus according to claim 1, wherein the light directing surface diffusively reflects the light over the touch surface.

6. The touch sensing apparatus according to claim 1, wherein walls of the channel comprise a diffusive light scattering surface.

7. The touch sensing apparatus according to claim 1, wherein the emitters and/or detectors are mounted to a substrate, wherein a support is attached to the substrate, the support extending in a direction parallel with the plane between the substrate and a frame wall of the frame element.

8. The touch sensing apparatus according to claim 1, wherein the panel having edges extending between the touch surface and the rear surface, wherein the frame element forms a cavity, wherein the emitters and/or detectors are mounted to a substrate and the substrate is arranged in the cavity so that the emitters and/or detectors are arranged closer to the respective edge of the panel than the substrate.

9. The touch sensing apparatus according to claim 8, wherein the cavity extends in a direction parallel with the plane with a width (d2) between a first frame wall, arranged closest to the respective edge of the panel, and an opposite second frame wall, wherein the substrate is arranged in the cavity so that the emitters and/or detectors are arranged closer to the first frame wall than the second frame wall.

10. The touch sensing apparatus according to claim 8, wherein the substrate extends with an elongated shape in a direction of the normal axis.

11. The touch sensing apparatus according to claim 1, wherein the metal surface is concave towards the touch surface.

12. The touch sensing apparatus according to claim 1, wherein the light directing surface has a surface roughness defined by a slope RMS ($\Delta q$) between 0.1-0.25.

13. The touch sensing apparatus according to claim 1, wherein the light directing surface has a surface roughness defined by a slope RMS ($\Delta q$) between 0.13-0.20.

14. The touch sensing apparatus according to claim 1, wherein the light directing surface has a surface roughness defined by a slope RMS ($\Delta q$) between 0-0.1.

15. The touch sensing apparatus according to claim 1, wherein walls of the channel have a higher specular reflectance than the light directing surface.

16. A touch sensing apparatus comprising:

a panel that defines a touch surface extending in a plane having a normal axis, a plurality of emitters and detectors arranged along a perimeter of the panel, and a light directing portion arranged adjacent the perimeter and comprising a light directing surface, wherein the plurality of emitters are arranged to emit light and the light directing surface is arranged to receive the light and direct the light across the touch surface, the plurality of emitters that are configured to emit light and/or the plurality of detectors that are configured to receive light through a channel in a frame element, the light directing surface receives light from the emitters, or directs light to the plurality of detectors, through the panel and through the channel, and wherein the light directing surface extends from an edge portion of the light directing portion being arranged closest to the touch surface to a protrusion of the light directing portion, the protrusion extending in a direction parallel with the plane to shield ambient or stray light from being reflected towards the channel.

17. A method of manufacturing a frame element of metal for a touch sensing apparatus, comprising extruding the frame element to form a light directing portion being a metal surface of the frame element, milling a wall portion of the frame element to form a channel so that, in use, a light directing surface of the light directing portion receives light from a plurality of emitters, or directs light to a plurality of detectors, through the channel, wherein the channel extends in a direction parallel with the plane with a width between a first channel wall, arranged closest to a respective edge of the panel, and an opposite second channel wall, and wherein the first channel wall extends with an angle towards the direction of the normal axis.

18. The method according to claim 17, comprising etching, or bead-blasting, or sand blasting the light directing surface.

19. The method according to claim 18, comprising milling a top portion of the extruded light directing portion so that a height (h) of the light directing portion above a touch surface of a panel, when arranged in the frame element, is reduced.

* * * * *